US008613569B2

(12) United States Patent
Belinsky et al.

(10) Patent No.: US 8,613,569 B2
(45) Date of Patent: Dec. 24, 2013

(54) STATIONARY POSITIONED OFFSHORE WINDPOWER PLANT (OWP) AND THE METHODS AND MEANS FOR ITS ASSEMBLING, TRANSPORTATION, INSTALLATION AND SERVICING

(75) Inventors: Sidney Belinsky, West Palm Beach, FL (US); Aleksey Belinskiy, Cherry Hill, NJ (US)

(73) Assignee: Efficient Engineering, LLC, West Palm Beach, FL (US)

( * ) Notice: Subject to any disclaimer, the term of this patent is extended or adjusted under 35 U.S.C. 154(b) by 0 days.

(21) Appl. No.: 13/397,723

(22) Filed: Feb. 16, 2012

(65) Prior Publication Data
US 2012/0189390 A1 Jul. 26, 2012

Related U.S. Application Data

(63) Continuation-in-part of application No. 12/607,406, filed on Oct. 28, 2009, now abandoned.

(60) Provisional application No. 61/199,727, filed on Nov. 19, 2008.

(51) Int. Cl.
*E02B 17/02* (2006.01)

(52) U.S. Cl.
USPC ............ 405/203; 405/224; 405/204; 405/209

(58) Field of Classification Search
USPC ................. 405/203, 204, 205, 206, 209, 224, 405/224.1, 226
See application file for complete search history.

(56) References Cited

U.S. PATENT DOCUMENTS

| | | | |
|---|---|---|---|
| 4,257,721 A | 3/1981 | Haynes | |
| 6,257,165 B1 | 7/2001 | Danos, Jr. et al. | |
| 6,481,932 B1 | 11/2002 | Riemers | |
| 6,488,446 B1 | 12/2002 | Riemers | |
| 6,932,326 B1 | 8/2005 | Krabbendam | |
| 6,964,552 B1 | 11/2005 | Krabbendam | |
| 7,112,010 B1 * | 9/2006 | Geiger | 405/195.1 |
| 7,234,409 B2 * | 6/2007 | Hansen | 114/258 |
| 7,281,902 B2 * | 10/2007 | Mortensen | 416/244 R |
| 7,293,960 B2 * | 11/2007 | Yamamoto et al. | 416/85 |
| 7,296,974 B2 * | 11/2007 | Wobben | 416/132 B |
| 7,407,342 B2 | 8/2008 | Seidel | |
| 2004/0169376 A1 | 9/2004 | Ruer et al. | |
| 2006/0120809 A1 * | 6/2006 | Ingram et al. | 405/195.1 |
| 2007/0102940 A1 * | 5/2007 | Hansen | 290/55 |
| 2007/0138021 A1 | 6/2007 | Nicholson | |
| 2007/0269272 A1 | 11/2007 | Kothnur et al. | |

(Continued)

*Primary Examiner* — Frederick L Lagman
(74) *Attorney, Agent, or Firm* — Malin Haley DiMaggio & Bowen, P.A.

(57) ABSTRACT

An offshore windpower plant (OWP) including a wind turbine and foundation and a new method of installing them that exclude the use of a jack up crane vessel. By this system and method, named OWP technology, the completely assembled wind turbines are lifted from the shore stand, using the buoyancy force of a catamaran wind installer (CWTI), transported to the preinstalled foundation, engaged with it in a manner that would exclude CWTI from rolling and pitching and by this allow to use the installed foundation as the base for stability for safely placing a wind turbine on it allowing placement of wind turbines on foundations regardless of the depth of their installation. The CWTI does not need a heavy lift revolving heavy lift crane and also does not need legs, thus making the system and method simpler, smaller and drastically less expensive than jack up crane vessles.

11 Claims, 97 Drawing Sheets

(56) References Cited

U.S. PATENT DOCUMENTS

| | | |
|---|---|---|
| 2008/0240864 A1 | 10/2008 | Belinsky |
| 2008/0290245 A1 | 11/2008 | Haugsoen et al. |
| 2009/0028647 A1* | 1/2009 | Bingham et al. ........... 405/195.1 |
| 2009/0191004 A1 | 7/2009 | Schakenda et al. |
| 2010/0067989 A1 | 3/2010 | Brown et al. |
| 2010/0219645 A1 | 9/2010 | Yamamoto et al. |
| 2011/0107953 A1 | 5/2011 | Jahnig |
| 2011/0139056 A1* | 6/2011 | Cholley et al. ................ 114/264 |
| 2011/0200425 A1* | 8/2011 | Weaver ............................ 415/7 |
| 2012/0118215 A1* | 5/2012 | Tosello ......................... 405/224 |
| 2012/0132124 A1* | 5/2012 | Gifford et al. ................ 114/274 |

\* cited by examiner

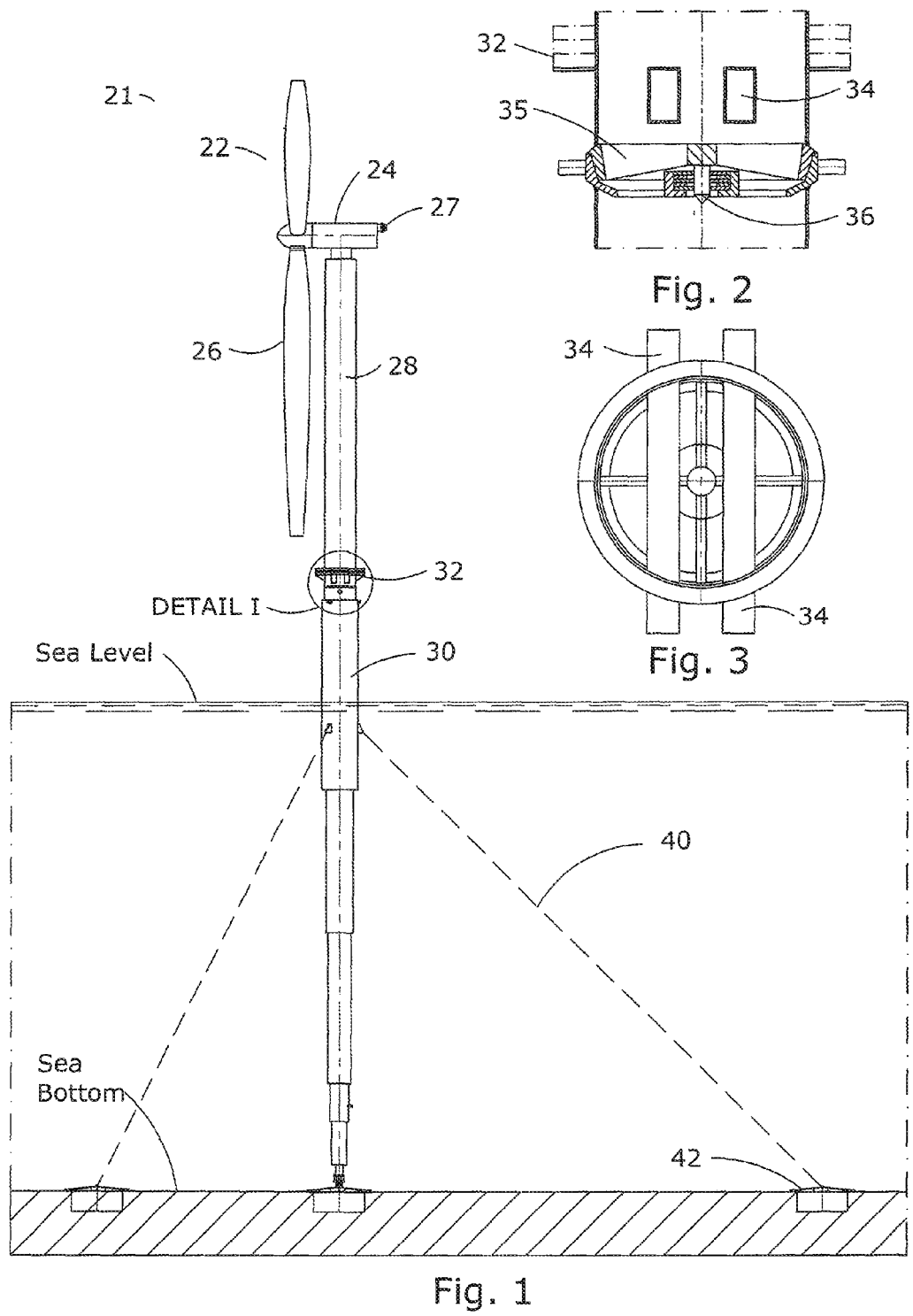

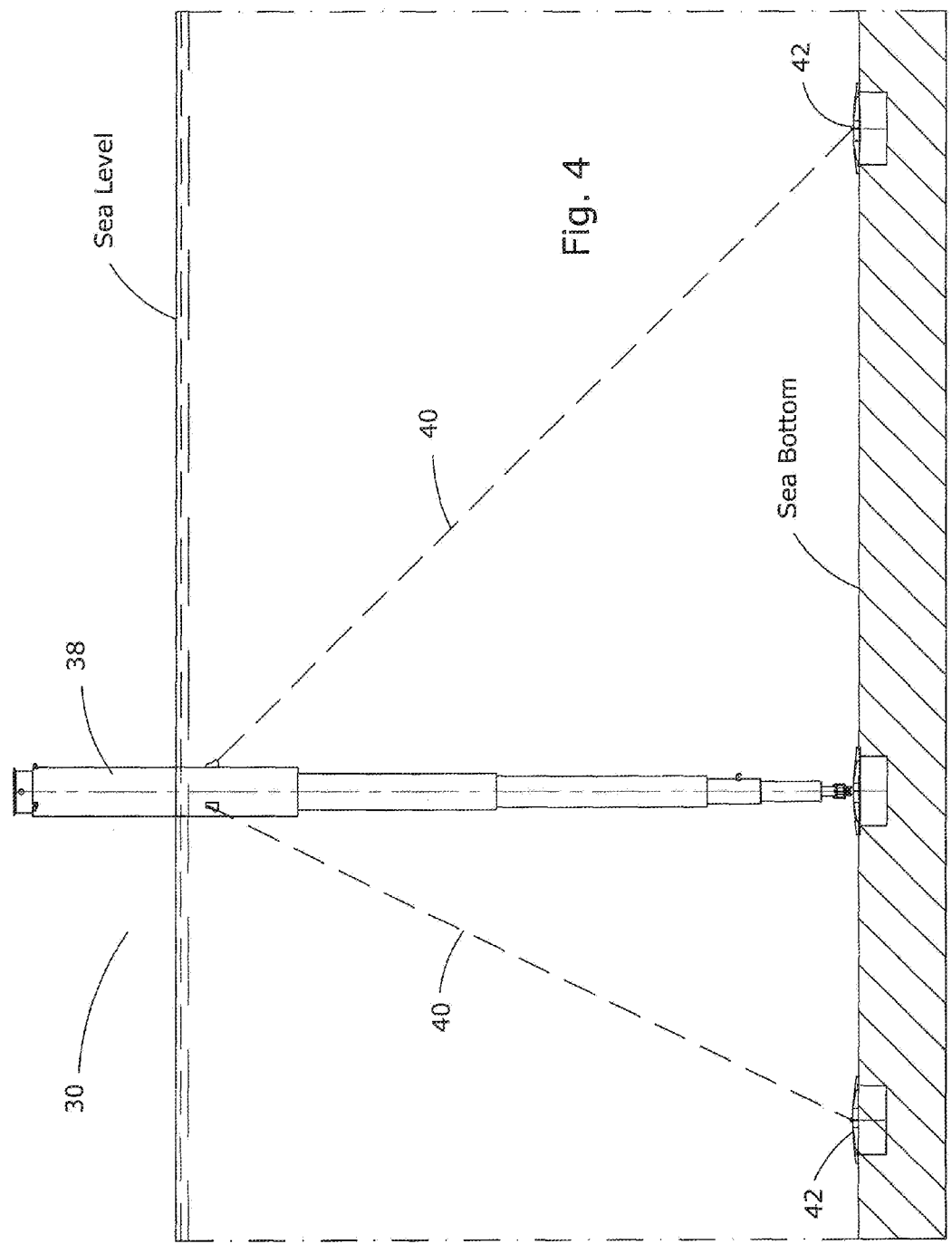

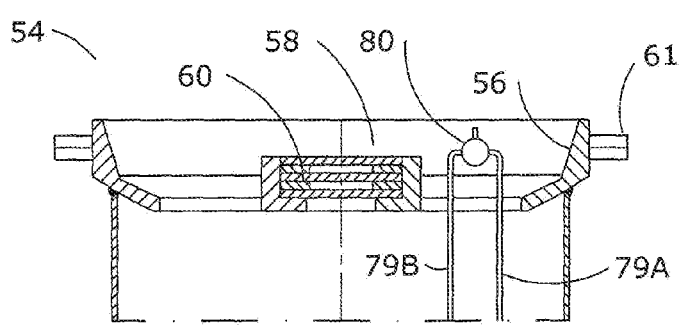
Fig. 7A
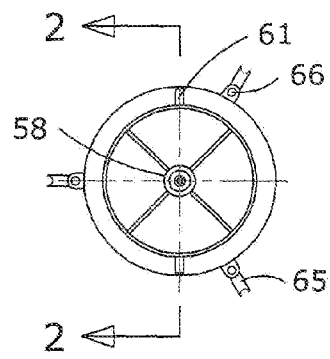
Fig. 6
Fig. 7
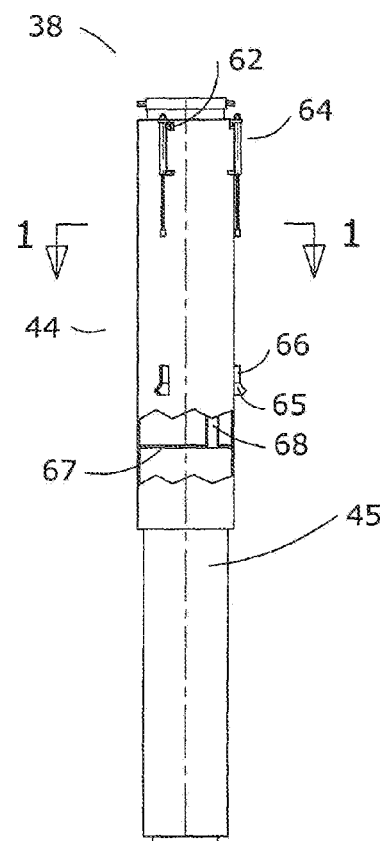
Fig. 5

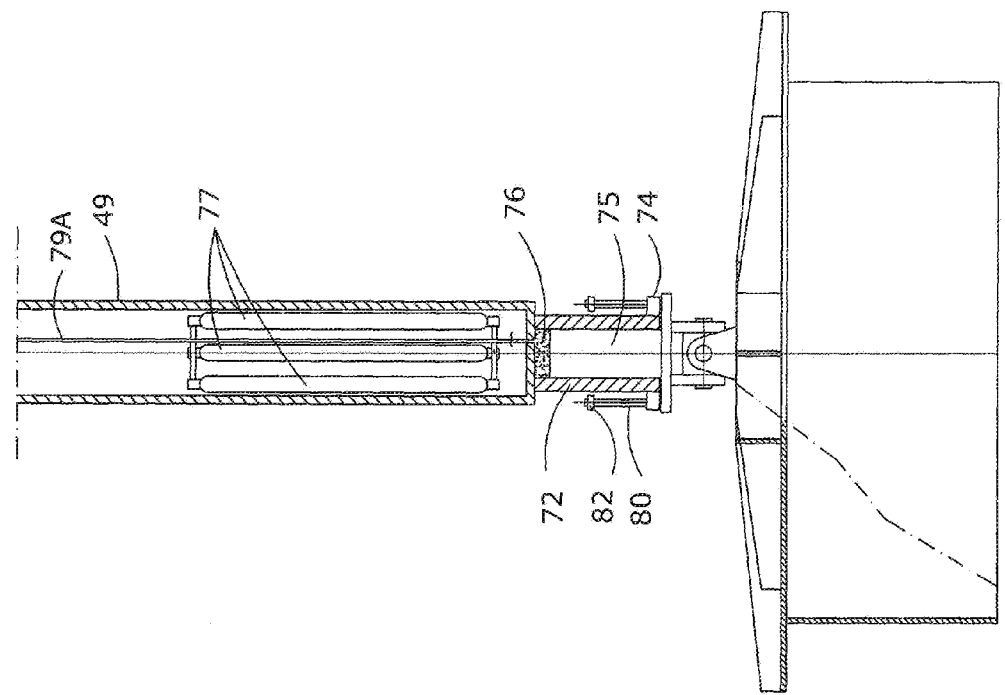
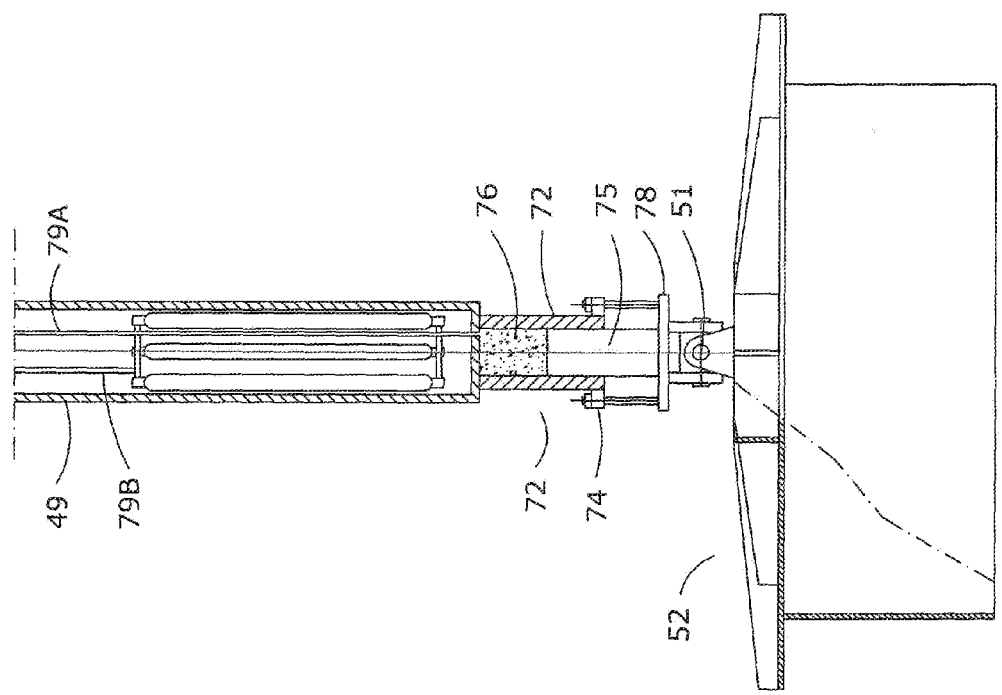

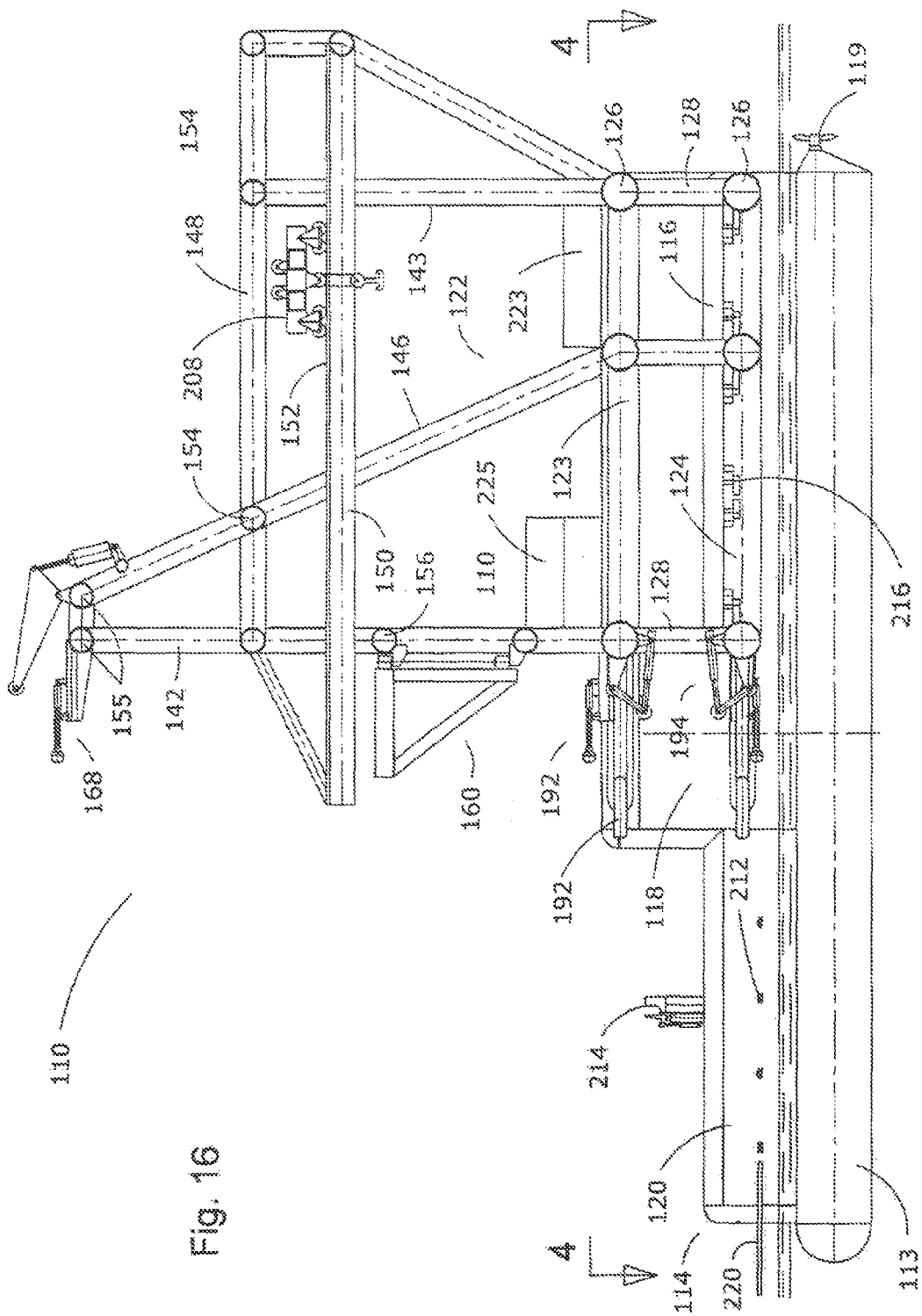

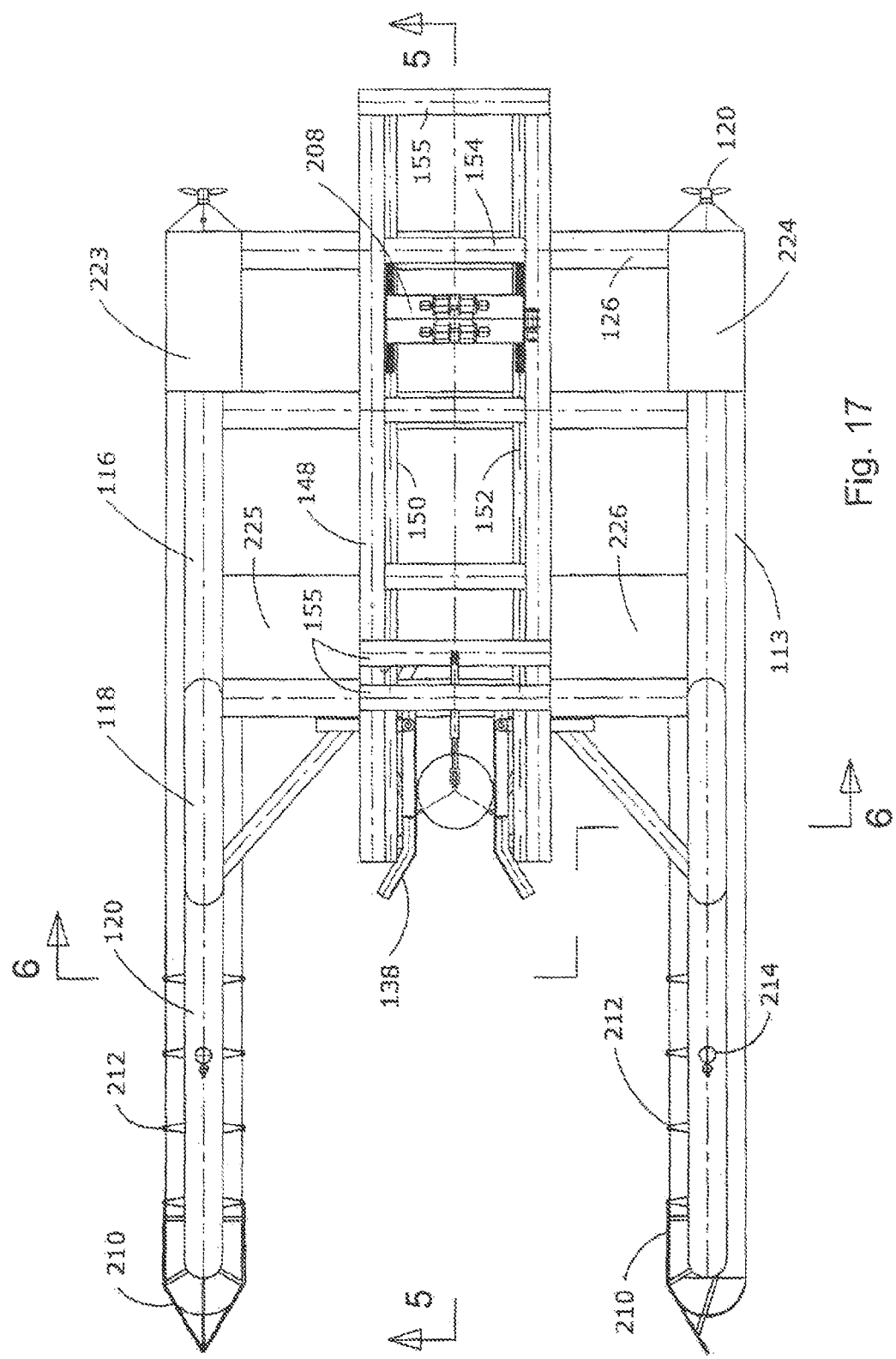

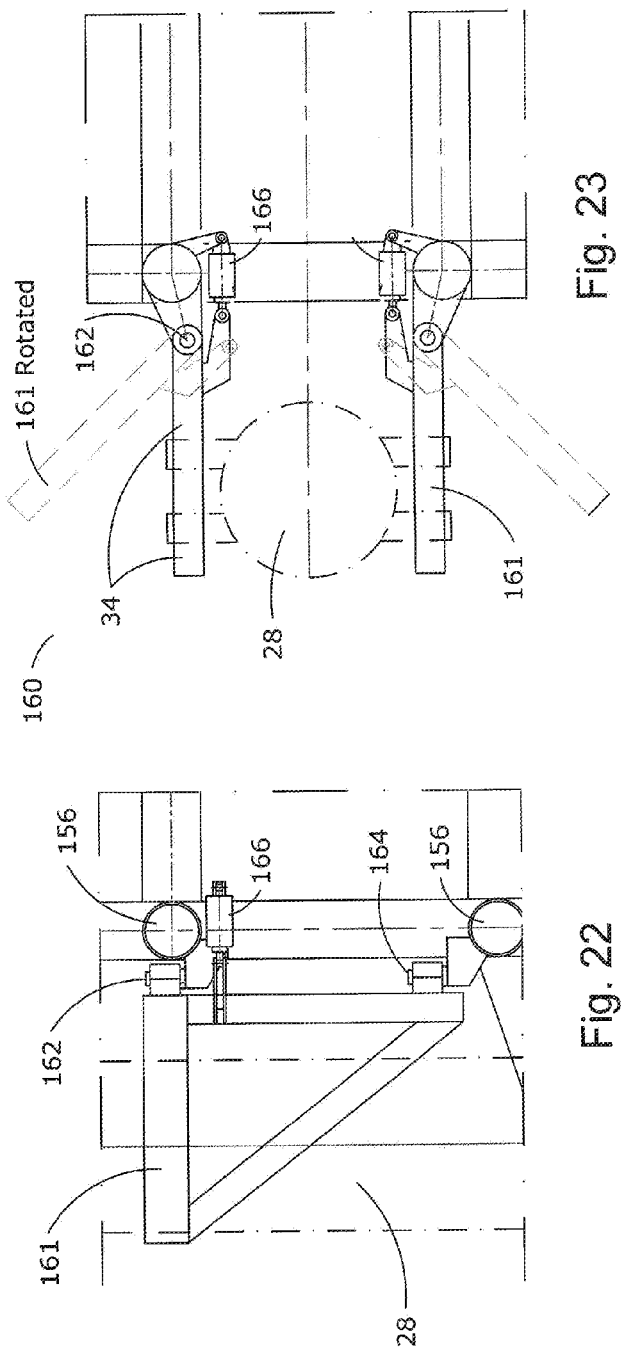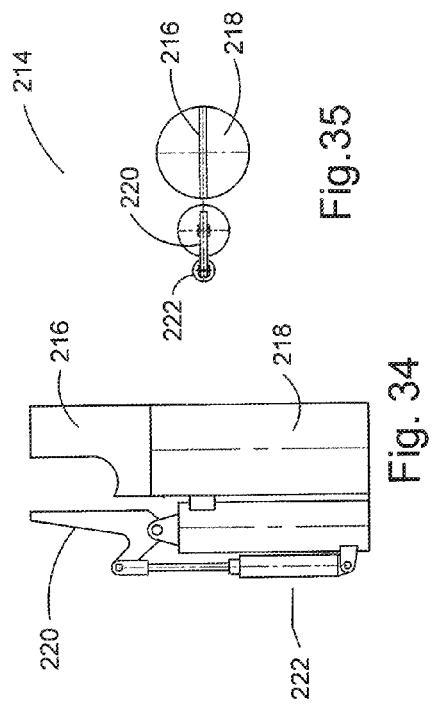

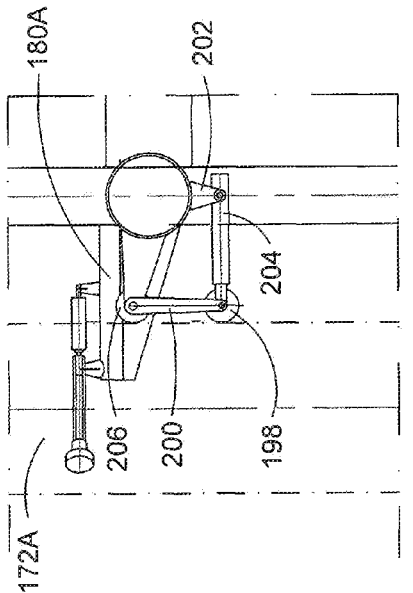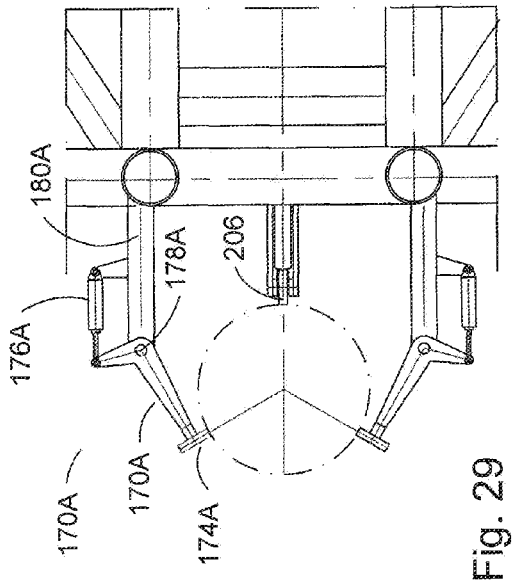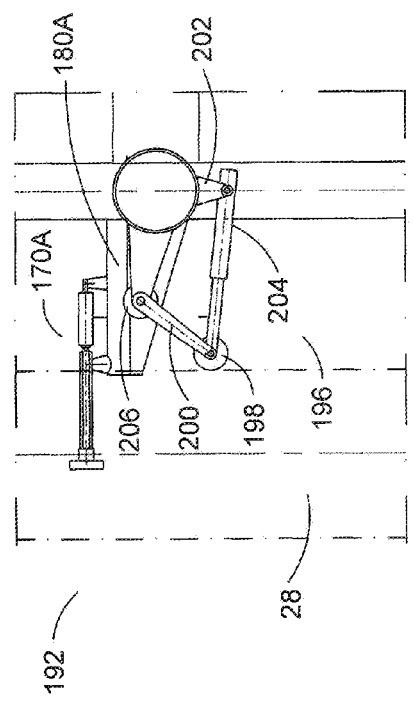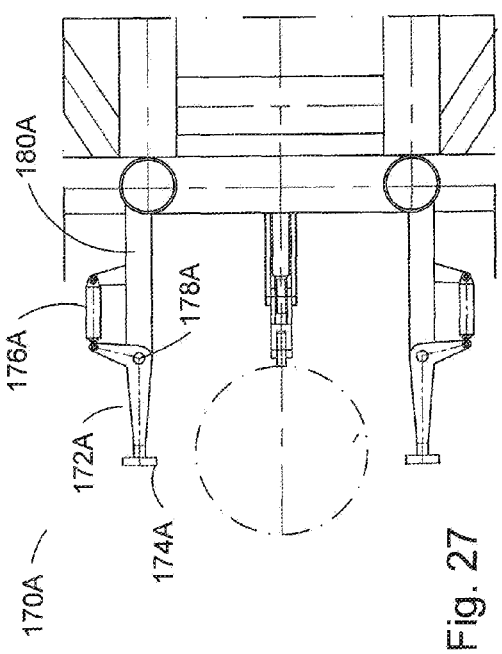
Fig. 28
Fig. 29
Fig. 26
Fig. 27

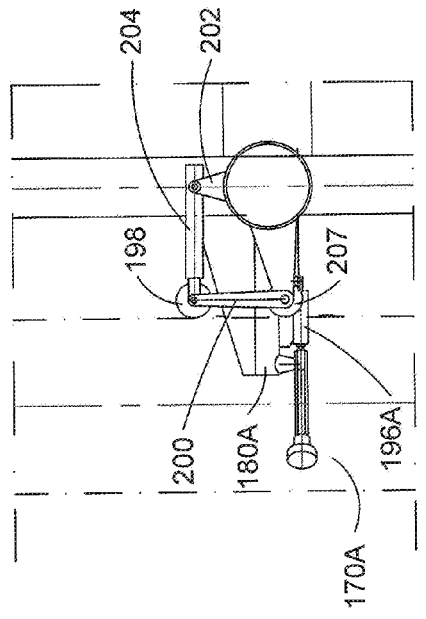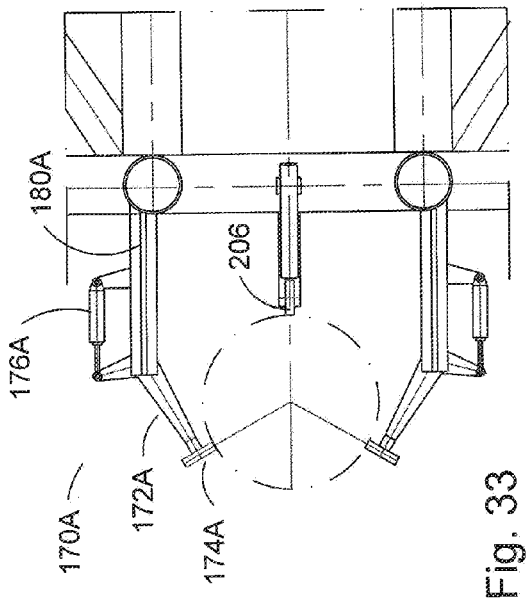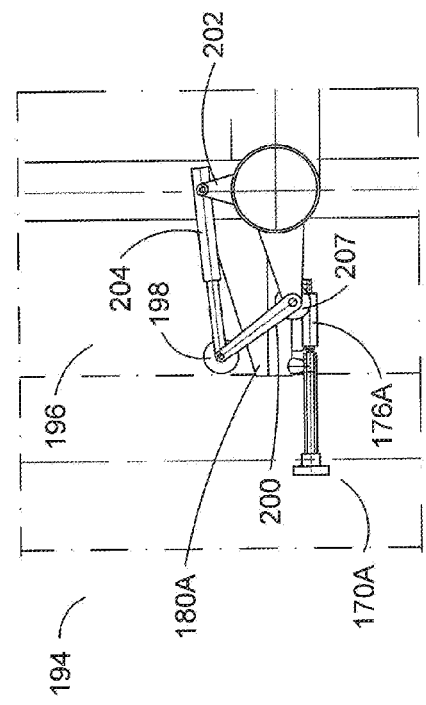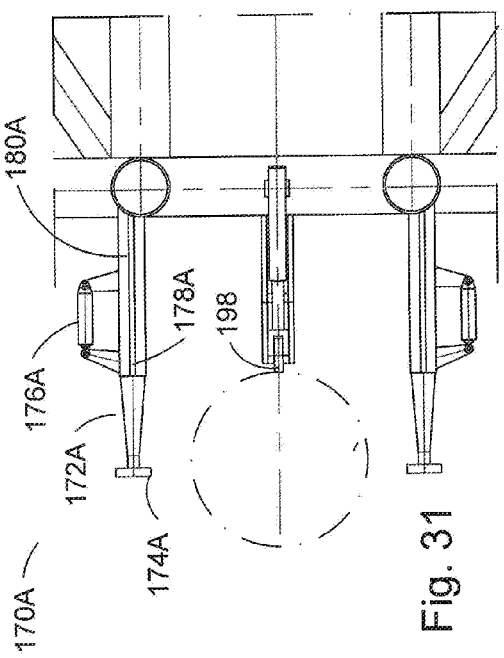

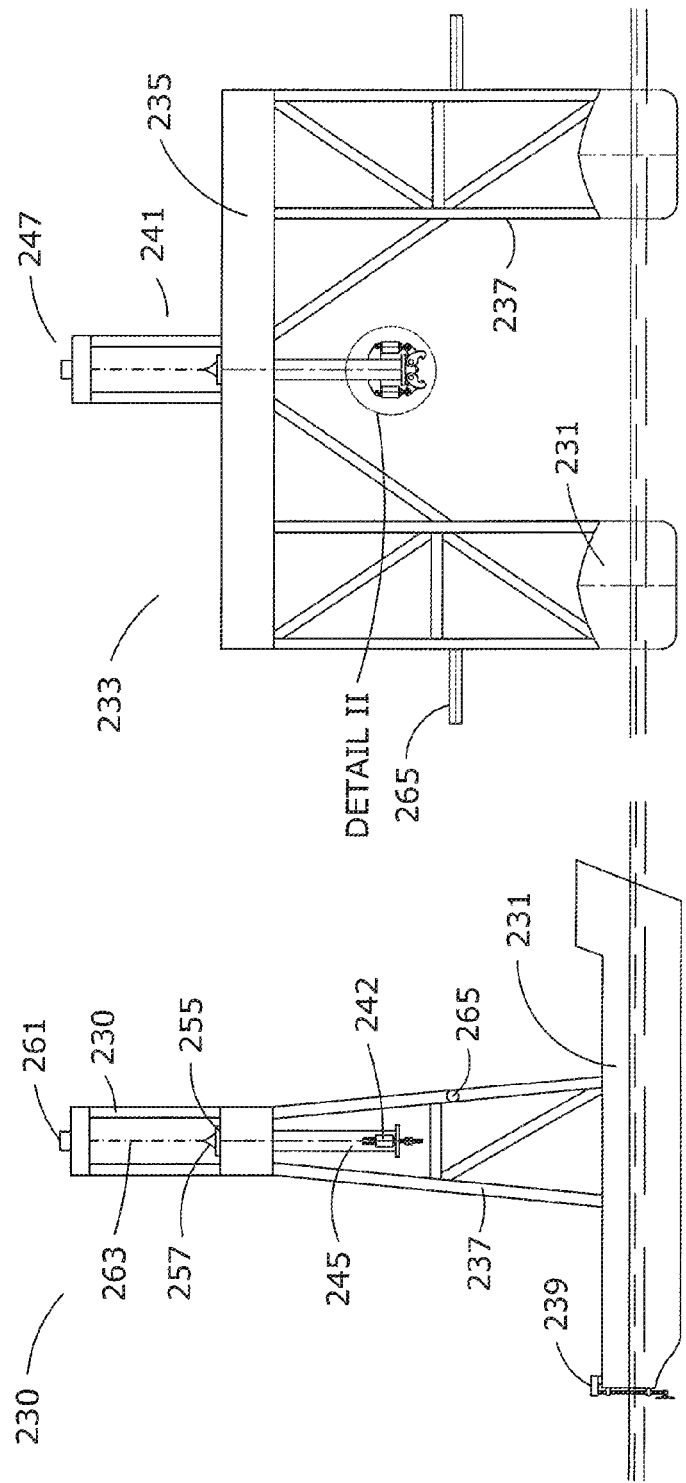
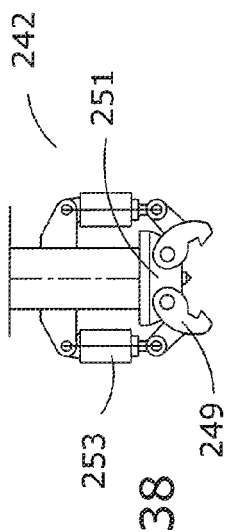
Fig. 37
Fig. 38
Fig. 36

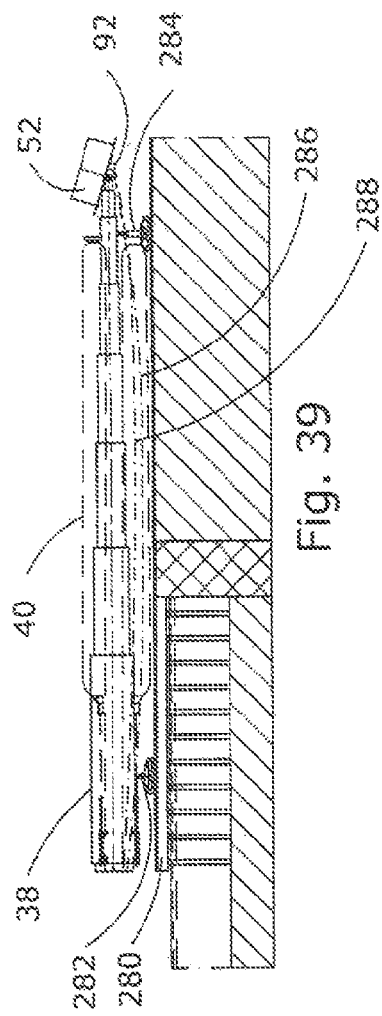
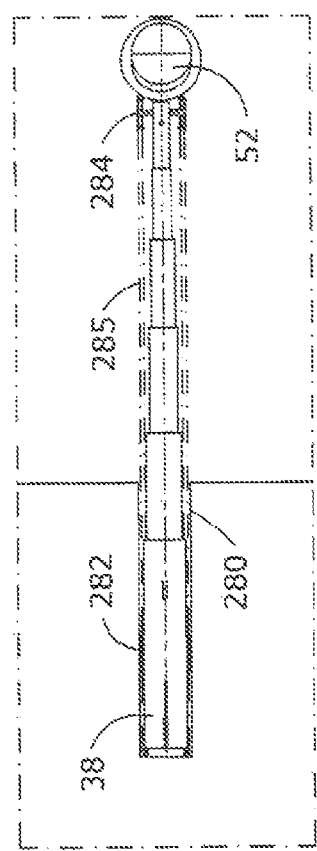
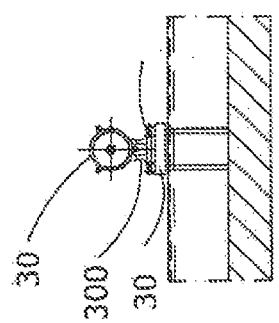

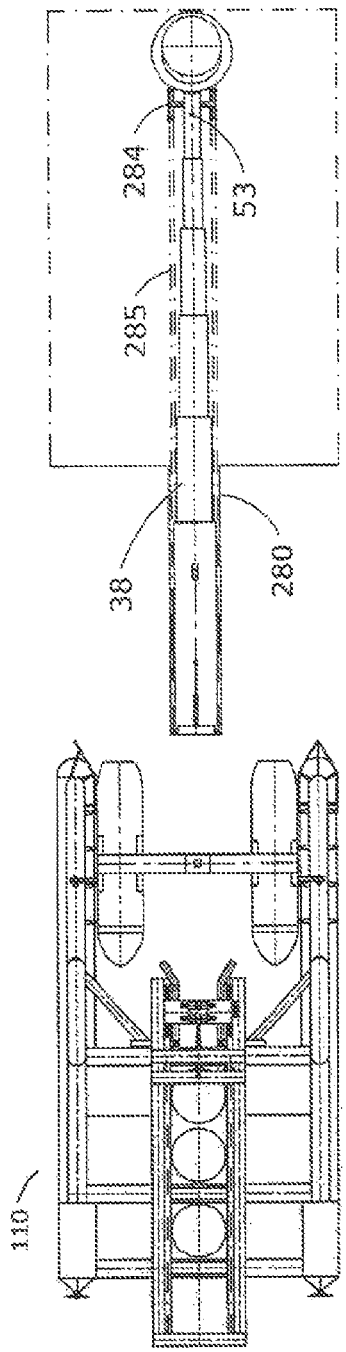
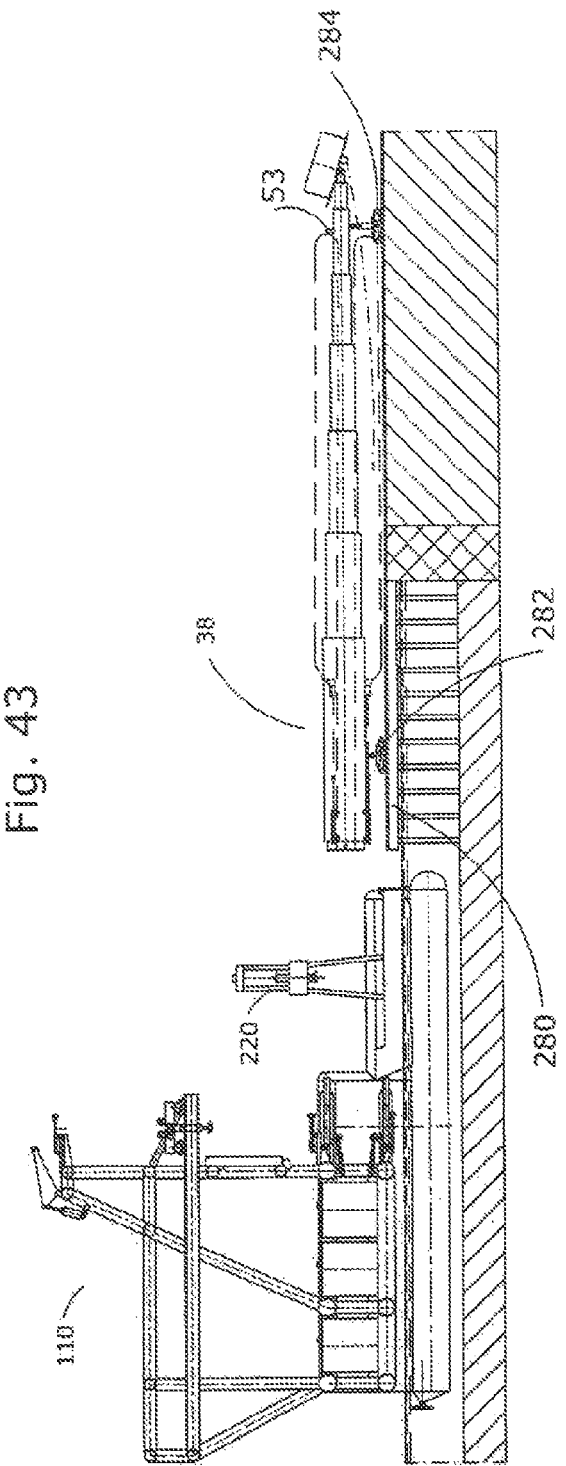
Fig. 43
Fig. 42

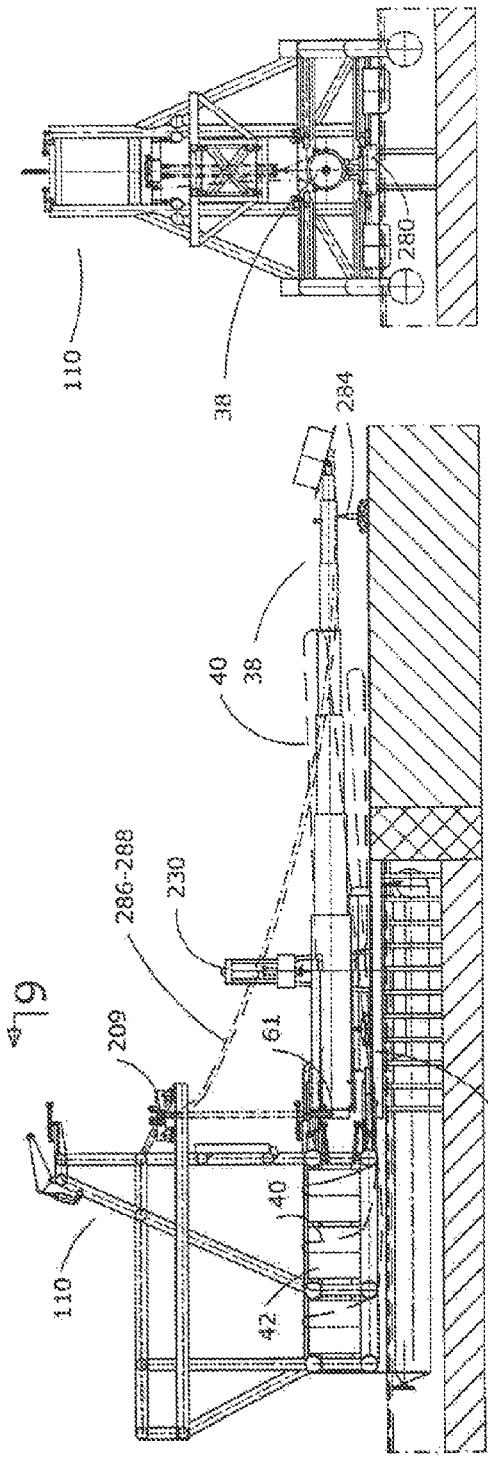
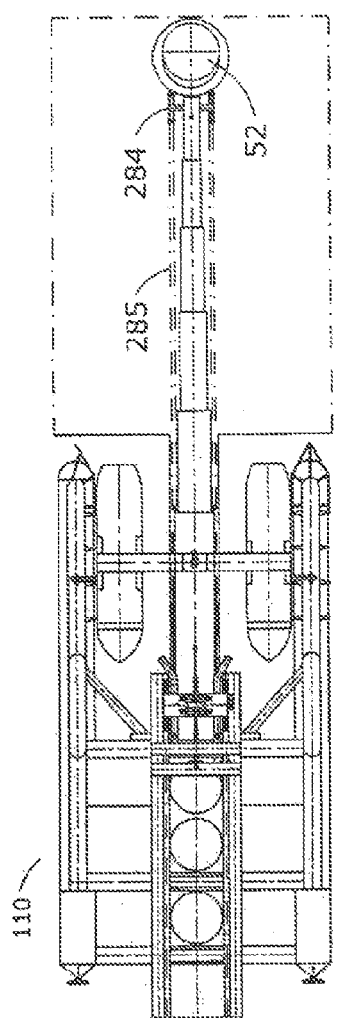
Fig. 46
Fig. 44
Fig. 45

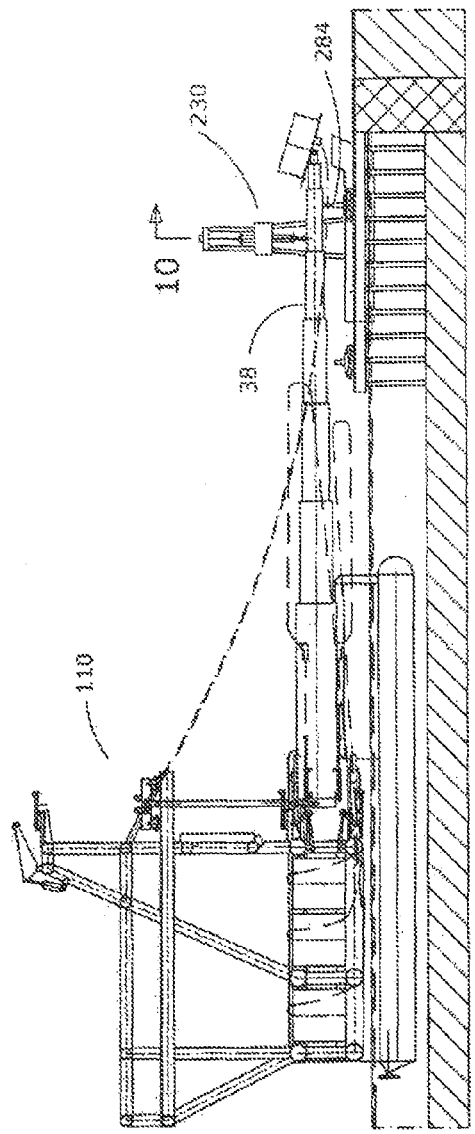
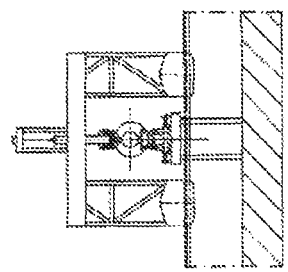
Fig. 47
Fig. 48
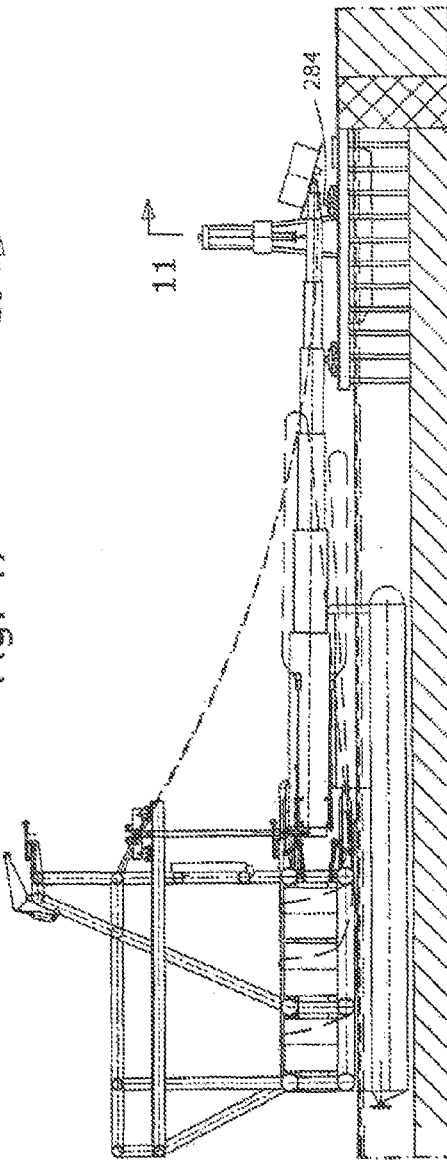
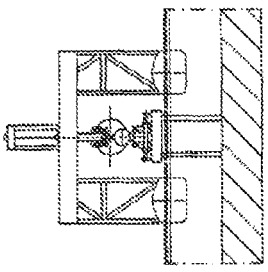
Fig. 49
Fig. 50

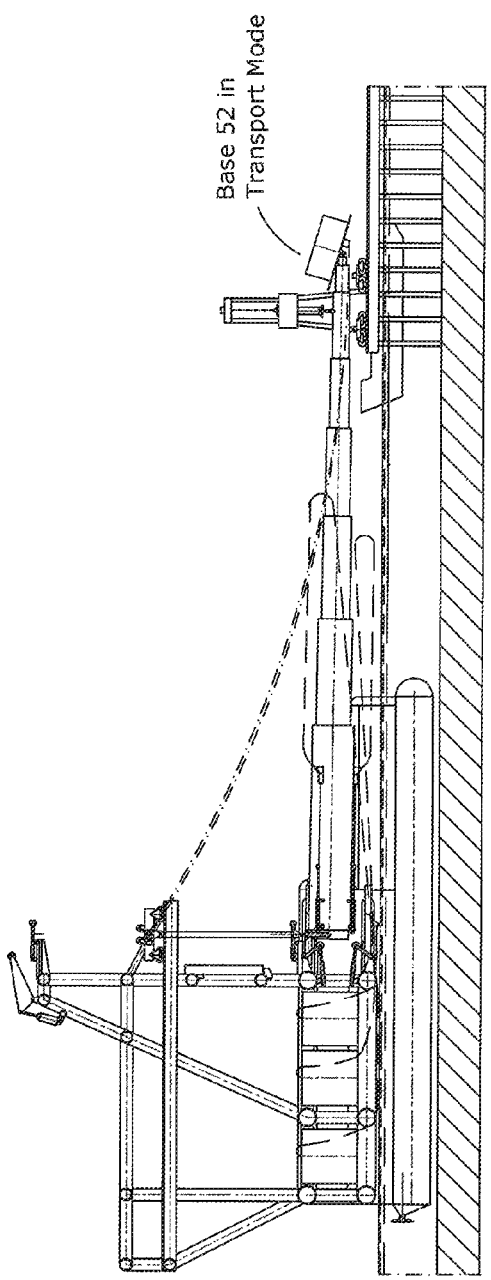
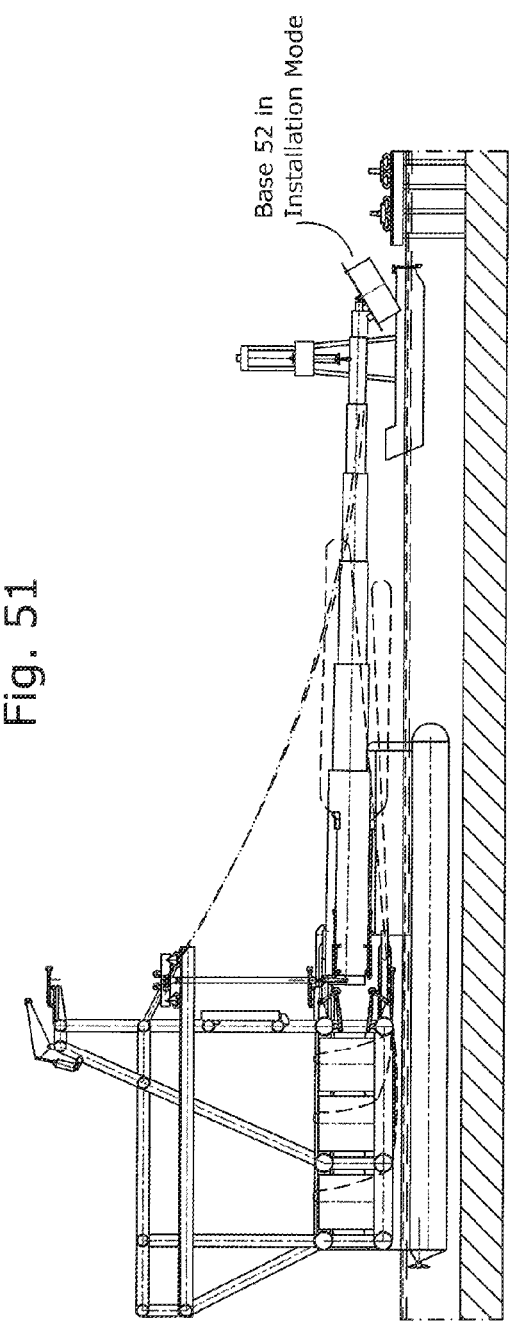

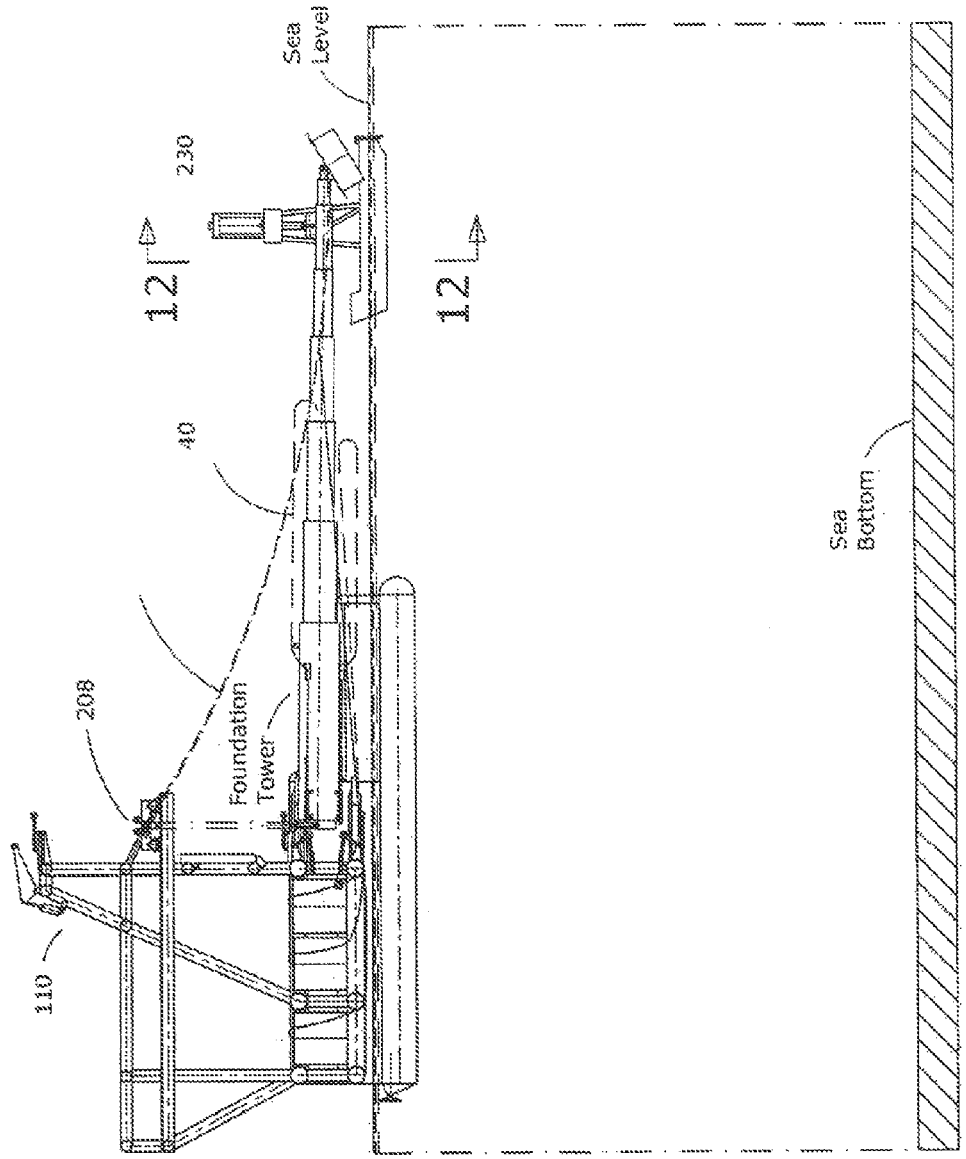

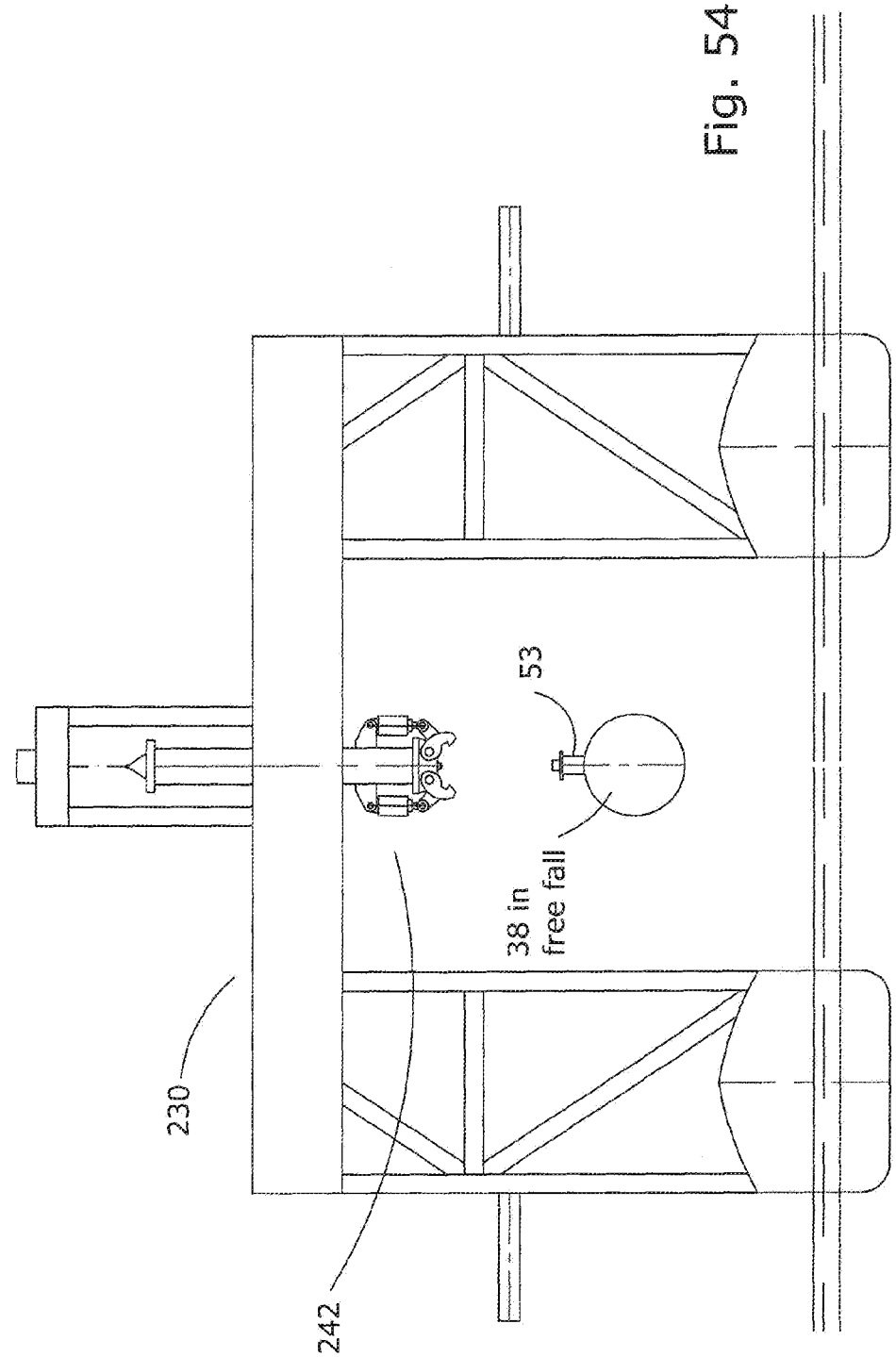

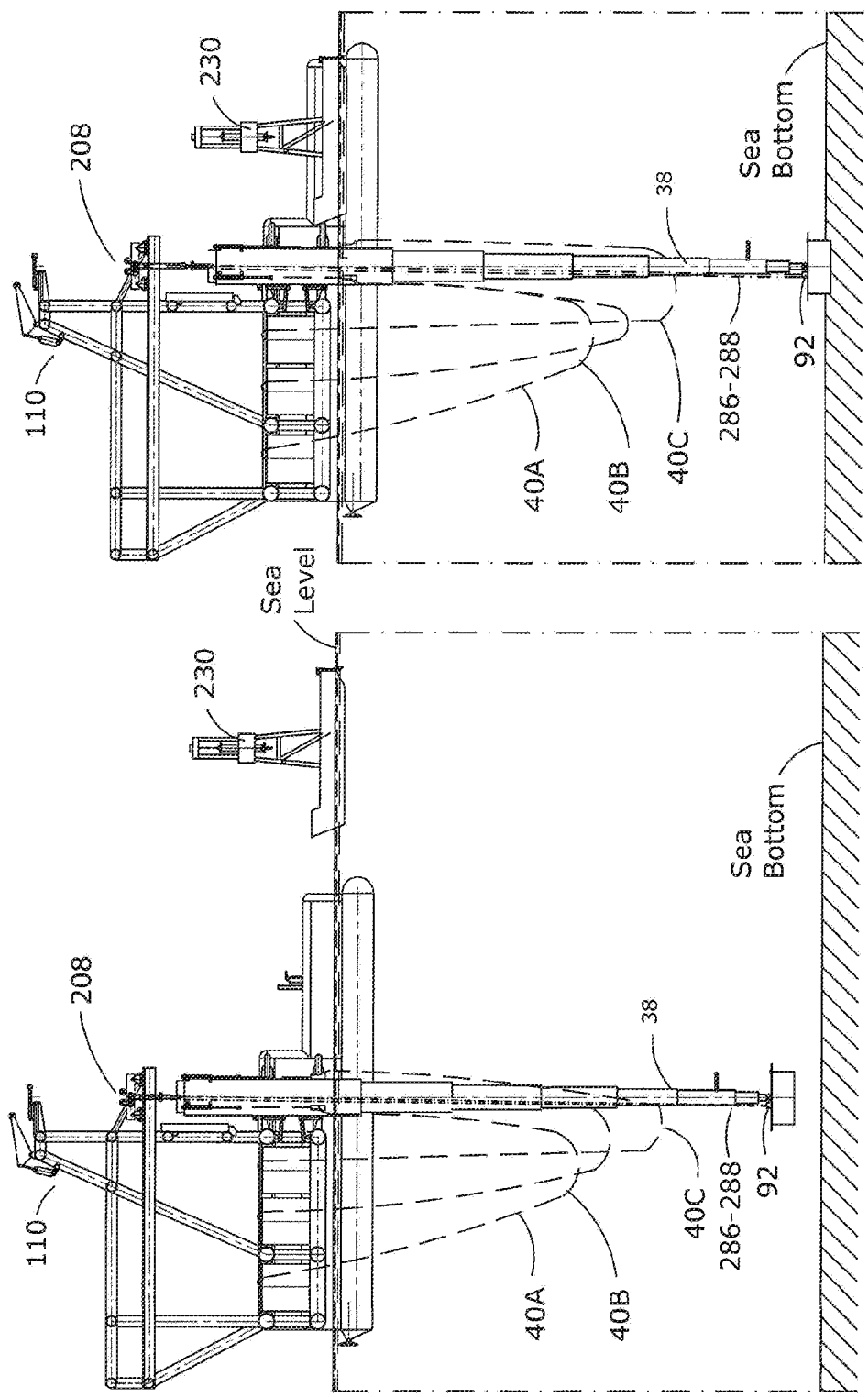

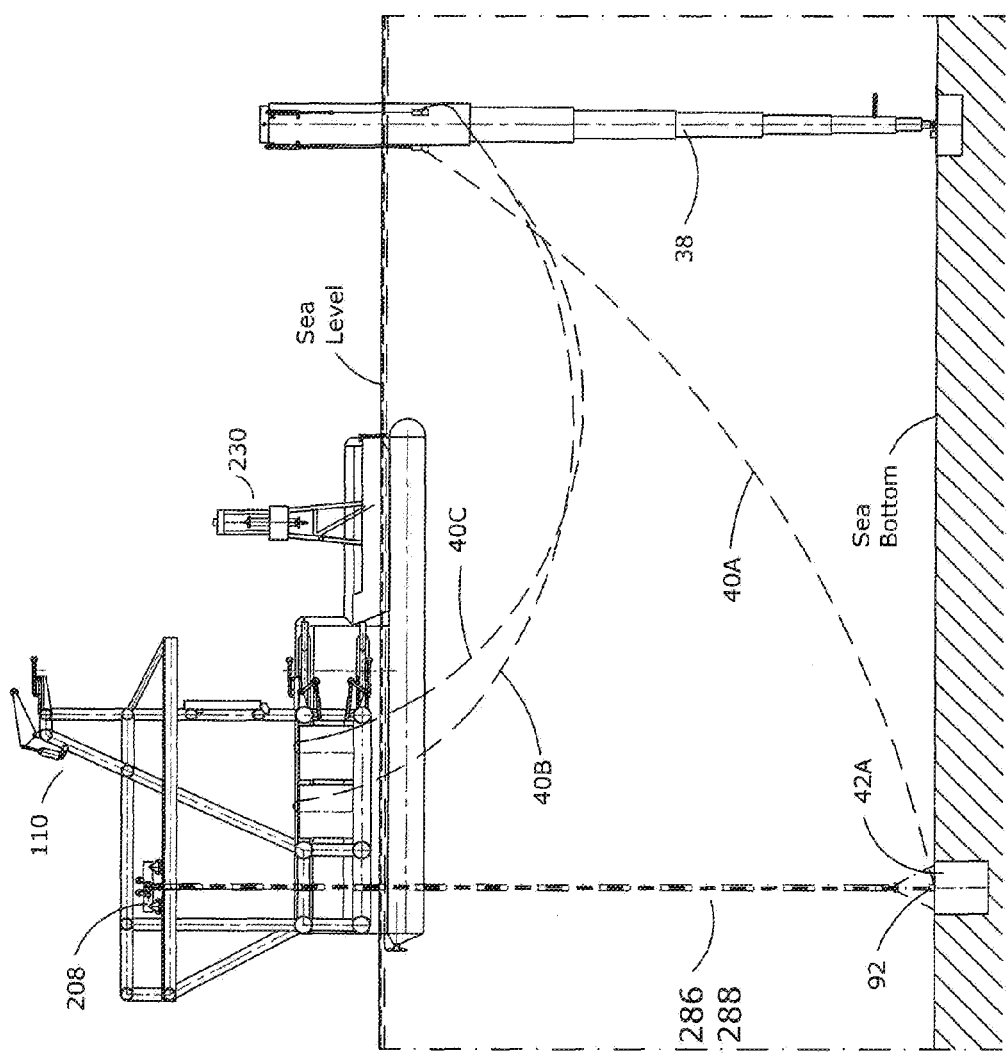

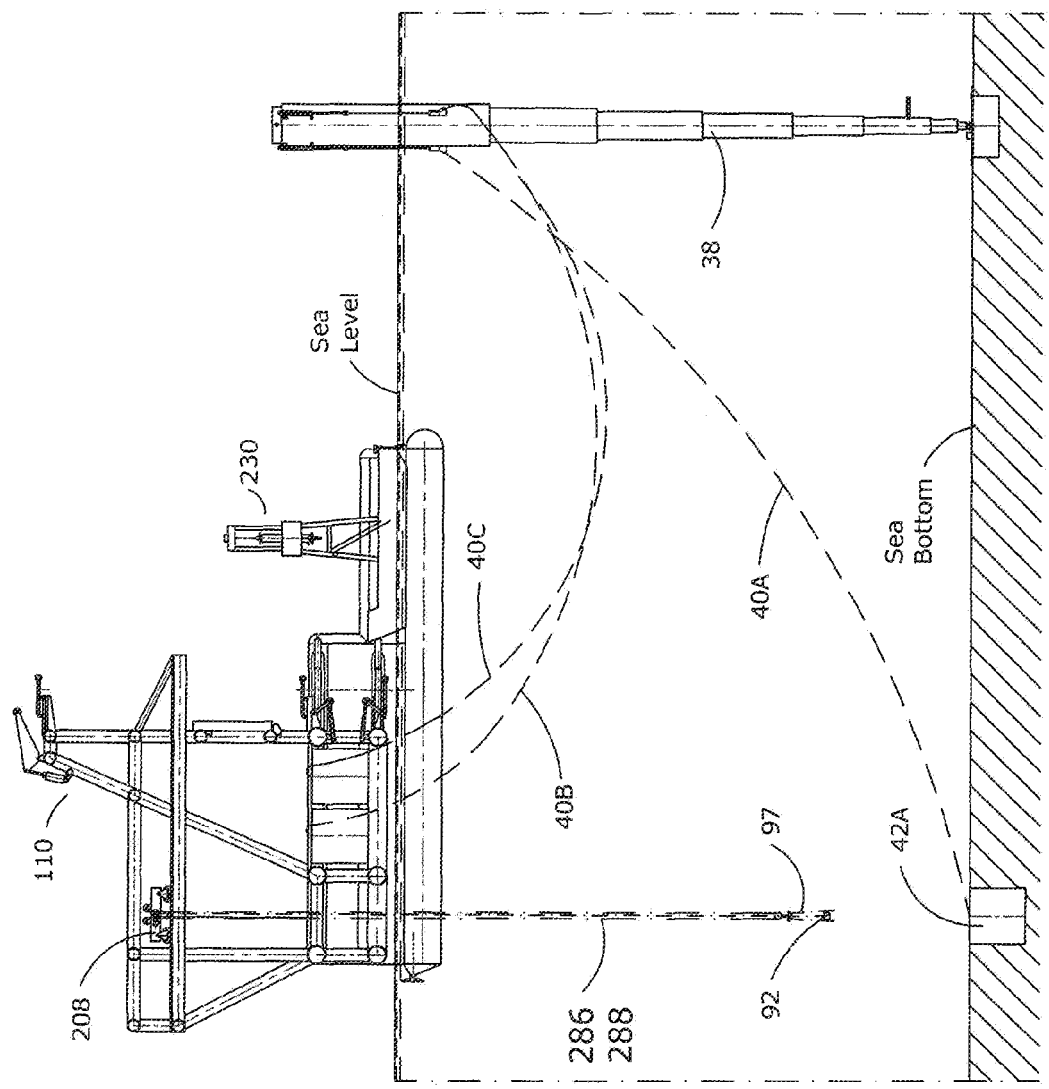

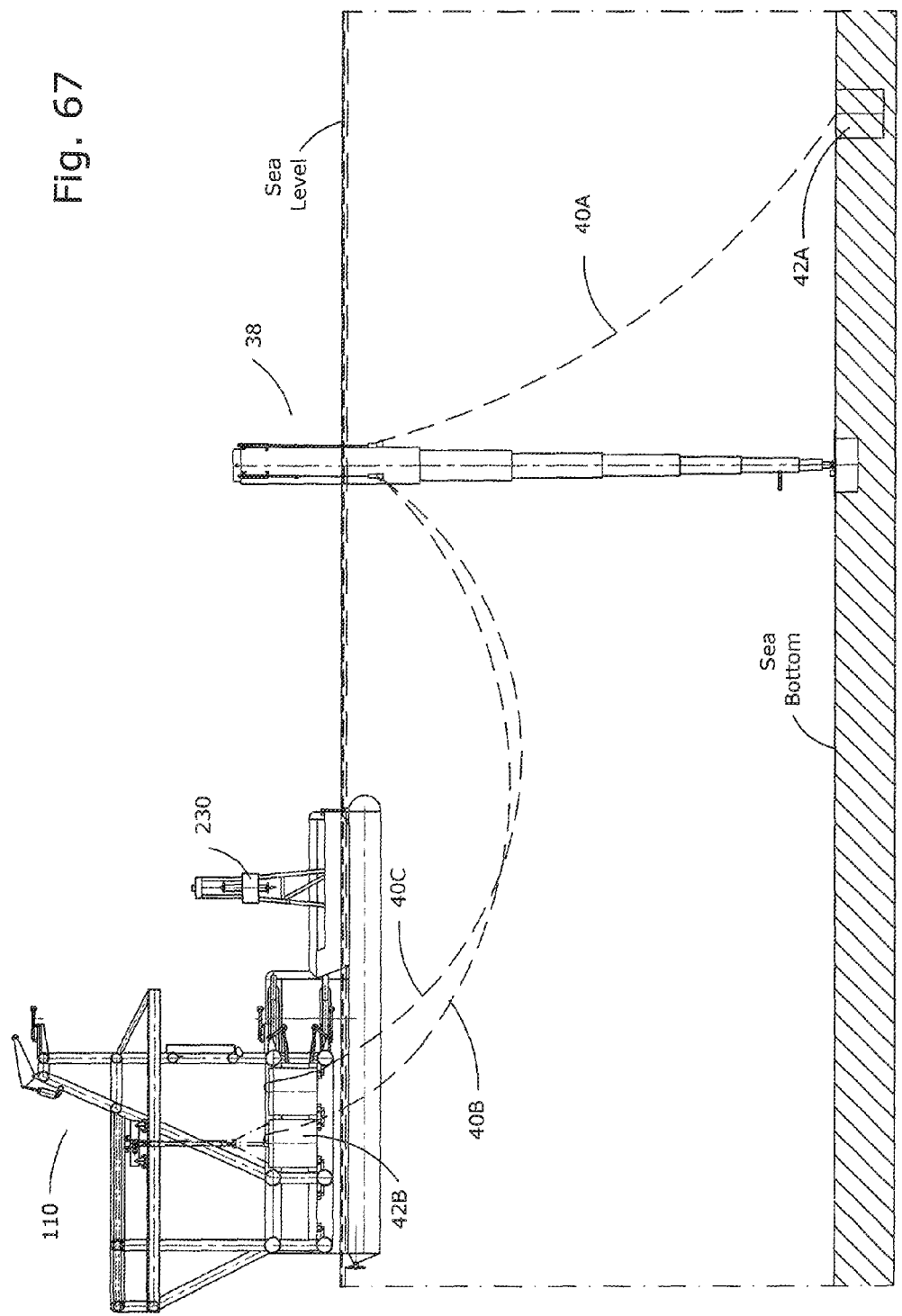

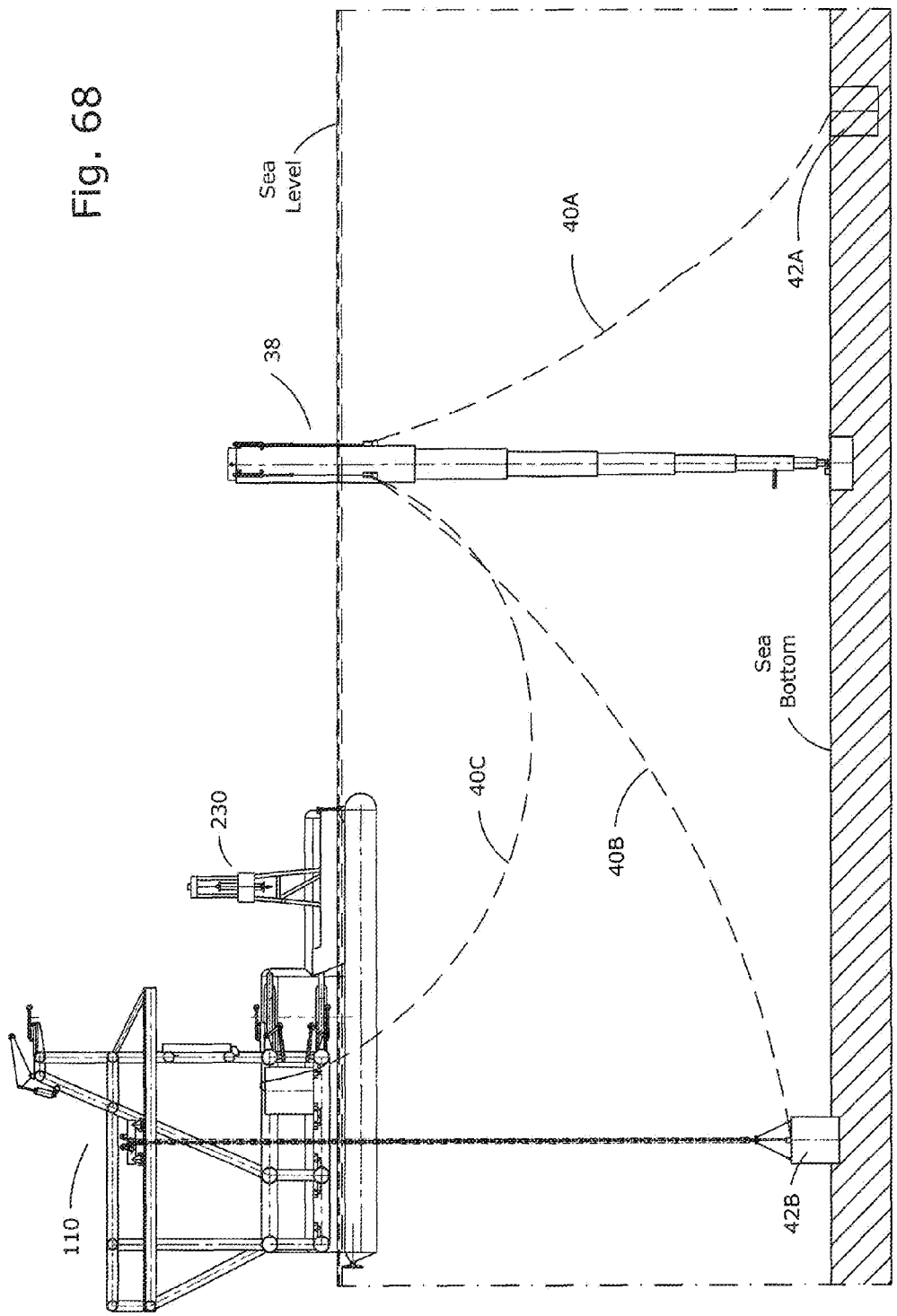

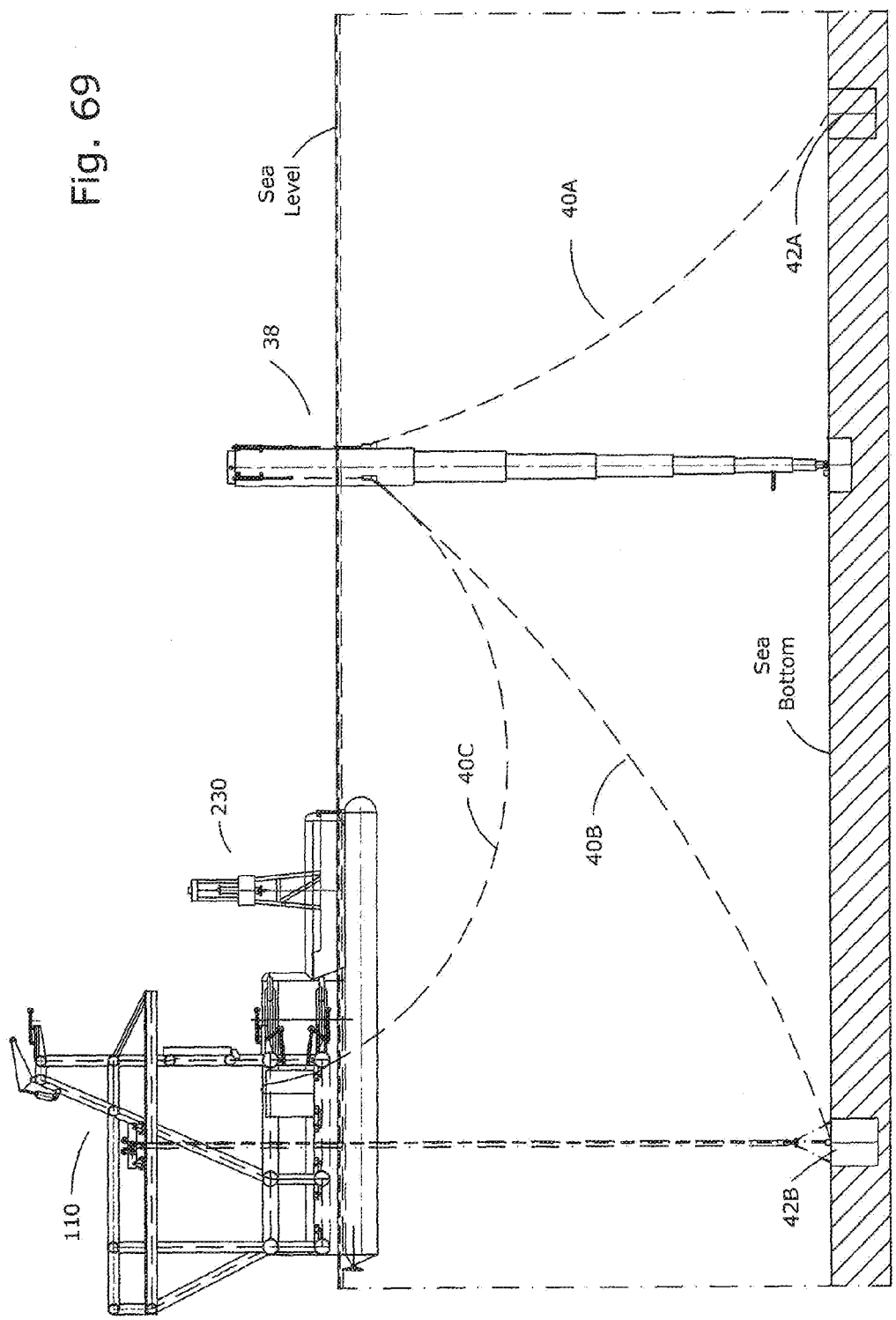

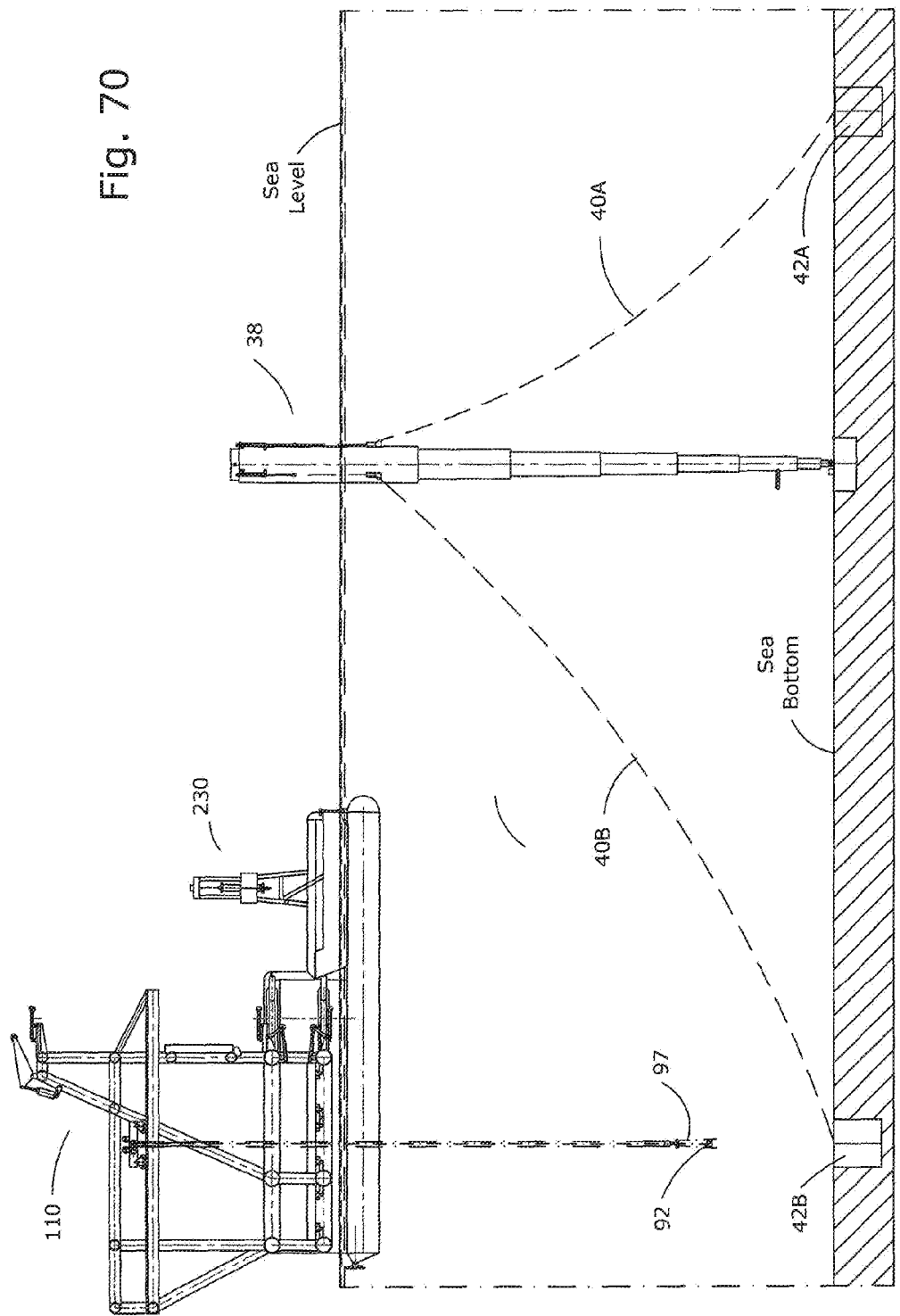

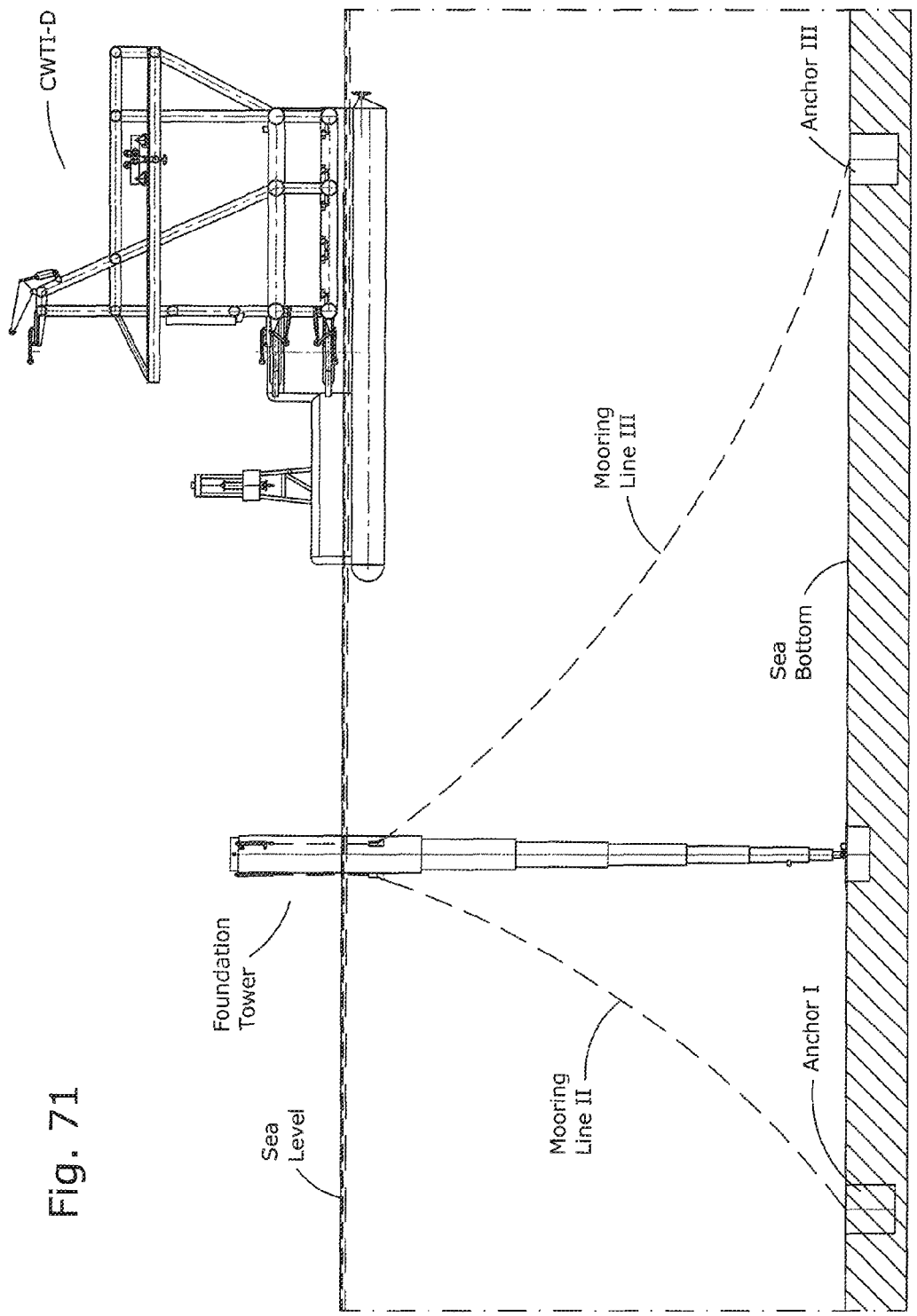

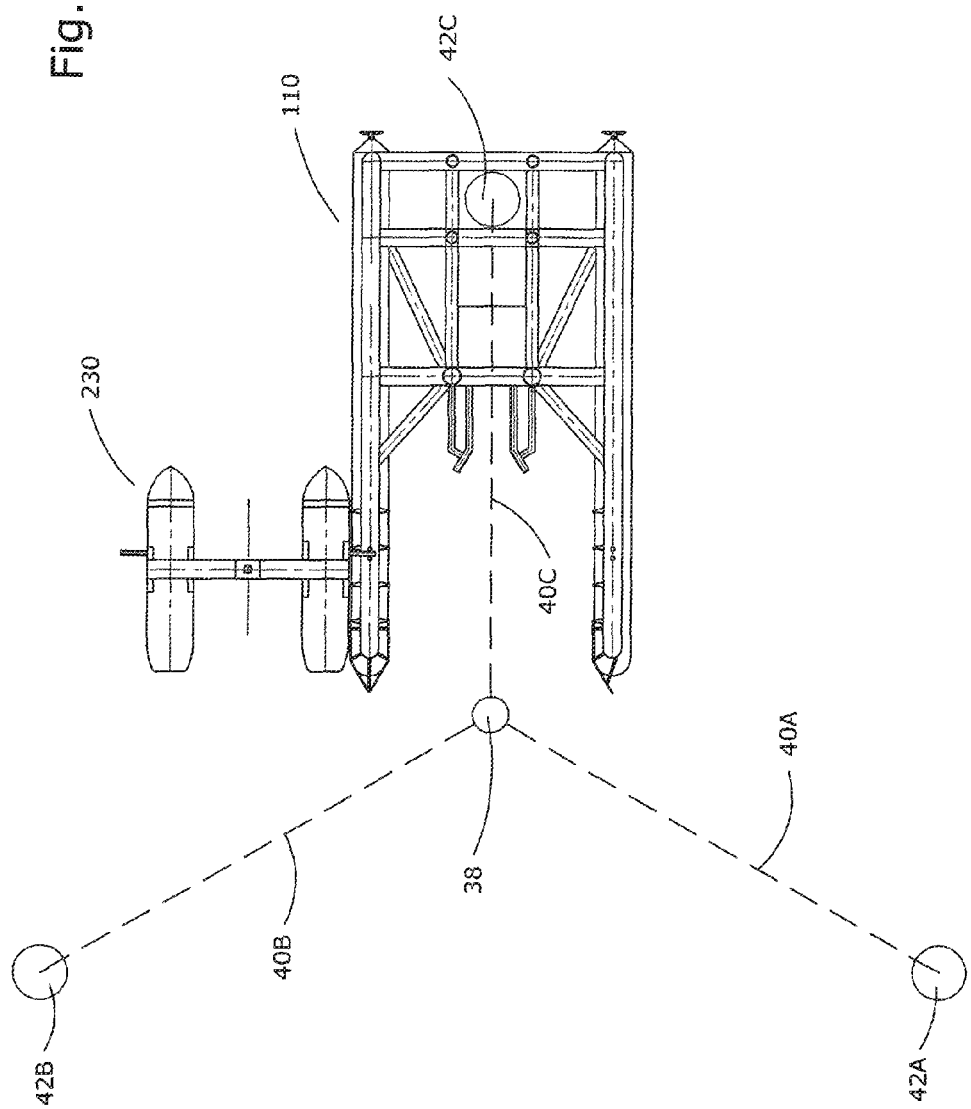

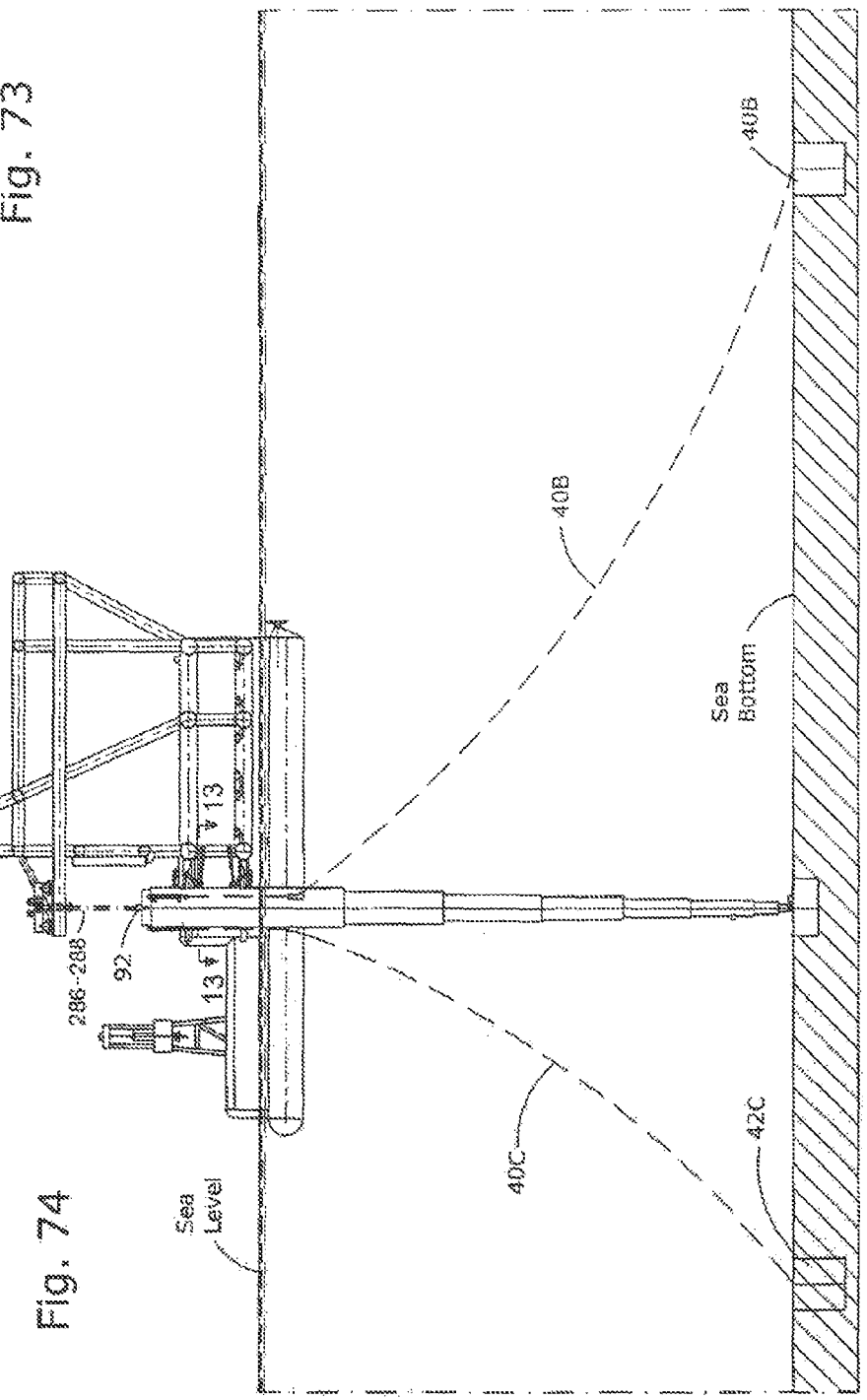

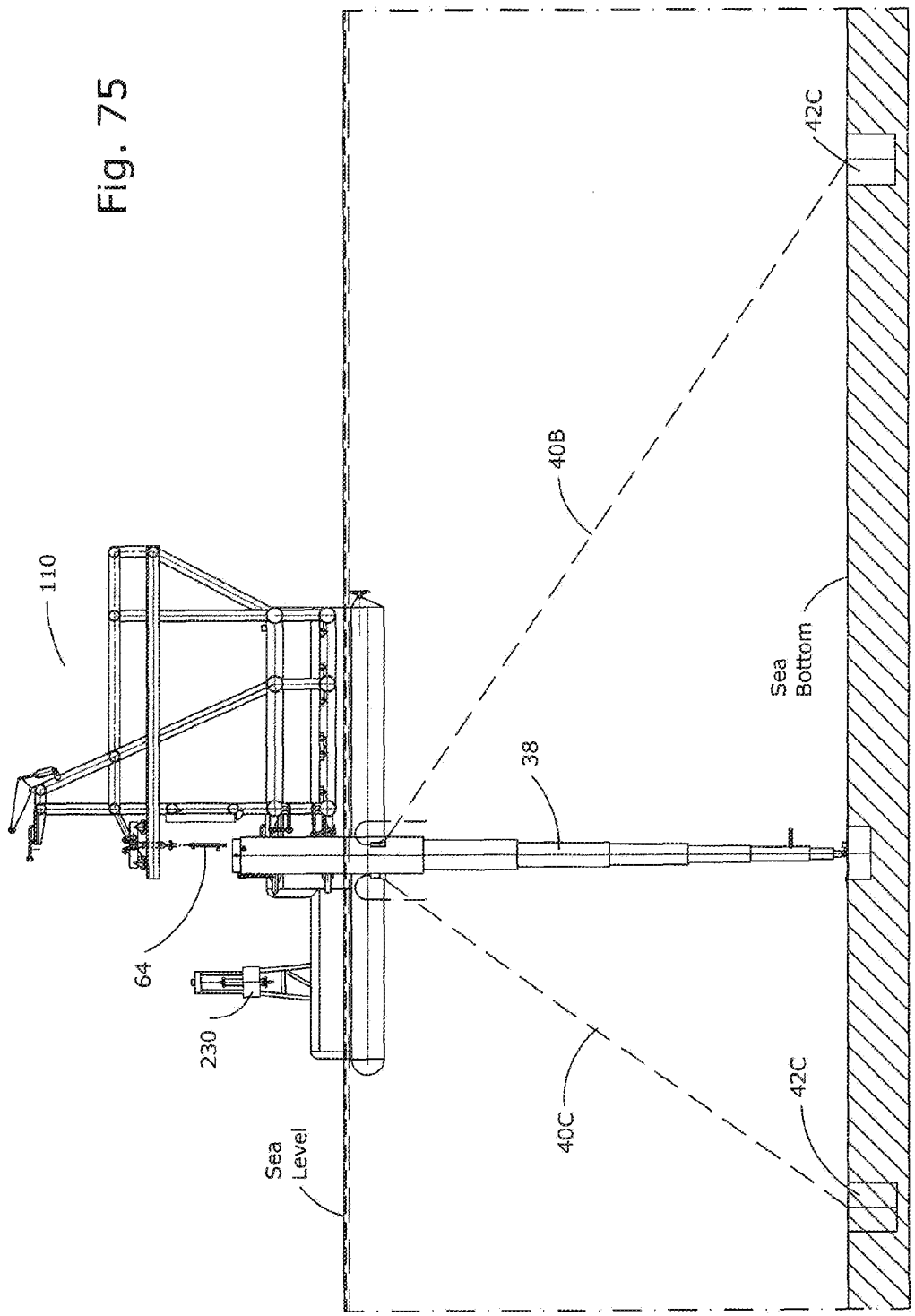

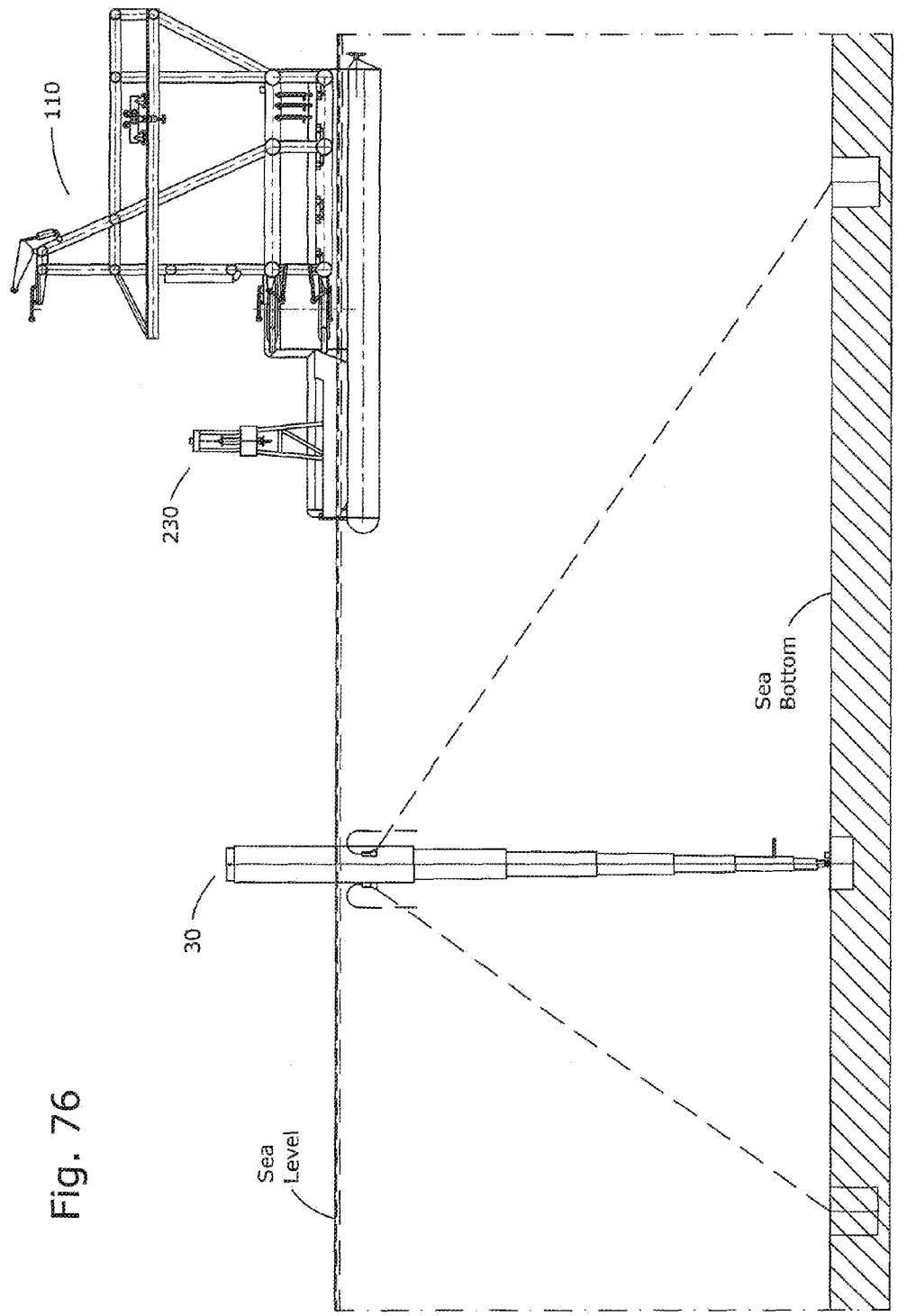

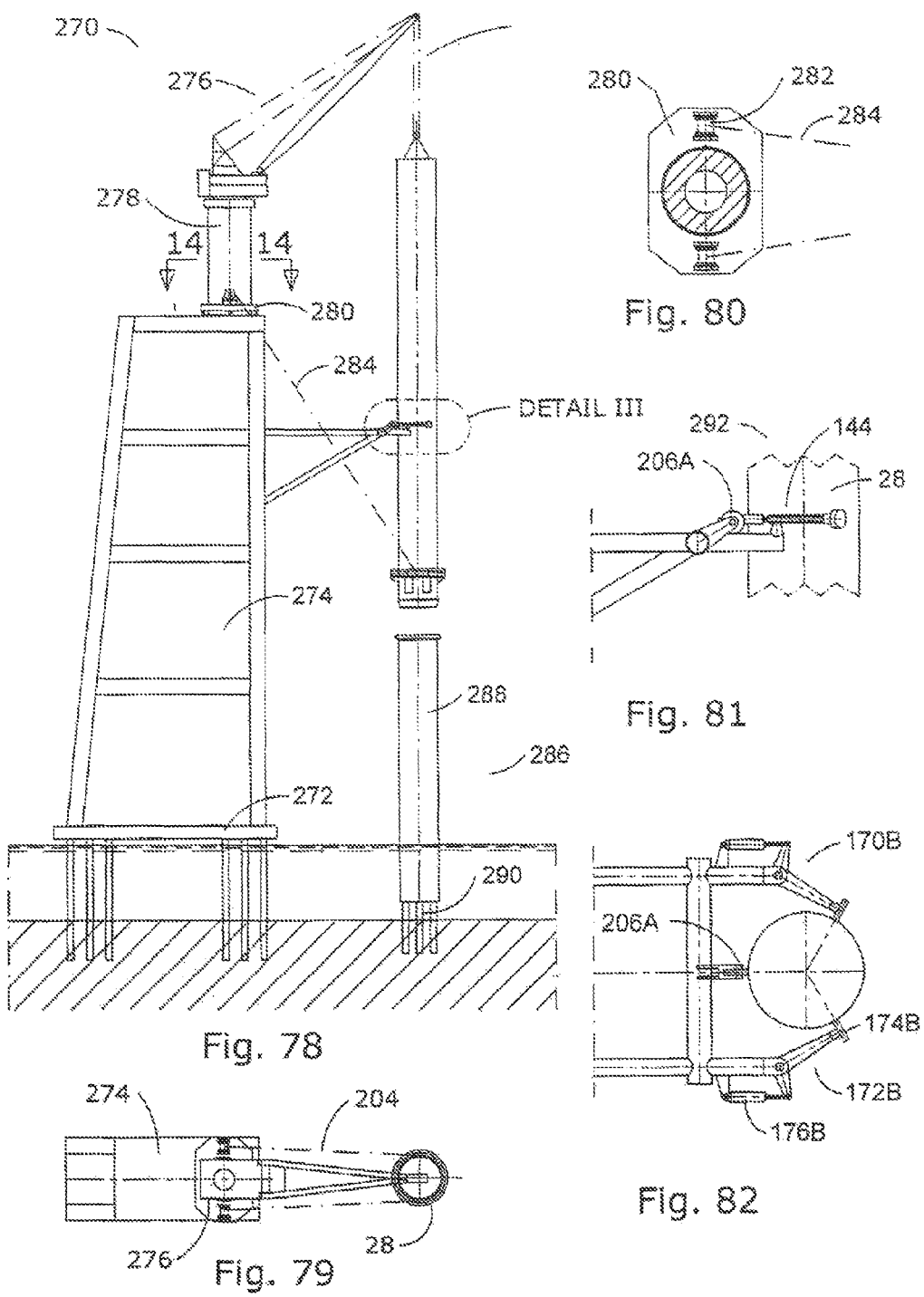

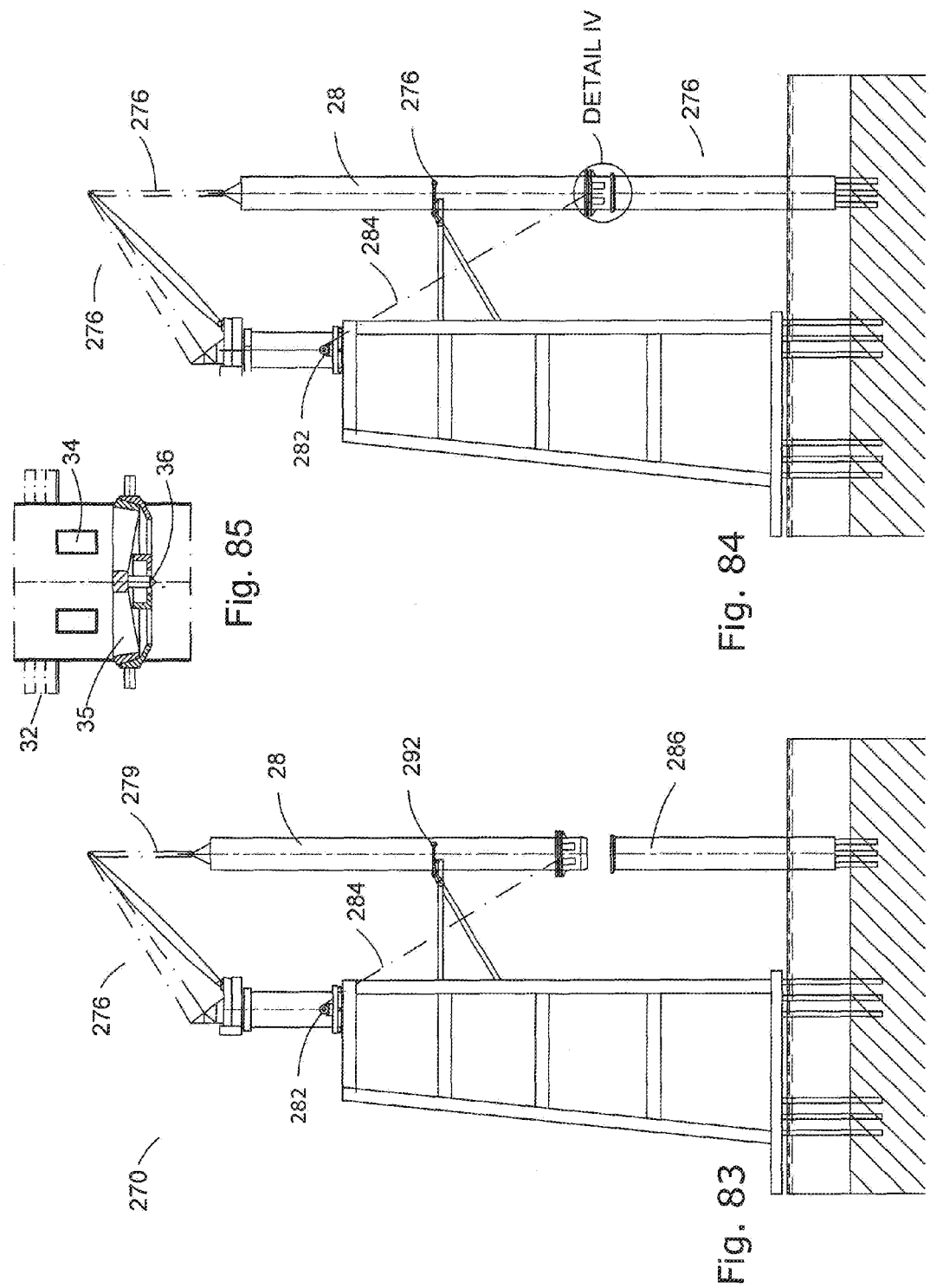

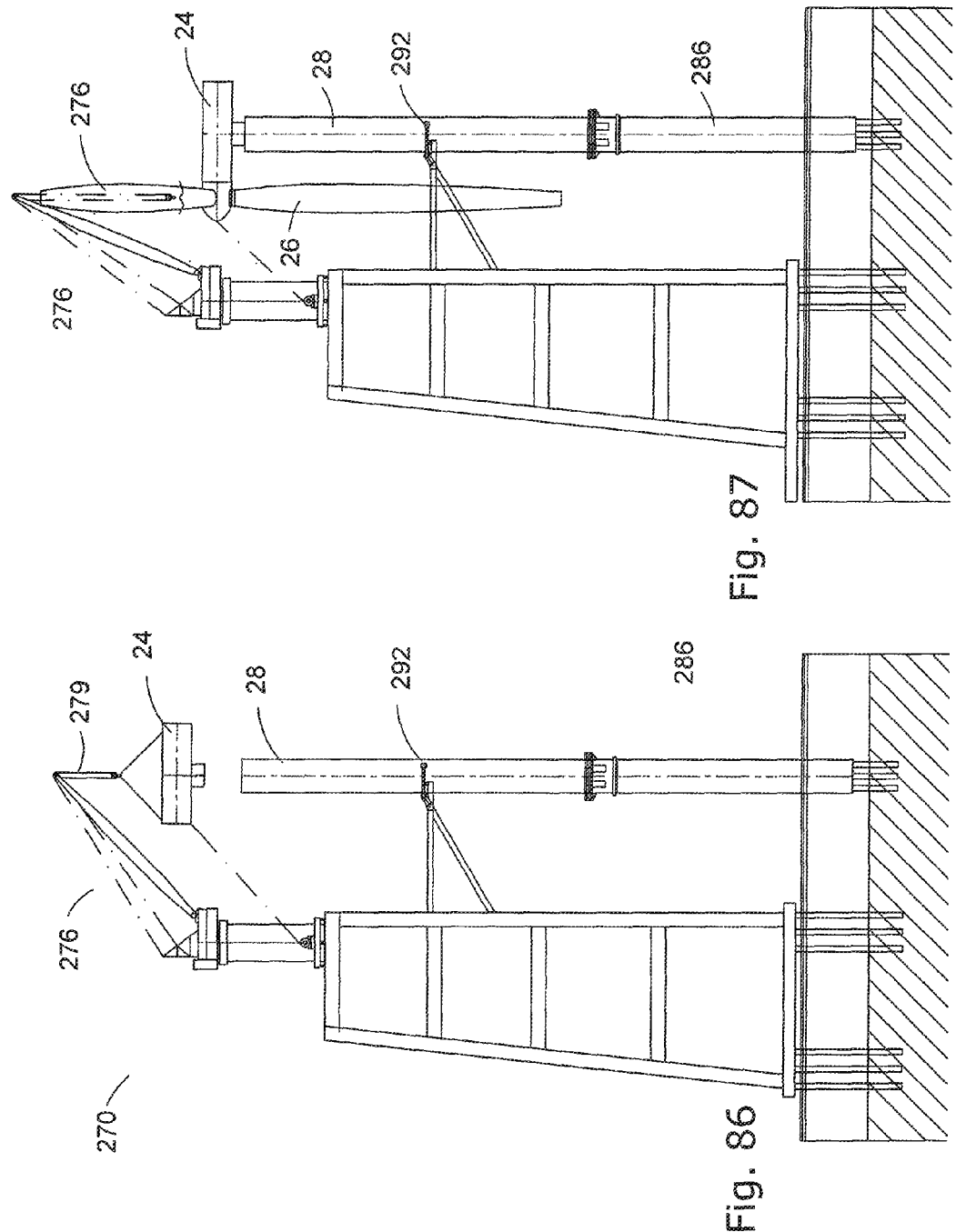

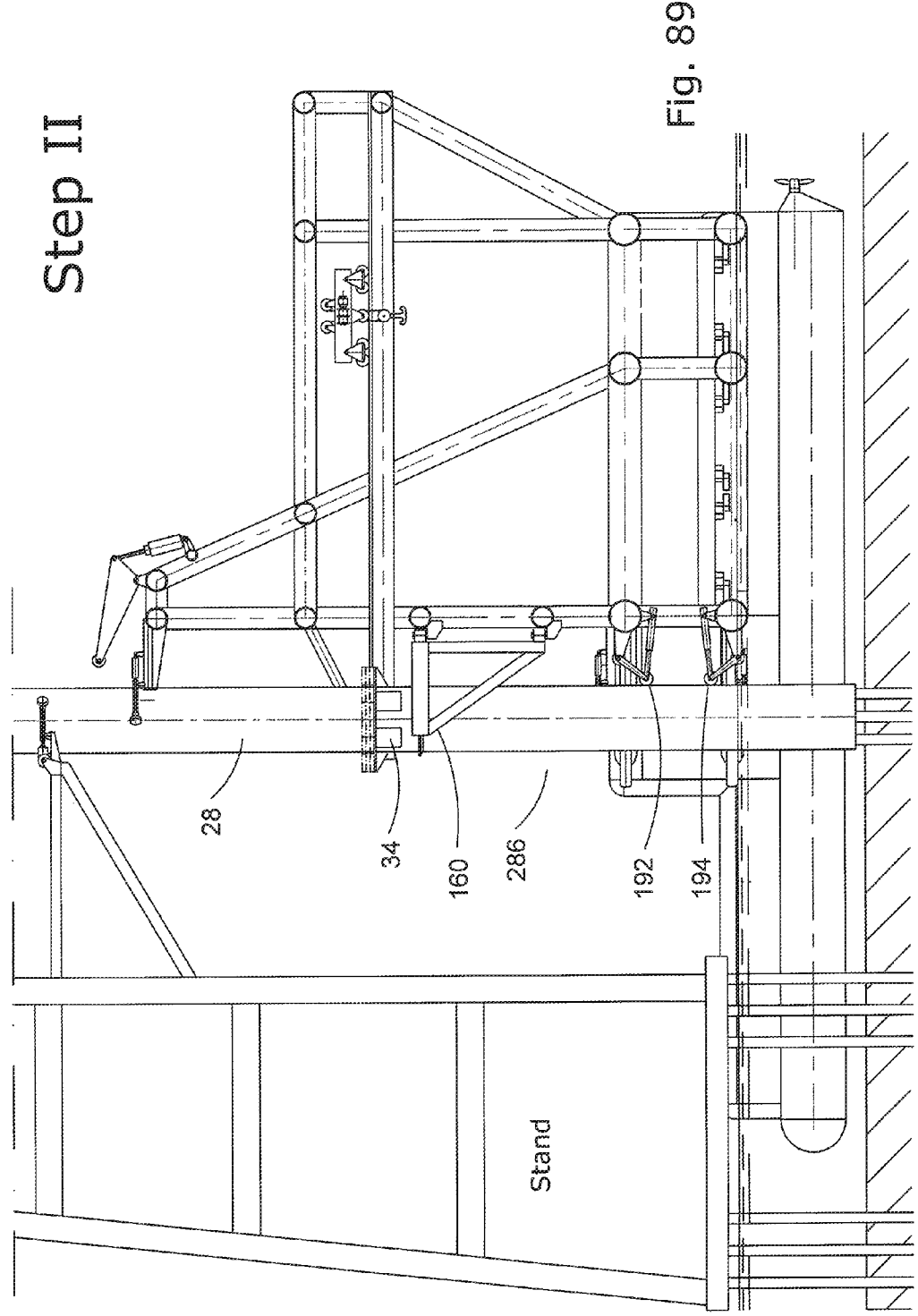

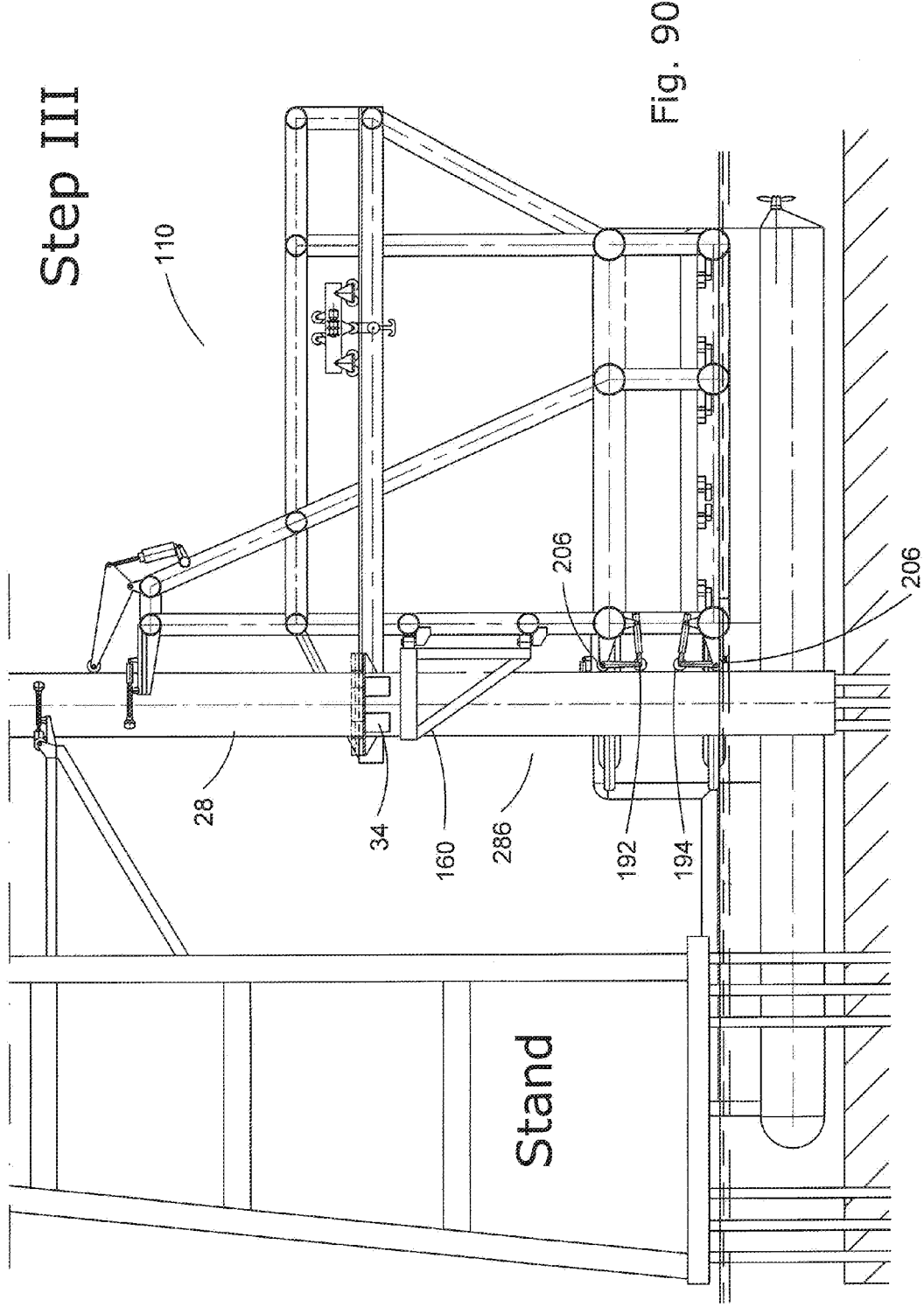

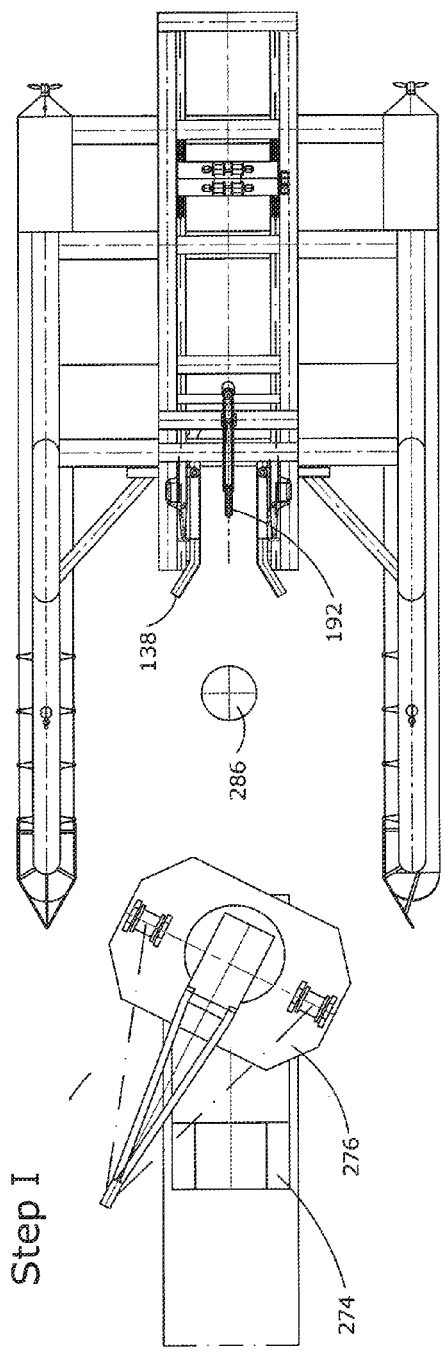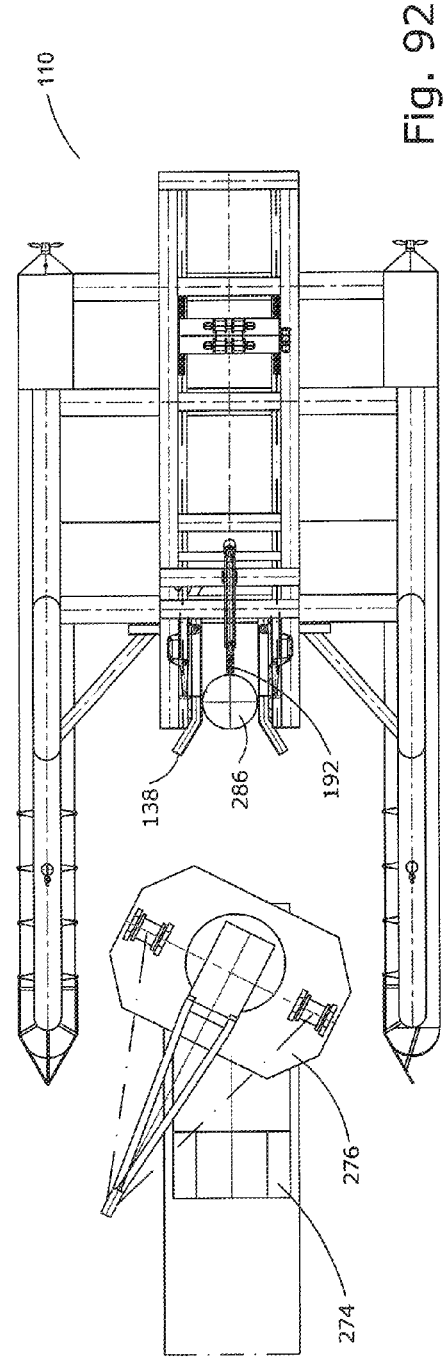

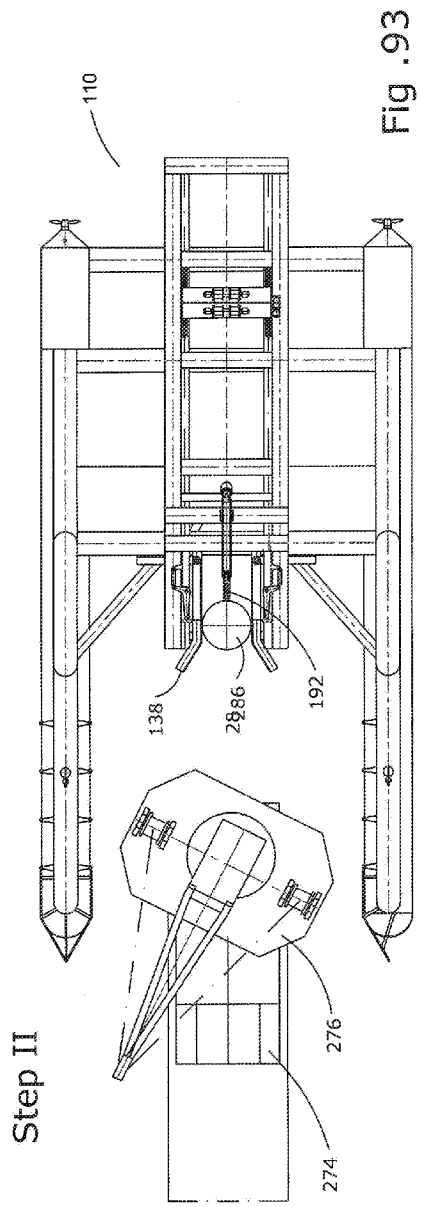
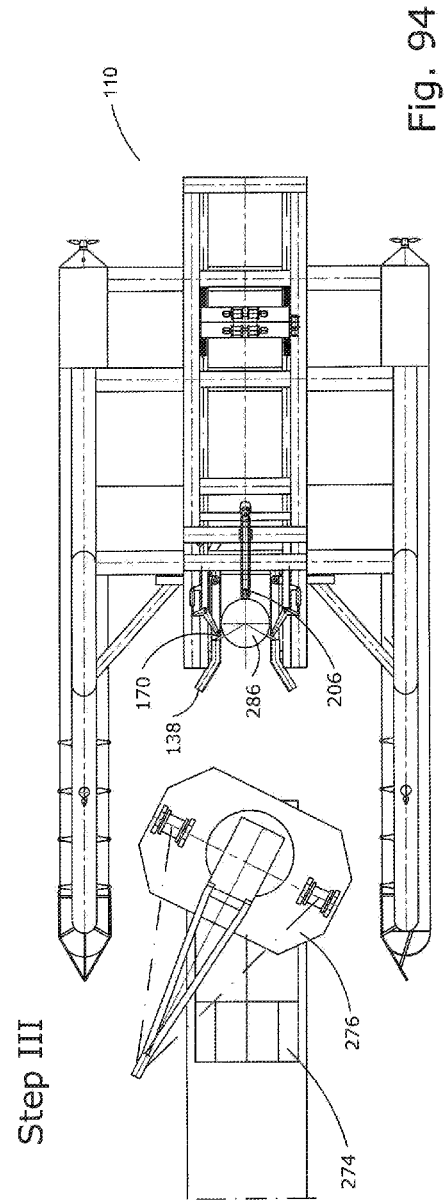

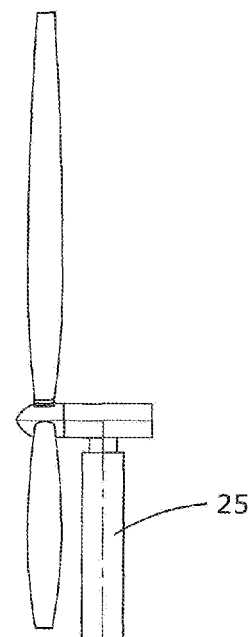
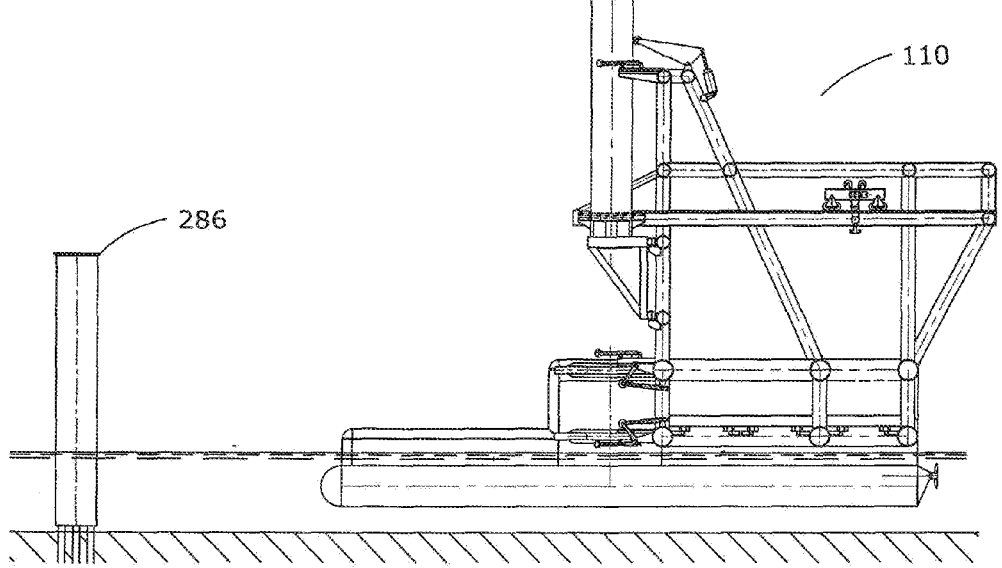
Step I
Fig. 97

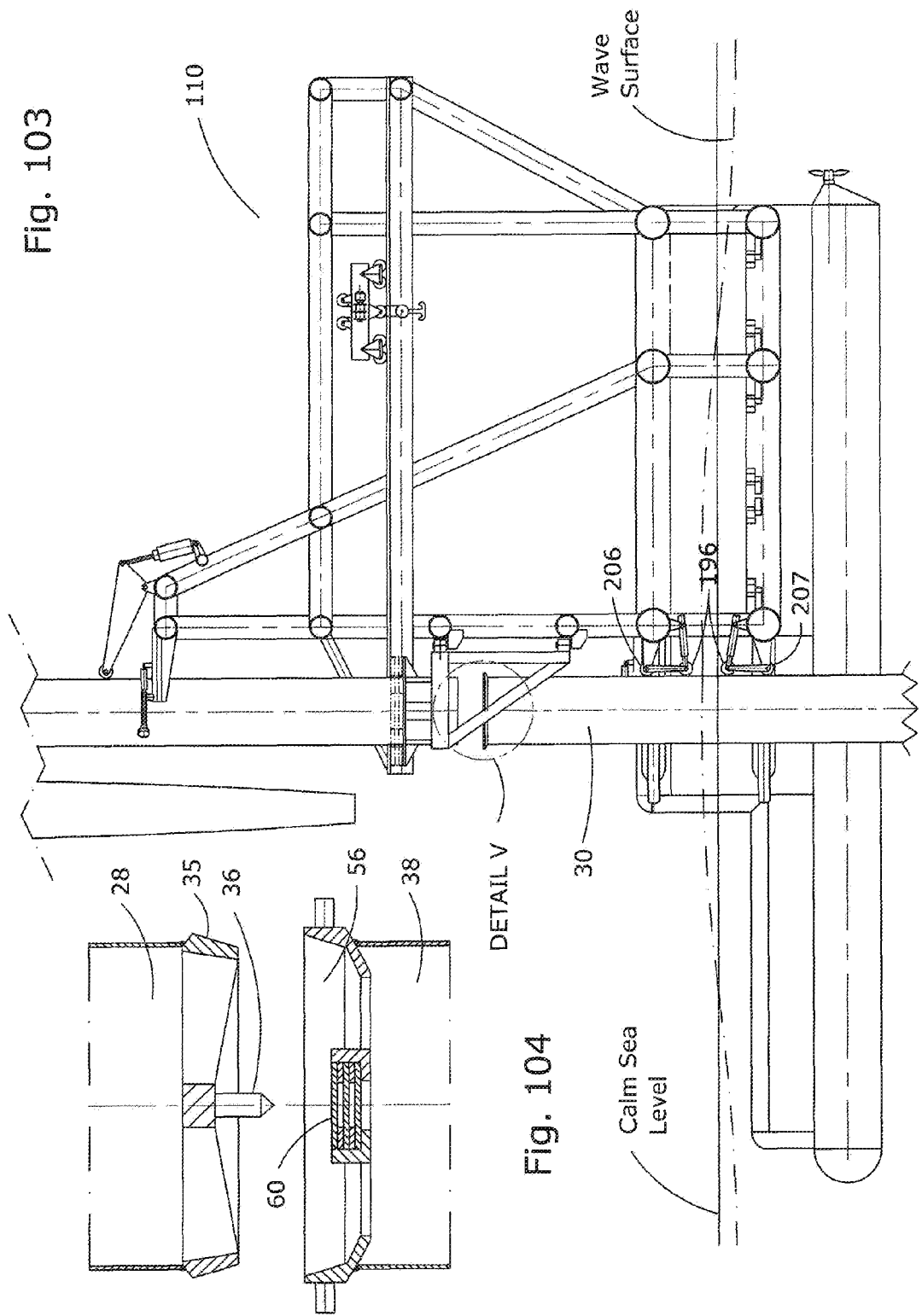

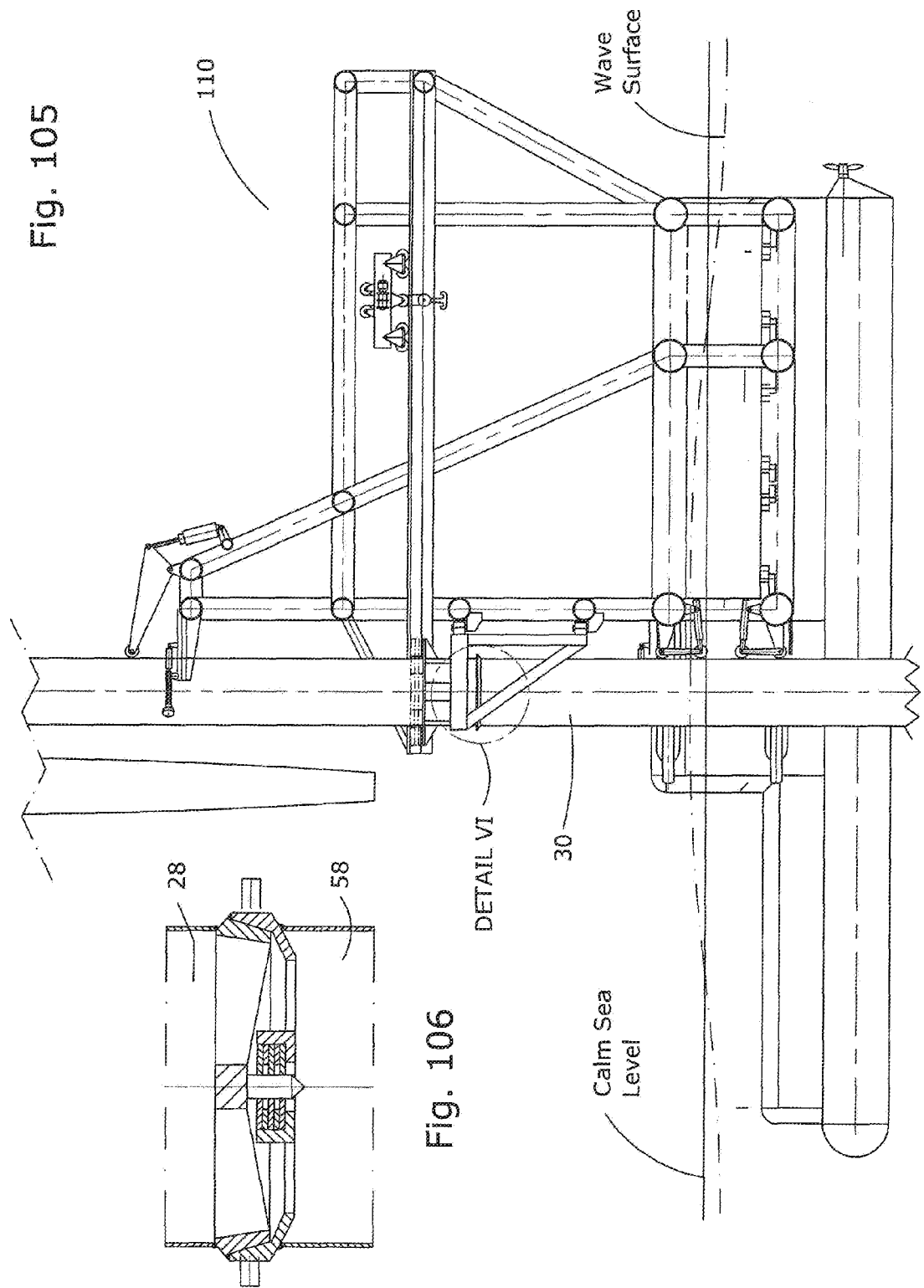

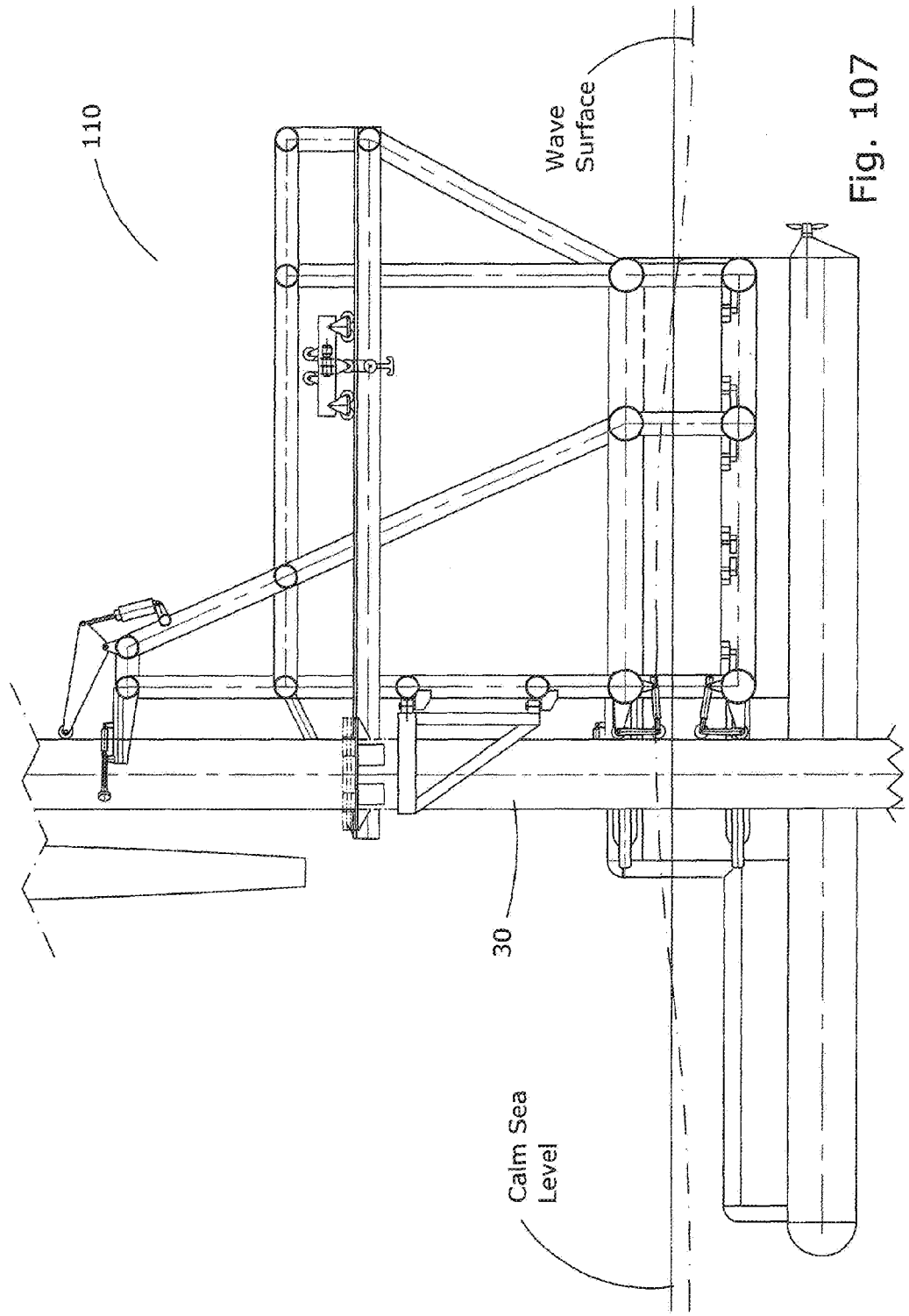

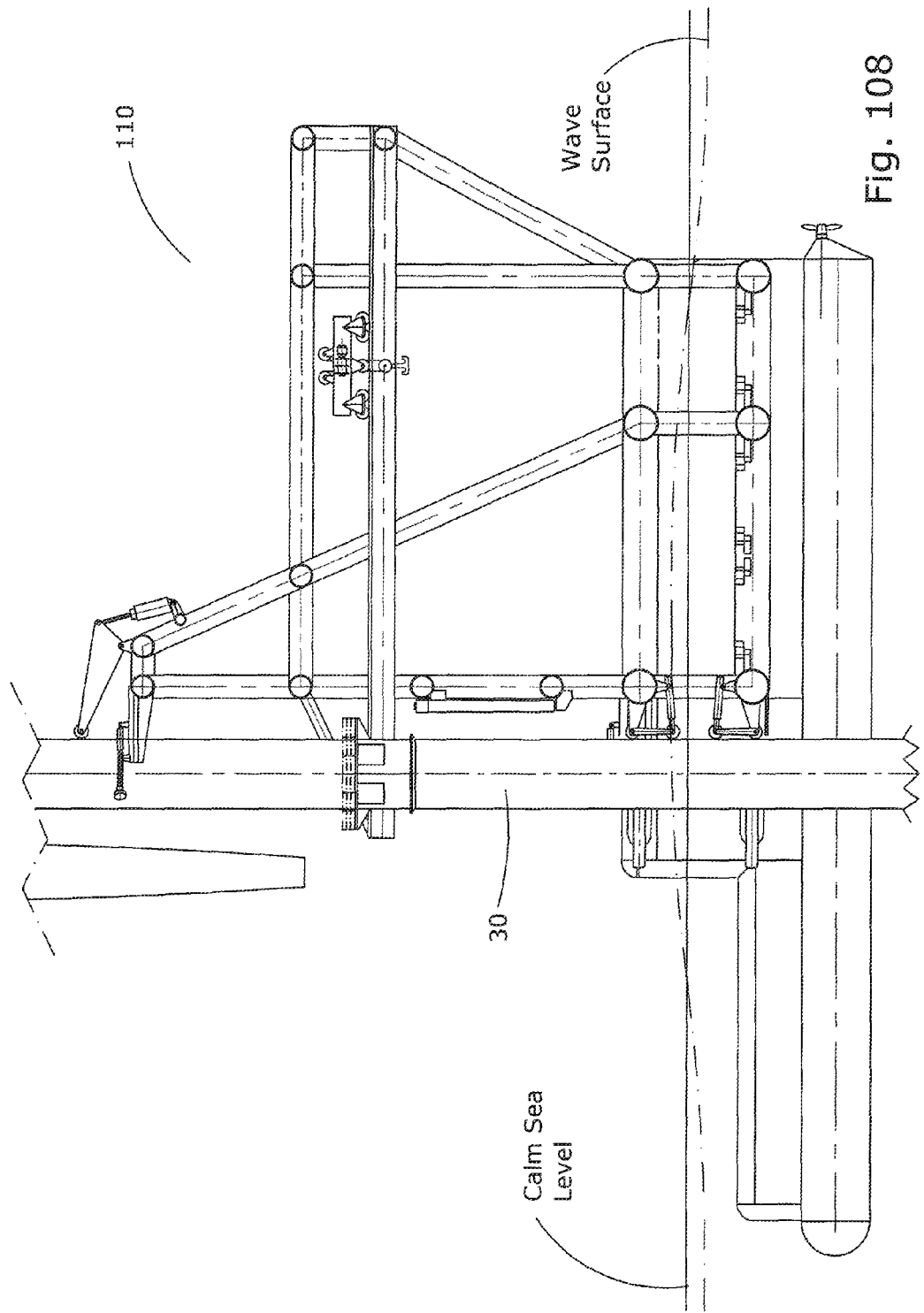

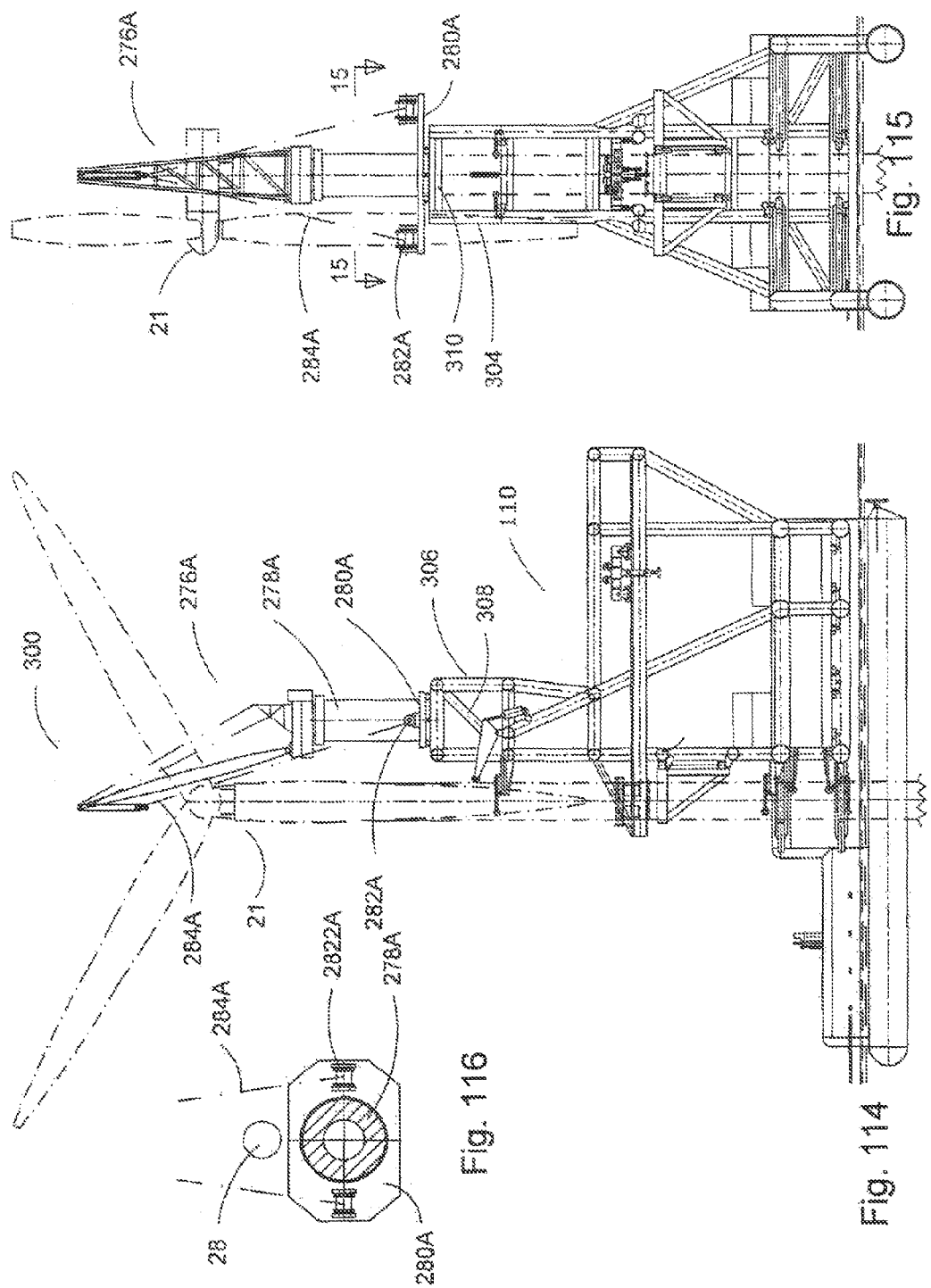

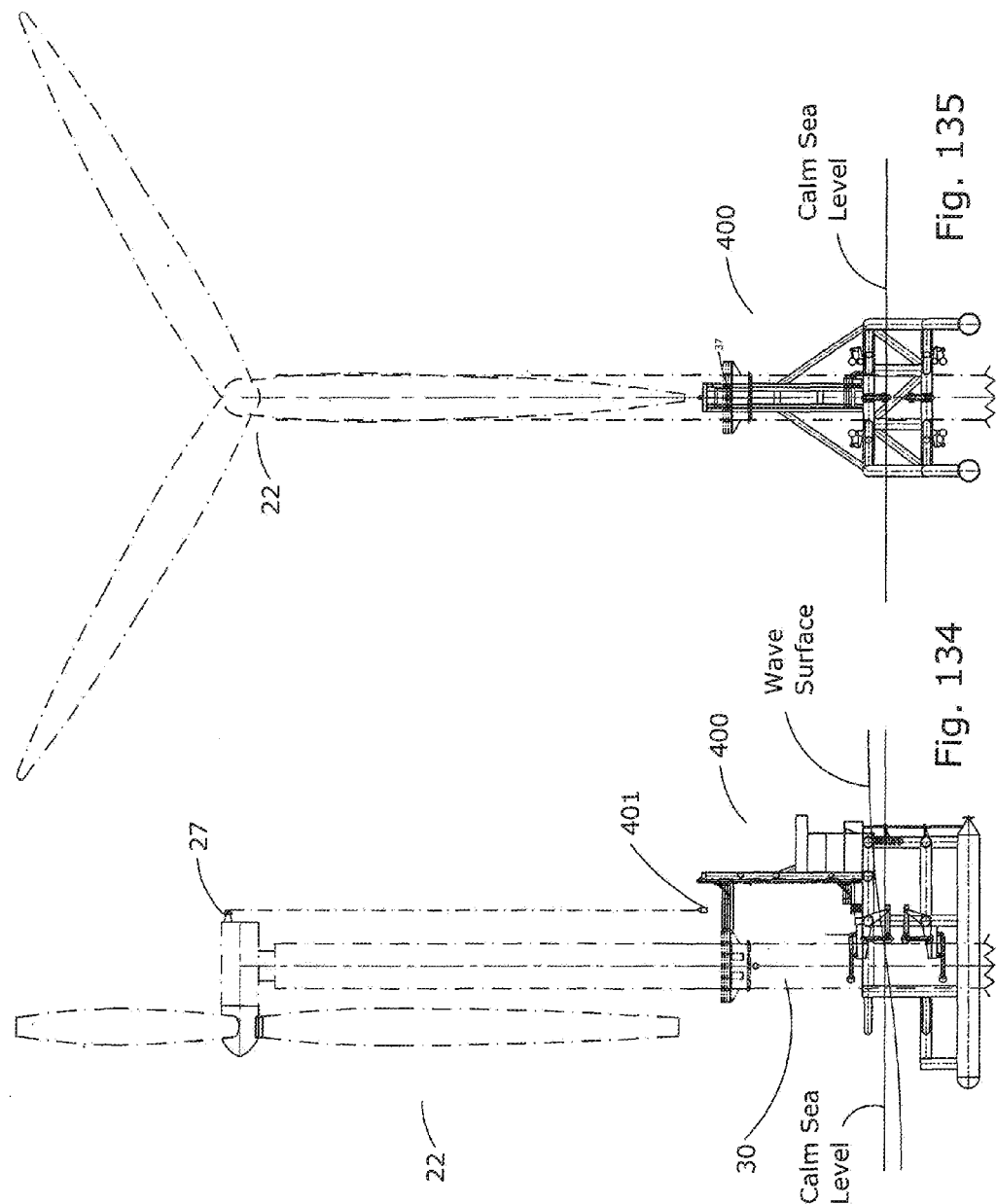

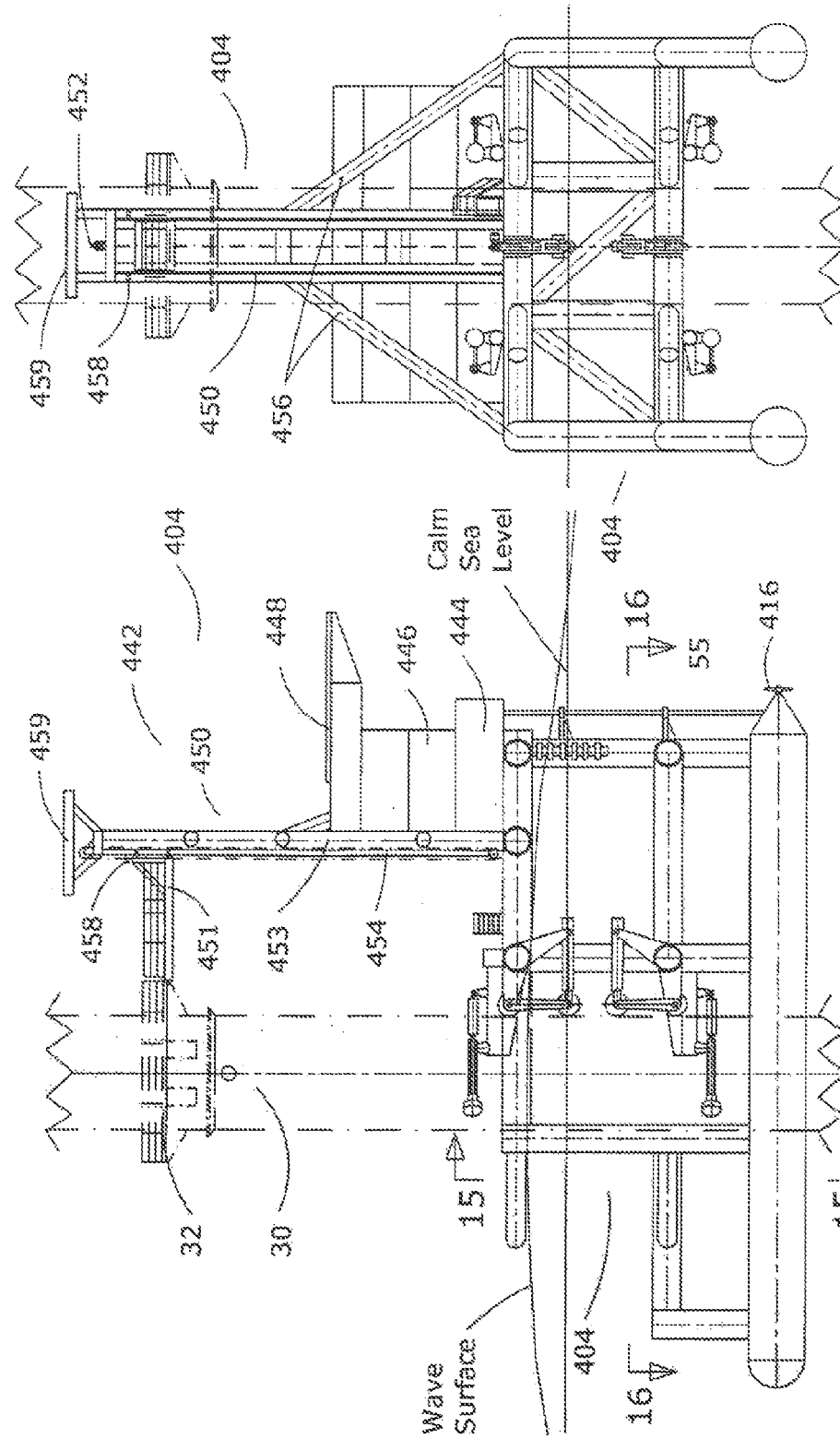

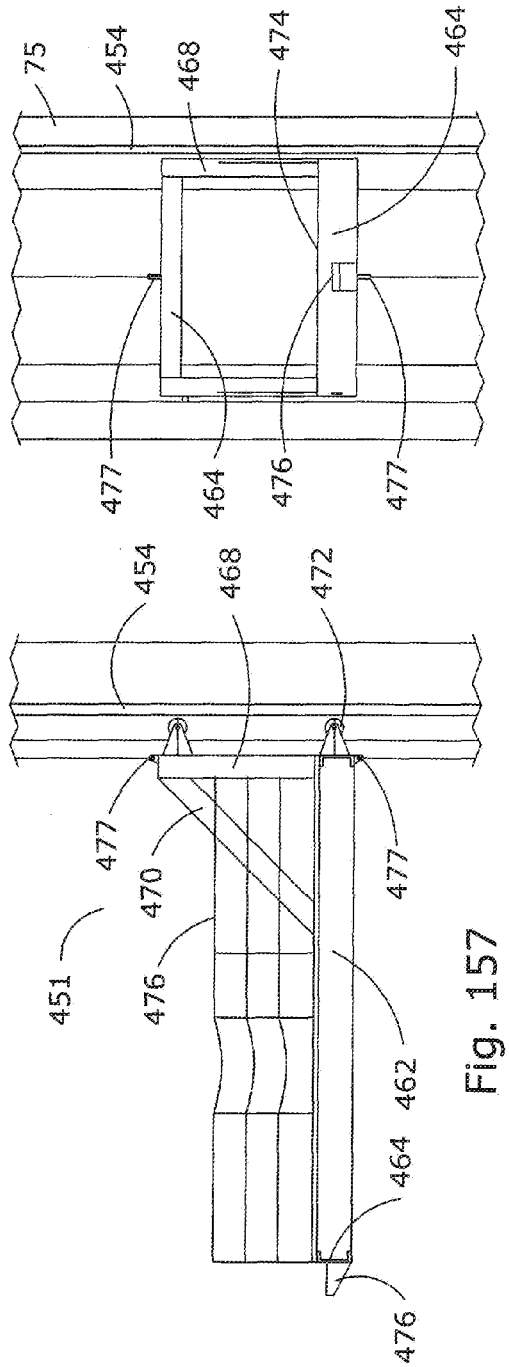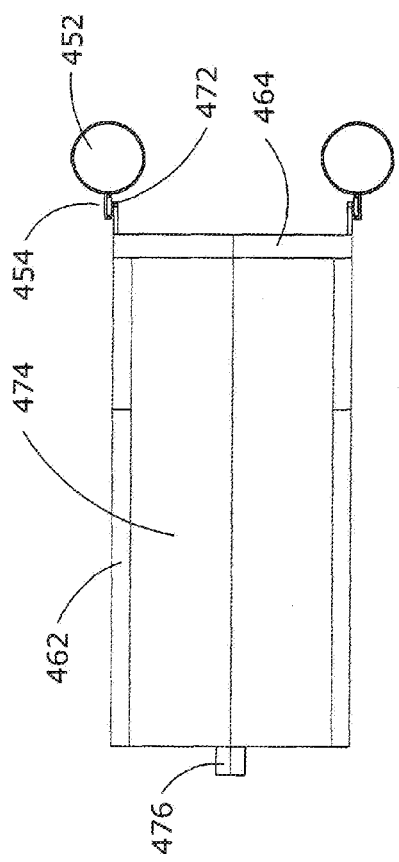

STATIONARY POSITIONED OFFSHORE WINDPOWER PLANT (OWP) AND THE METHODS AND MEANS FOR ITS ASSEMBLING, TRANSPORTATION, INSTALLATION AND SERVICING

CROSS REFERENCE TO RELATED APPLICATIONS

This application is a continuation-in-part of U.S. patent application Ser. No. 12/607,406, filed Oct. 28, 2009, which claims the benefit of priority to U.S. provisional patent application Ser. No. 61/199,727, filed Nov. 19, 2008.

FIELD OF THE INVENTION

This invention relates to harvesting wind energy offshore by wind power plants installed on the stationary or floating foundations.

BACKGROUND OF THE INVENTION

The ongoing technology of harvesting wind offshore consist of installing WTGs Generators (WTG) offshore and servicing them during operation. The WTG installation process includes transporting foundation from the shore, installing and anchoring it to seabed and assembling WTG on the pre-installed foundation. In the most cases the foundation is installed by Floating Crane and assembling WTG is done by Jack up Crane Vessel (JCV) on the foundation already preinstalled offshore. Both Cranes are revolving and using booms for increasing their reach, which also leads to a significant increase in overturning moment acting on them. The JCV achieve stability, required for safe placing WTG on foundation, by using as the base for stability the seabed, which they reach through their legs. Because of limited reach of their crane booms, they need to position themselves as close as possible to the preinstalled foundation, which increases chances of JCV collision with the preinstalled foundation. Because of the need to install WTGs in depth as deep as it possible (today the limit is 50-60 meters) and the weight of the heaviest part of WTG—nacelle reach 400+ tons the cost of the modern JVC is the range of $200-250 mln, noticeable effects the cost of electricity generated offshore.

Presently the Foundations for turbines installed in shallow waters are "stay alone" structures. There are two types of foundations—monopile, for installation in the depth up to 30 meters and tripod or jacket type for installation in depth from 30 to 50 meters. All of them are experiencing bending moment, maximum of which is at the seabed. Anchoring monopile foundations are done by hammering them down into seabed or by boring hole in in heavy clay or rock and then cementing monopile inside of the hole. Anchoring foundations tripod or jacket types are usually done by underwater piling. Both methods of pilling are damaging the underwater life. The monopile foundation consists of the base pile and intermediate piece placed on the base pile, after it is driven to the project depth. The servicing of the operating WTGs offshore is done through the delivering the maintenance personnel to WTG by a small boat, which roll, pitch and heave widely even on small waves. Therefore the man on the bow of the boat has to jump on the vertical ladder on WTG foundation. Then, using the ladder he reaches the access platform located on the top of foundation about 20 meters above the sea level. By the latest development the dynamically-positioned Service vessels have special means that bring man on a small platform, which stable position in space is keeping up by a number of computer controlled hydro-cylinders. Thus allows man to safely step on the vertical ladder. However, delivery of personnel to WTG solves only part of the services required and which are provided to WTG onshore. Among them are: replacing lubricant and coolants, replacing auxiliary machineries as pumps, slewing drives, etc. and inspection and repair of WTGs rotor blades. By the ongoing technology these services could be accomplished only during relatively calm seas, thus postpone them for week and months, putting WTGs during this time out of operation.

SUMMARY OF THE PRESENT INVENTION

The objective of the present invention, which we named OWP technology, is to overcome the main limitations of the ongoing technology for installing WTGs offshore, which would lead to the vast increase of the area available for harvesting wind in deepwaters along the continental shelf and to reduce the costs of WTG foundation manufacturing, their installation, placing WTGs on foundations and servicing WTGs during their operation.

This objective is achieved through several Embodiments of the present invention. The common between these Embodiments is the requirement that the WTG foundation head would be of cylindrical shape and that its surface would be free from any objects (vertical ladders, berthing pals) on its surface. Delivery of maintenance personnel would be done by a special service vessel straight to the access platform located on lower part of WTG.

Thus provides to the instant invention Embodiments the capability to berth and to engage with the installed WTG foundation in a manner that the catamaran vessels employed by these Embodiments would be always positioned head-on to prevailing wind and wave action. Because of this their vessels during berthing to the WTG foundation would only pitch and would be able to control the speed by which they would berth the WTG foundation.

The other common capability of the Embodiments is in the use of WTG foundation as the base for achieving stability to place WTG on foundation and to provide maintenance and replacement services. This is achieved due to the use of catamaran SWATH type vessel, which engages with the WTG foundation in its middle. Thus, due to its middle part of the catamaran hulls is taller that their bow and stern parts, would allow during semisubmersible mode minimizing the active waterplane area and relocating it to the center of catamaran, would allow catamaran to engage with WTG foundation in a manner that excludes pitching, rolling and minimizes heaving to the degree that provides safe conditions for placing WTGs on foundation and for maintenance personnel to safely board the WTG and perform required services.

The capability of using the WTG foundation as the base for WTG Installer achieving required stability is the first significant innovation, which would allow to place WTG on foundations regardless the depth of their installation.

The second significant innovation is in the implementation for WTG foundation the concept of Compliant Guyed Tower instead of "stay-alone" design of the foundations by the ongoing technology. The Compliant Guyed Tower concept is wide use by Offshore Oil Industry for installing offshore platforms in the depth up to 1,000 meters. The main advantage of implying this concept to WTG foundation is the possibility to overcome the presently existing barrier of 50-60 meters by increasing the depth limit up to 200 meters.

The combination of these both significant innovations is a breakthrough that would open for harvesting wind vast areas along the continental shelf, which is presently out of reach by the ongoing technology.

The present invention includes the following Embodiments:

The First Embodiment includes—means and methods for installing stationary WTG foundation in deepwaters, assembling WTG near shore, transporting it to the preinstalled foundation in deepwaters and placing completely assembled WTG on it.

The Second Embodiment—is the extension of the First Embodiment capability to replace major parts of WTG operating offshore in deepwaters.

The Third Embodiment—is the extension of the First Embodiment capability to install WTG monopile foundation in shallow waters.

The Fourth Embodiment—is a Catamaran Service Vessel for delivery personnel to the offshore WTG and for providing required maintenance.

The First Embodiment includes the following means:

Catamaran Wind Turbine Installer for installing WTG foundation in deepwater and then placing WTG on it (CWTI-D).

Compliant Guyed Foundation (CGF) for WTG installation in deepwaters.

High-rise Crane Station (HCS) for assembling WTG near shore.

The CWTI-D, in comparison versus Jack up Crane Vessel (JCV), which is a monohull type vessel, is a special SWATH (Small Waterplane Area Two Hull) type catamaran vessel, which hulls consists of bow, center and stern parts; the central part is significantly taller. The CWTI-D combines capabilities of installing special WTG foundation (Compliant Guyed Foundation [CGF]) in deepwaters and transporting the completely assembled WTG from the stand near shore to the preinstalled CGF and placing completely assembled WTG on it. For the purpose of handling CGF the CWTI-D has on board bridge crane and a Support Vessel.

Because the CWTI-D is a catamaran it can engage with the stand near shore, on which is located completely assembled WTG, in a manner that its center would coincide with the center of the completely assembled WTG. Thus allows the CWTI-D to lift WTG from the stand by changing the buoyancy force of its hulls through pumping ballast out from them. This excludes the need for High-rise Heavy-lift Crane on the board of the CWTI-D.

After completely assembled WTG would be on board of CWTI-D it would float to the preinstalled foundation for the WTG. There it would engaged with the preinstalled foundation using guides on its board to center CWTI-D with the foundation and then by using force of its propulsion system would be pressed to foundation body through two trust rollers.

During the rough seas the CWTI-D would pitch at the foundations by having pivot center changing its position between the two trusts rollers. By taking more ballast into its hulls the CWTI-D would go into semisubmersible mode, by which the bow and stern parts of CWTI-D hulls would be below the sea level, but the center part of the hulls, which is taller that two others, would provide significantly reduced, but sufficient for required stability waterplane area. This would drastically reduce the active area of CWTI-D waterplane area and concentrate it at the CWTI-D center. Because of this the pitching would be practically excluded. The heaving would be minimized, due to the drastic reduction of in the active part of waterplane area and to unproportionally ratio between the mass of CWTI-D and the appearing heave force. Thus would allow, by continuing taking ballast to slowly place WTG on the foundation. The energy of a possible impact between WTG and foundation would be absorbed by a primitive shock absorber located in the head of foundation.

The described above method-technology of lifting completely assembled WTG from near shore stand and placing it on the preinstalled foundation during rough seas is a breakthrough innovation that exclude WTG installer from the need to have on its board the High-rise and Heavy-lift Crane and would allow to use the head of the preinstalled foundation as the base for stability required for safely placing WTG on this foundation. As the result of this the CWTI-D would be able to place WTGs on the foundation regardless of the depth of their installation and without the need to have on its board lifting legs with associates with them machineries.

The Compliant Guyed Foundation (CGF) for placing WTG on them in deepwaters is using Compliant Guyed Tower concept, instead of "stay alone" foundations concept used by the ongoing technology. The difference between them is in the way how the wind and waves forces acting on WTG are transferred to the seabed. The "stay alone" foundations have the entire bending moment acting through the whole structure reaching its maximum at the seabed level. Thus requires the foundation base to withstand the maximum bending moment and the total of horizontal forces acting on the WTG from waves and wind forces. The CGF transmits horizontal forces into tension force along the mooring line and into compression force along the Foundation Tower. The bending moment acting on CGF reaches it maximum at the plane section at which the mooring lines are attached. From this plane section further downward the bending moment reduces to zero at the seabed level. In case of mooring lines approach seabed under the same angle, the tension force in the mooring lines and compression force in the Foundation Tower would be the same regardless of the depth of Foundation installation. Thus would allow having anchors of the same holding power, mooring lines of the same diameter wire rope and the barrels, from which the Foundation Tower is built, of the same diameters and wall thickness. The difference would be only in their length. Thus would provide favorable conditions for their "mass production", leading to a significant reduction of the Foundation cost of manufacturing.

The other difference between the CGF and the "stay alone" foundations by ongoing technology is in having on the lower end of the CGF Tower a pneumatic cylinder and compressed air storage vessels. Thus provides to CGF the complaint capability to absorb the impact from wind gusts and impact by unusually high waves and by this reduce the weight of CGF in comparison versus the rigid foundation by ongoing technology.

For the purpose of installing CGF in deepwaters the CWTI-D has on board a Bridge Crane and three stands for anchors, which could be a suction bucket type or gravity type, depending on seabed soil conditions.

The CWTI-D also includes a Support Catamaran (SC), which during CGF transportation in horizontal position from transfer pier to the destination site supports the lower part of CGF. At the destination site the Support Catamaran releases support for CGF and it rotates into vertical position around the pivot point at the top of the CGF, which is supported by the Bridge Crane hook. After CGF is installed it would float in vertical position as a buoy, having its lower part anchored to seabed. By the next step CWTI-D disconnects from CGF and places three anchors on seabed on an equal distance from CGF and on equal distance between them. After anchors are installed the CWTI-D returns to floating CGF and tensions mooring lines in a way that keeps CGF strictly vertical. After CGF is positioned in the strict vertical position the mooring lines are locked to CGF. Then the CWTI-D removes hydraulic cylinders, which tensioned the mooring lines, and moves away from the installed CGF.

The High-rise Crane Station (HCS) main purpose is to increase the window of weather availability for assembling WTG near shore. It consists of a high-rise structure on the top of which is located a revolving crane with a short boom and a pair of restraining winches and the near shore Stand.

The hoisting lines of restraining winches are attached to lifted load prevents it from swinging during strong winds.

The near shore Stand has its head of the same configuration as the CGF Tower head, thus facilitates the CWTI-D engagement with it.

The combination of short boom and restraining winches increasing the window of weather availability for assembling WTG on the near shore Stand.

By the ongoing technology the boom of the crane assembling WTG from Jack up Vessel has its hook located 100+ meters above sea level, thus makes it vulnerable to breakdown during strong winds, especially when load is swinging under the wind force.

The Second Embodiment includes the following means:

Catamaran Wind Turbine Installer (CWTI) for installing monopiles foundations and for placing WTGs on them, which is an extension of the CWTI-D capabilities, is named (CWTI-M).

The innovative feature of Monopile Foundation is in having a Transition Adapter, which provides conditions for WTG Tower engagement with Monopile Foundation in a strictly vertical position. The use of the Transition Adapter, in comparison versus the ongoing technology use of Transition Piece, would, besides drastically reducing the weight, would allow installing Monopile Foundation in one step, versus two steps by existing technology. The Transition Adapter has in the middle of it a shock absorber for accommodating possible impact during the process of lowering WTG on the Foundation.

The CWTI-M is of the same as CWTI-D basic design. The difference is in the additional use of Gantry Crane, which lifts Monopile Foundation and installs it on seabed, places on its top a pile driver and after Monopile reaches the designed depth removes the pile driver and places on the top of the Monopile Foundation the Transition Adapter, which, after aligned to be exact horizontal position, is welded to Monopile. The CWTI-M would be able to place WTGs on the preinstall by it Monopile Foundations.

The Third Embodiment is a Catamaran Crane, which design is the same as the CWTI-D and CWTI-M. The difference is that it has a revolving crane with a short boom installed on the top of the CWTI-D tower. This crane would be capable of replacing the main parts of the operating WTG during the rough seas.

The Forth Embodiment is a Catamaran Services Vessel (CSV), which hulls are basically similar to CWTI-D and CWTI-M, but is significantly smaller. Therefore the CSV engages with the operating WTG in the same manner that excludes roll, pitch and minimize the heave and it has the following capabilities:

To provide the maintenance personnel safe walking from CSV to the WTG access platform. For this purpose the CSV uses a lifting platform, which is pressed to WTG access platform by a hydraulic drive. The hydraulic drive has the capability keeping lifting platform always pressed to WTG access platform even when CSV would heave.

To provide the capability of replacing on board WTG lubricant and coolant. For this purpose the CSV has onboard corresponding tanks, pumps and pipelines.

To provide the capability of inspecting and repairing the WTGs blades. For this purpose the CSV has on the top of its mast a special platform with winches controlling its vertical movement along the blade.

BRIEF DESCRIPTION OF THE DRAWINGS

FIG. 1 shows the Offshore Windpower Plant (OWP) in an installed position (elevation view);

FIG. 2 is Detail I from FIG. 1.

FIG. 3 is a Plan View from FIG. 2.

FIG. 4 shows installed Compliant Guyed Foundation (CGF)-Elevation.

FIG. 5 shows General Arrangement of CGF Tower.

FIG. 6 is a Section 1-1 from FIG. 5.

FIG. 7 is a Plan View from FIG. 5.

FIG. 7A is a Section 2-2 from FIG. 7.

FIG. 8 show compliant element of CGF Tower in an expanded mode.

FIG. 9 shows compliant element of CGF Tower in a compressed mode.

FIG. 16 is an Elevation of Catamaran WTG Installer for deepwater (CWTI-D), Section 5-5 from FIG. 17.

FIG. 17 is a Plan View of CWTI-D, Section 4-4 from FIG. 16.

FIG. 22 is a Pivotal support for WTG.

FIG. 23 is a Plan View from FIG. 22.

FIG. 26 is an Elevation of the upper engagement arrangement with the CGF Tower during the initial contact between them.

FIG. 27 is a Plan View from FIG. 26.

FIG. 28 is an Elevation of the upper engagement arrangement with the CGF Tower after engagement is completed.

FIG. 29 is a plan view from FIG. 28.

FIG. 30 is an Elevation of the lower engagement arrangement with the CGF Tower during the initial contact between them.

FIG. 31 is a Plan View from FIG. 30.

FIG. 32 is an Elevation of the lower engagement arrangement with the CGF Tower after engagement is completed.

FIG. 33 is a plan view from FIG. 32.

FIG. 34 illustrated a Stopper for arresting Support Catamaran (Elevation).

FIG. 35 is a Plan View from FIG. 34.

FIG. 36 is a Support Catamaran (Elevation)

FIG. 37 is a Support Catamaran (Side View).

FIG. 38 is Detail II from FIG. 37.

FIG. 39 shows the CGF Tower positioned on the Transfer Pier.

FIG. 40 is Plan View from FIG. 39.

FIG. 41 is a Side View of the CGF Tower positioned on the Transfer Pier.

FIG. 42 shows CWTI-D and Support Catamaran approaching the Transfer Pier (Elevation).

FIG. 43 is a Plan View from FIG. 42.

FIG. 44 shows CWTI-D and Support Catamaran engaged with the Transfer Pier (Elevation), mooring lines attached to Anchors and hoist line with power cable attached to auxiliary double-drum winch on the bridge crane.

FIG. 45 is a Plan View from FIG. 44.

FIG. 46 is a Section 9-9 from FIG. 44 illustrates the CWTI-D bridge crane hoist engage with the CGF Tower.

FIG. 47 shows Catamaran Tower Installer moved out of Transfer pier and Support Catamaran engaging with the lifting arrangement on the lower end of the CGF Tower.

FIG. 48 is a Section 10-10 from FIG. 47.

FIG. 49 shows the lower end of CGF Tower lowered with sinking Support Catamaran.

FIG. 50 is a Section 11-11 from FIG. 49.

FIG. 51 shows CWTI carrying the CGF Tower mowing out of engagement with Transfer Pier.

FIG. 52 shows CWTI carrying the CGF Tower mowed out of engagement with Transfer Pier and on his way to the destination site.

FIG. 53 shows CWTI arrived to the destination site.

FIG. 54 is a section 12-12 from FIG. 53 illustrating the rear part of CGF Tower in a free fall.

FIG. 57 illustrates the CGF Tower came to the vertical position.

FIG. 58 illustrates initial penetration the CGF Tower base into soil.

FIG. 65 illustrates completely submerged into soil the first anchor.

FIG. 66 illustrates process of retrieving suction pump to the CWTI-D after the first anchor fully penetrated into seabed soil.

FIG. 67 illustrates the CWTI-D in position ready to lower the second anchor.

FIG. 68 illustrates the second anchor penetrating soil under its own weight.

FIG. 69 illustrates completely submerged into soil the second anchor.

FIG. 70 illustrates process of retrieving suction pump to the CWTI-D after the second anchor fully penetrated into soil.

FIG. 71 illustrates the CWTI-D approaching the floating as buoy CGF with all mooring lines attached and lose.

FIG. 72 is a Plan View from FIG. 71 illustrating position of the Support Catamaran on the outer side of the CWTI-D.

FIG. 73 illustrated the CWTI-D center with CGF Tower, lowered suction pump with hydraulic power pact, which actuates portable hydraulic cylinders and tensions mooring lines.

FIG. 74 is a Section 13-13 from FIG. 73.

FIG. 75 illustrates process of removing portable hydraulic cylinders after tension of mooring lines is completed.

FIG. 76 illustrates the CWTI-D mowing away from the installation of CGF is completed.

FIG. 78 shows High-rise Crane Station in Elevation View.

FIG. 79 is a Plan View from FIG. 78.

FIG. 80 is a Section 14-14 from FIG. 78.

FIG. 81 is a Detail III from FIG. 78.

FIG. 82 is a Plan View from FIG. 81.

FIG. 83 shows the initial position of lowering WTG Tower on the Shore Stand.

FIG. 84 shows WTG lowered on the Shore Stand.

FIG. 85 is a Detail IV from FIG. 85.

FIG. 86 shows WTG nacelle 24 in the process of lowering it on the WTG Tower.

FIG. 87 shows WTG rotor attached to nacelle.

FIG. 89 shows Step II of engaging CWTI-D with Shore Stand and lifting WTG from it.

FIG. 90 shows Step III of engaging CWTI-D with Shore Stand and lifting WTG from it.

FIG. 91 shows Step I of engaging CWTI-D with Shore Stand and lifting WTG from it in a Plan View.

FIG. 92 shows Step II of engaging CWTI-D with Shore Stand and lifting WTG from it in a Plan View.

FIG. 93 shows Step II of engaging CWTI-D with Shore Stand and lifting WTG from it in a Plan View.

FIG. 94 shows Step III of engaging CWTI-D with Shore Stand and lifting WTG from it in a Plan View.

FIG. 97 shows Step V1 at which the CWTI-D with lifted WTG on board moves away from Shore Stand.

FIG. 103 shows CWTI-D in the semisubmersible mode.

FIG. 104 is a Detail V from FIG. 103.

FIG. 105 shows CWTI-D lowered WTG on foundation.

FIG. 106 is a Detail VI from FIG. 105.

FIG. 107 shows CWTI-D out of contact with WTG support legs.

FIG. 108 show CWTI-D rotated its pivot support out of possible contact with access platform.

FIG. 114 shows Catamaran Crane, General Arrangement (Elevation).

FIG. 115 shows Catamaran Crane, General Arrangement (Side View).

FIG. 116 is a Section 15-15 from FIG. 115.

FIG. 119 shows monopile delivered on barge to CWTI-M.

FIG. 120 shows CWTI-M Gantry crane engaged with monopile.

FIG. 121 shows CWTI-M Gantry crane lifting monopile.

FIG. 122 shows monopile lifted and centered with CWTI-M.

FIG. 123 shows monopile lowered into seabed soil by its own weight.

FIG. 124 shows Gantry crane lifting Piledriver from its stand.

FIG. 125 shows Gantry crane engaging with Piledriver on its stand.

FIG. 126 shows Piledriver driving placed on monopile.

FIG. 127 shows monopile drived by Piledriver to the designed depth.

FIG. 128 shows Piledriver lifted from monopile head.

FIG. 129 shows Gantry crane placing Piledriver on its stand.

FIG. 130 shows CWTI-M taking ballast and going into semisubmersible mode and lowering Transition Adapter on the head of monopile.

Figure 131:
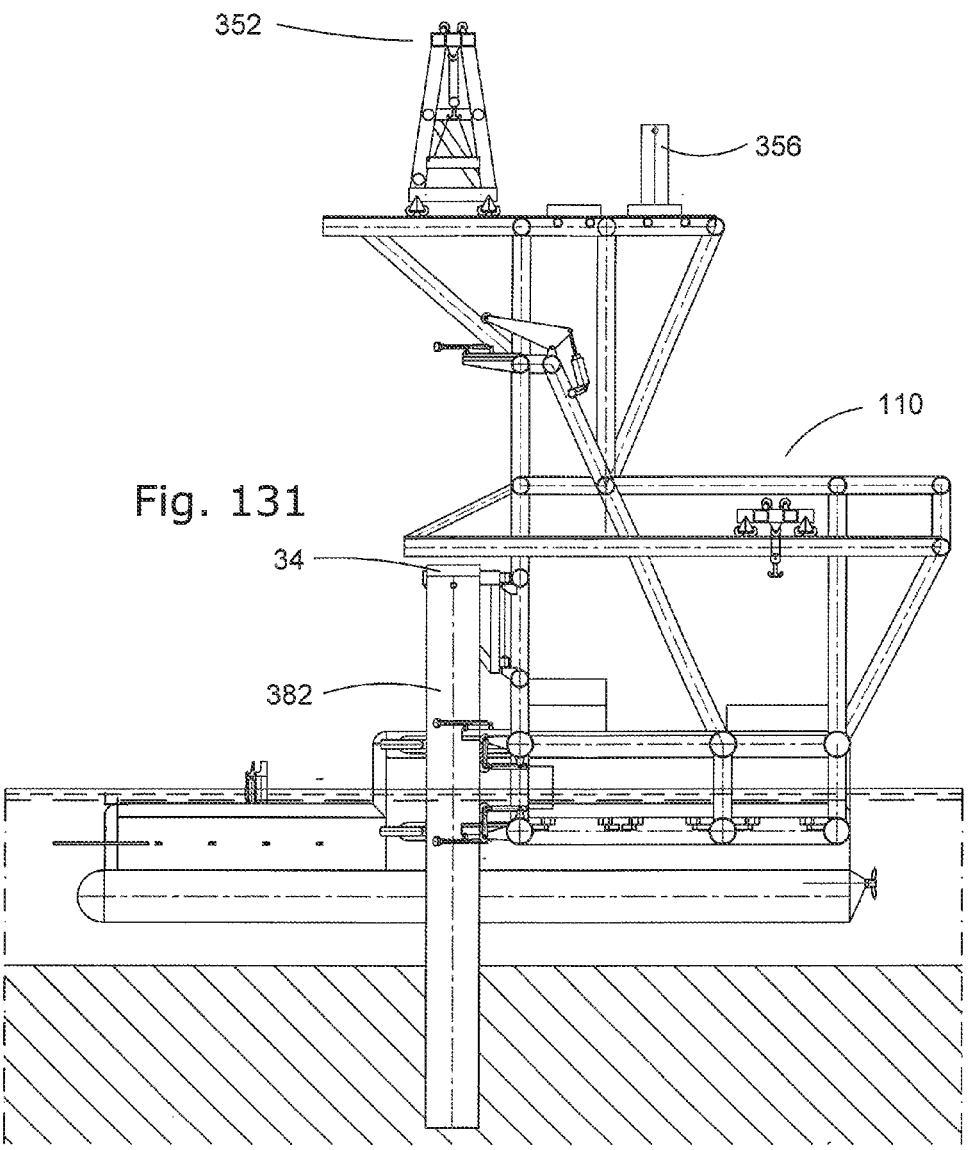

FIG. 131 shows CWTI-M in position when Transition adapter is welded to monopile head.

Figure 132:
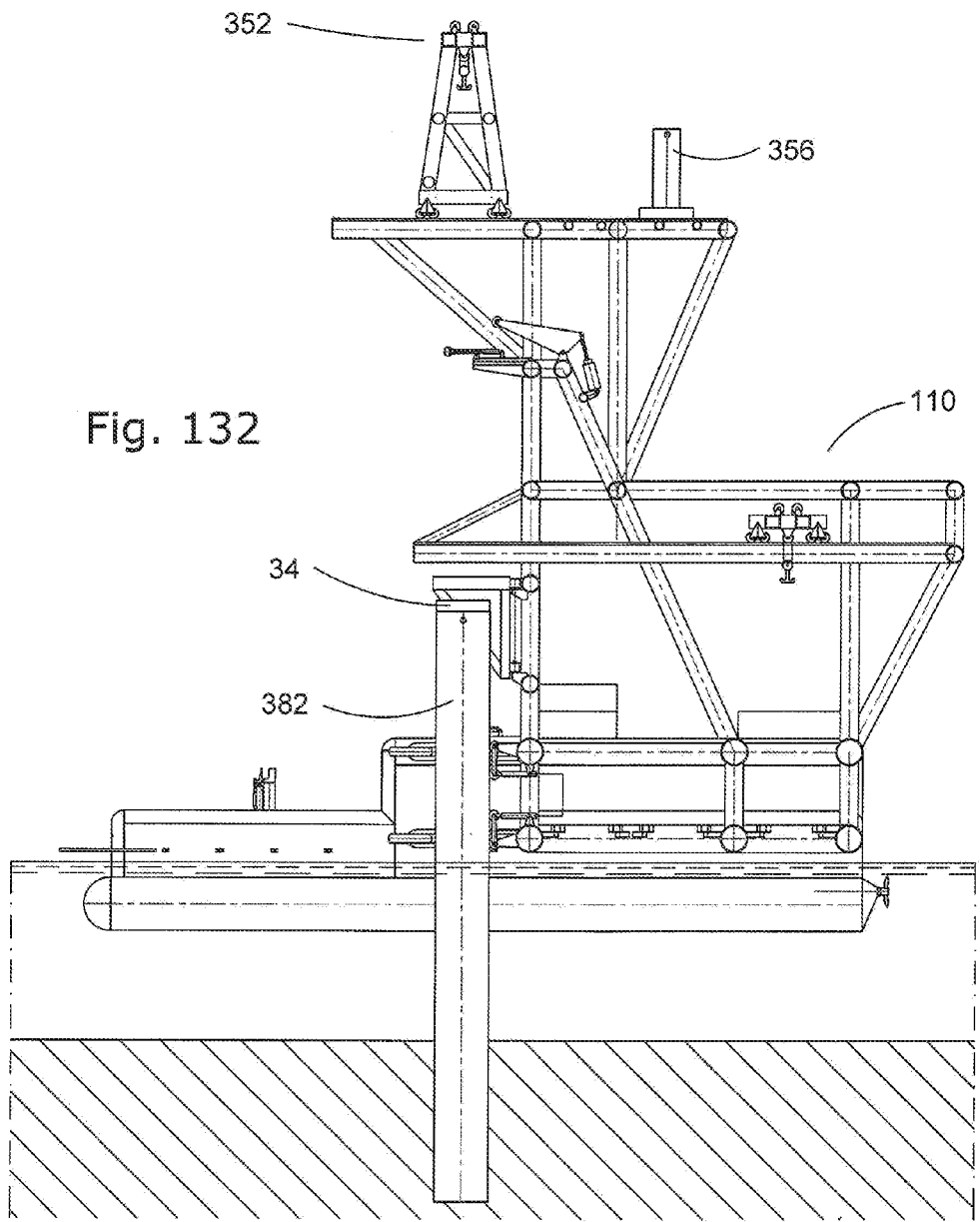

FIG. 132 shows CWTI-M going from semisubmersible mode into Transport mode.

Figure 133:
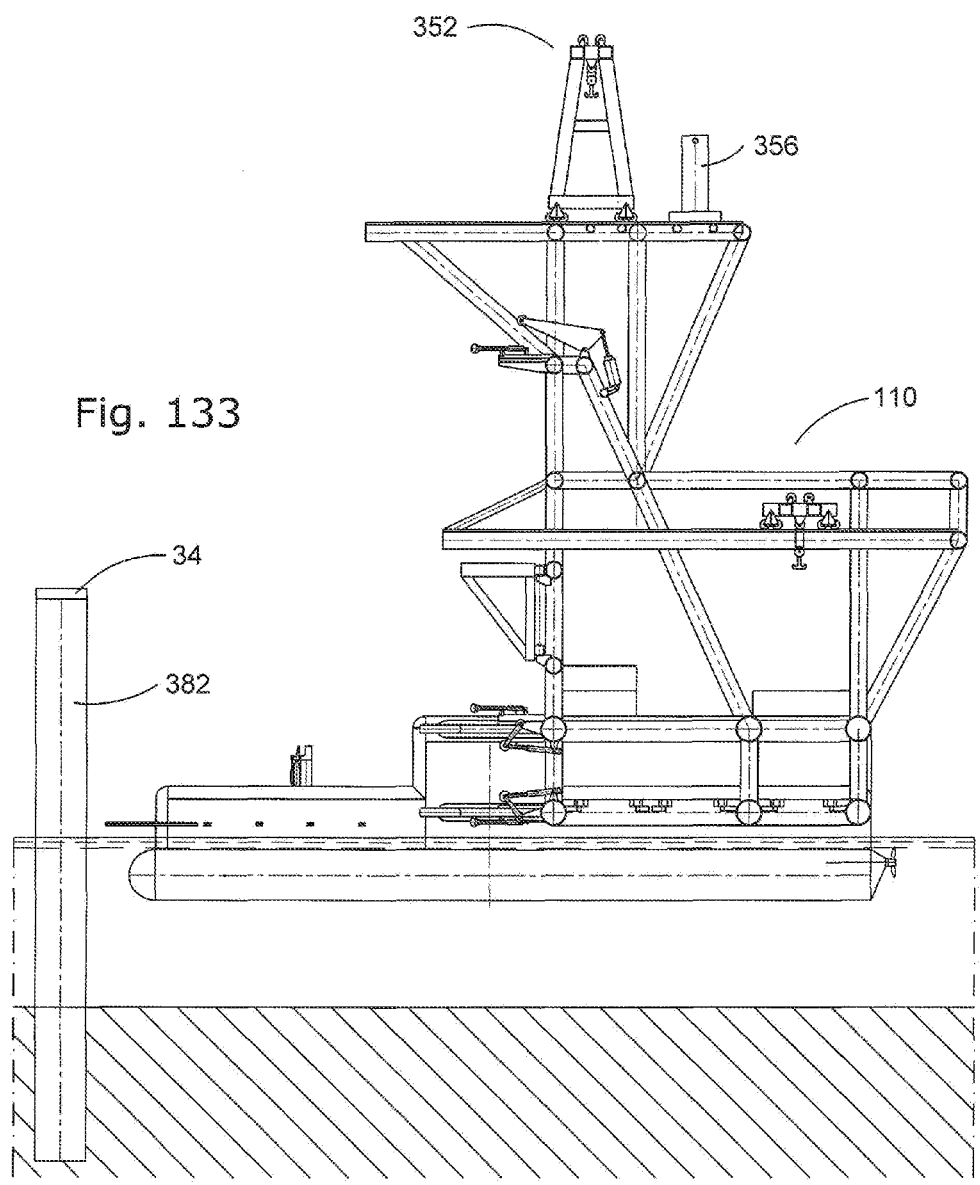

FIG. 133 shows Gantry crane disconnected from monopile and away from it.

FIG. 134 is a General Arrangement of catamaran Service Vessel (CSV) engaged with offshore WTG.

FIG. 135 is a CSV side View from FIG. 133.

Figure 136:
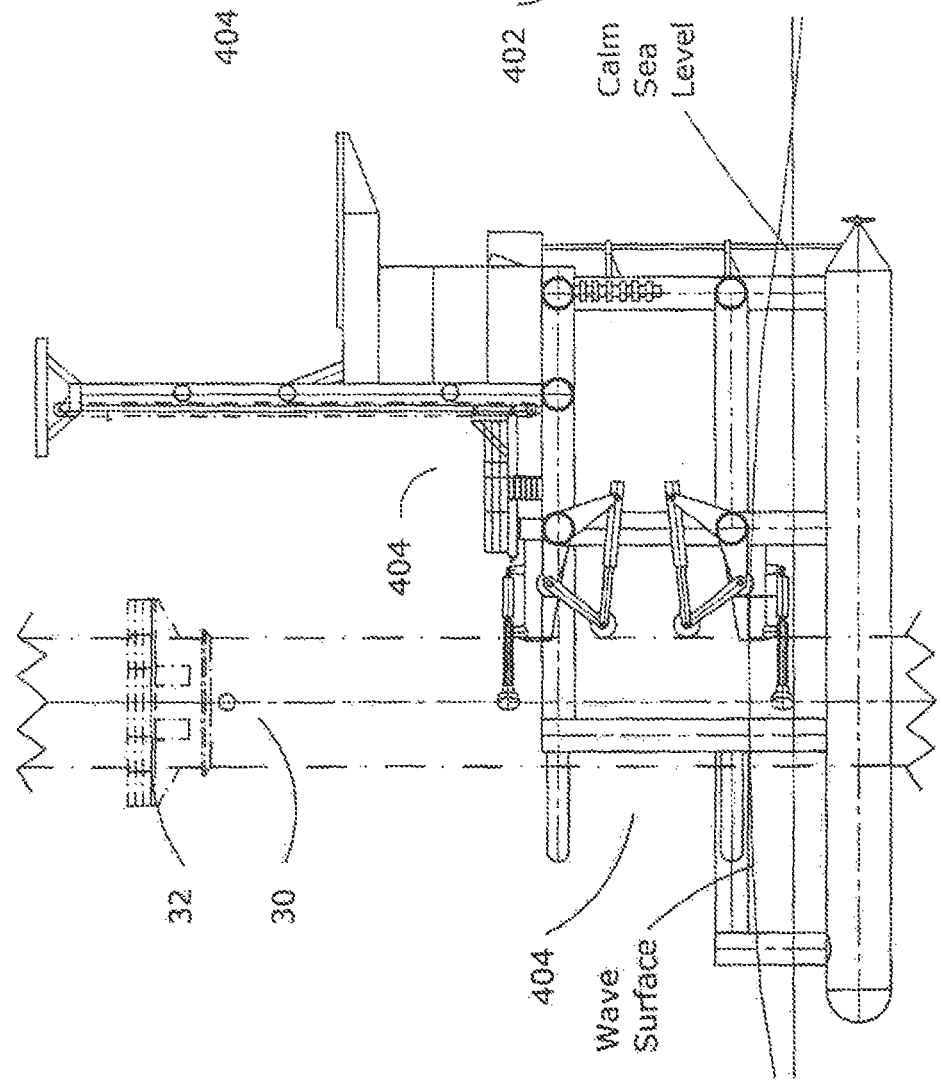

FIG. 136 is Elevation View of CSV during transport mode.

Figure 137:
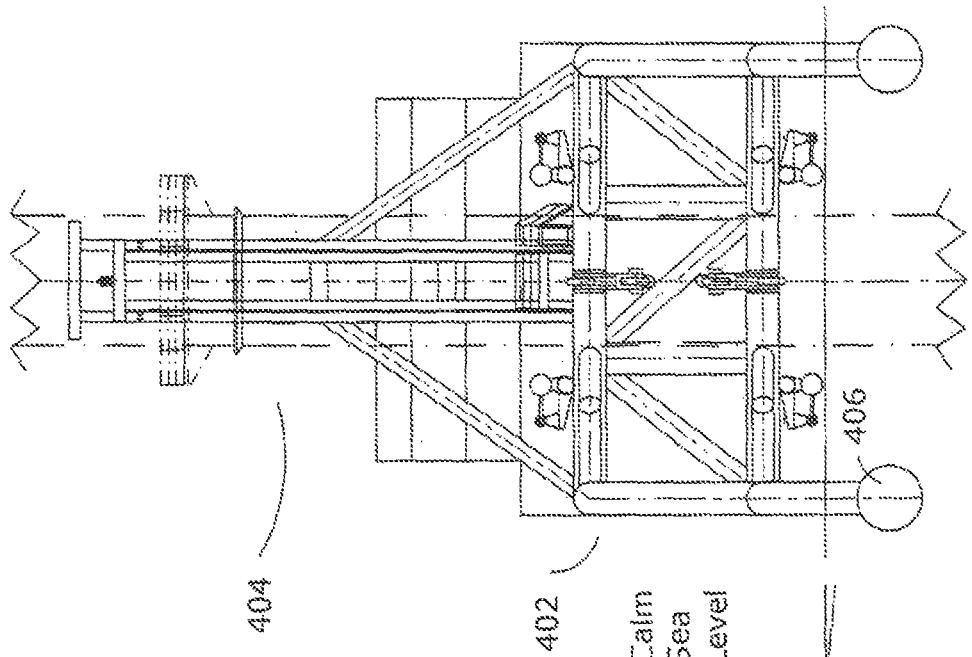

FIG. 137 is a side view from FIG. 136.

FIG. 138 is Elevation View of CSV during semisubmersible mode.

FIG. 139 is a Side View from FIG. 138.

Figure 140:
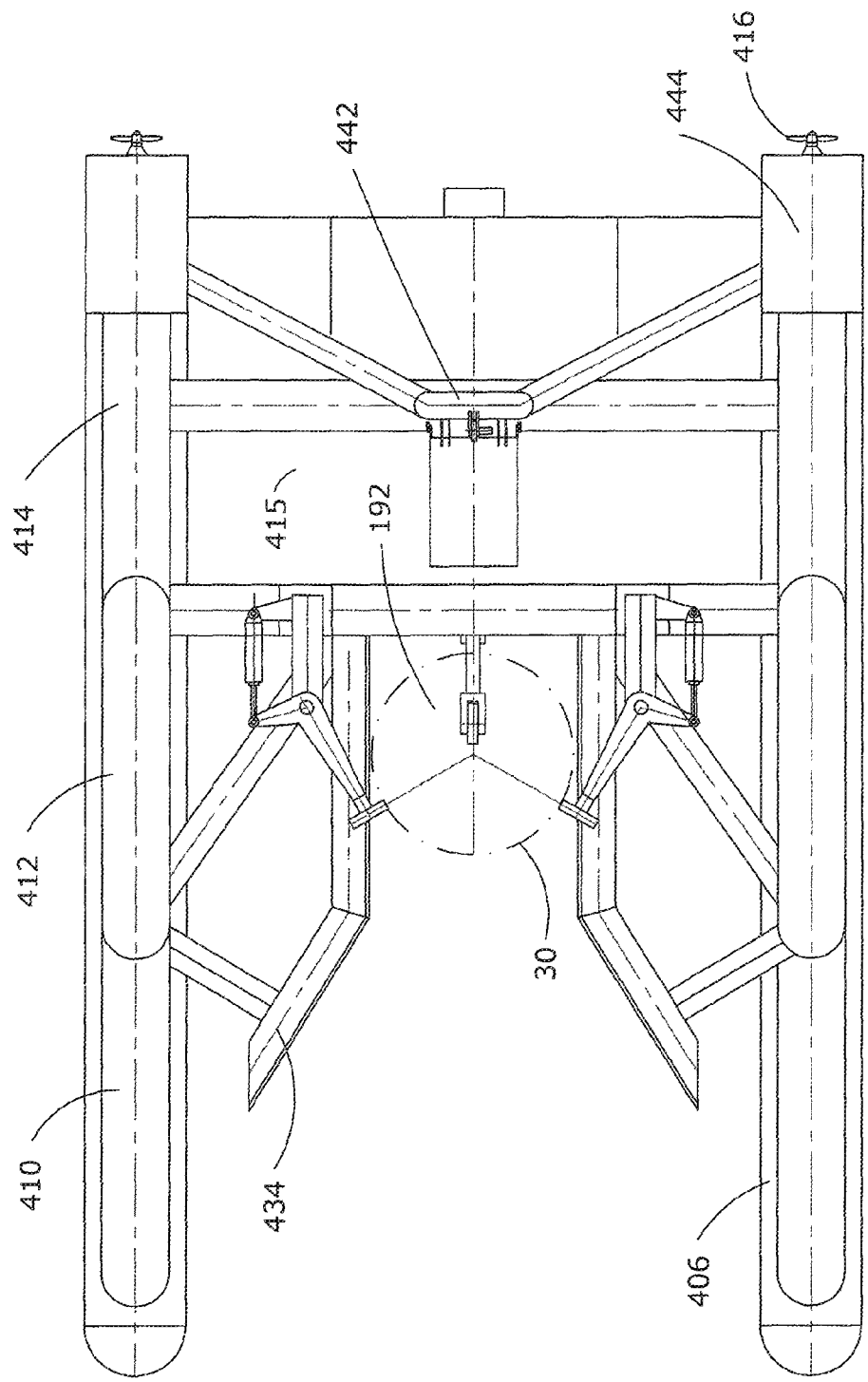

FIG. 140 is a Plan View of CSV.

Figure 141:
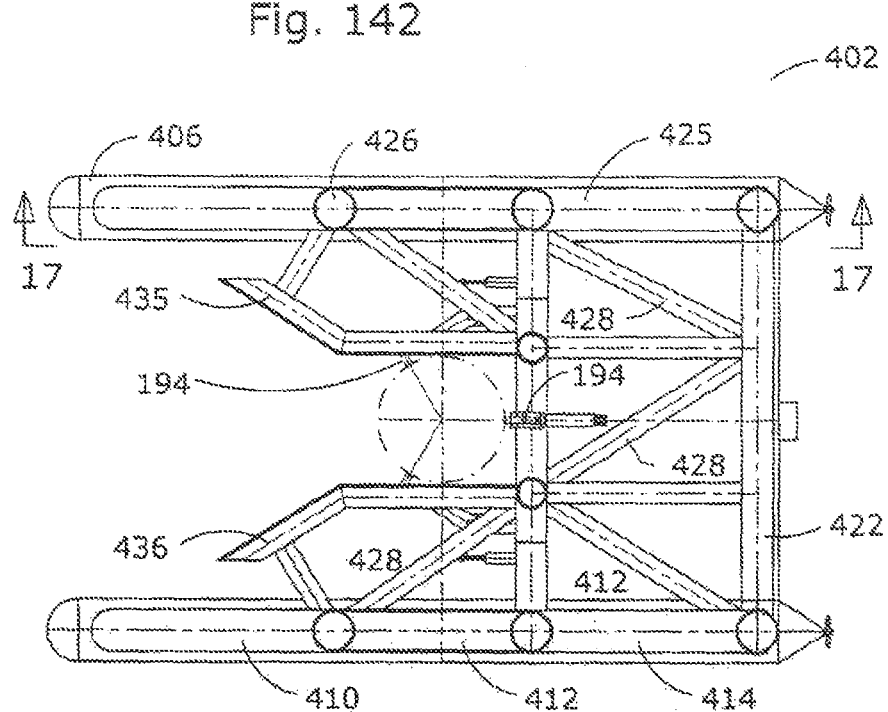

FIG. 141 is a Section Plan View 16-16 from FIG. 138.

Figure 142:
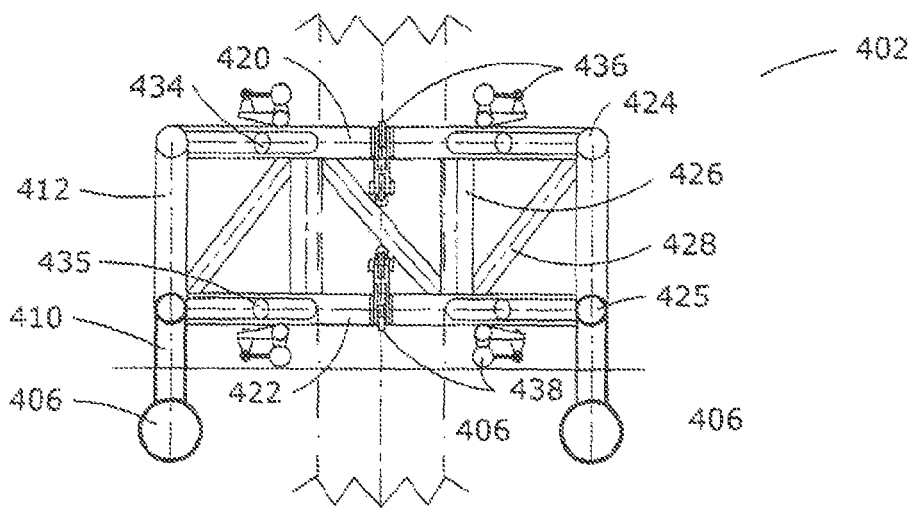

FIG. 142 is a Side Section 15-15 from FIG. 138.

Figure 143:
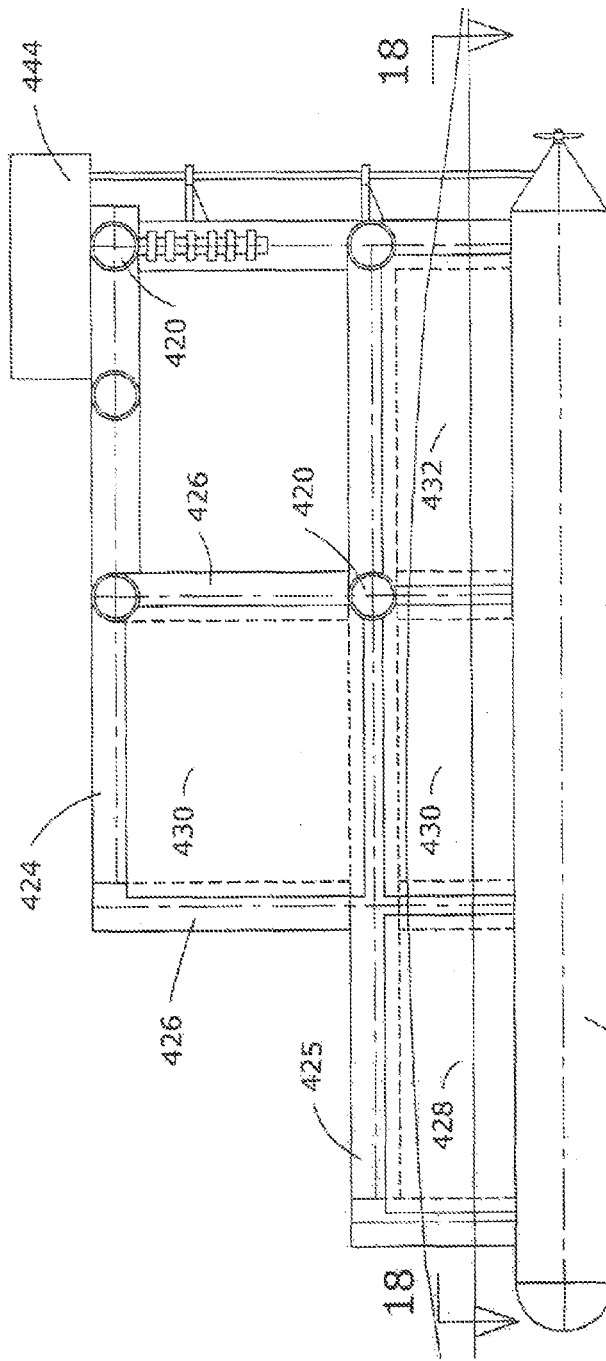

FIG. 143 is an Elevation Section 17-17 from FIG. 141.

Figure 144:
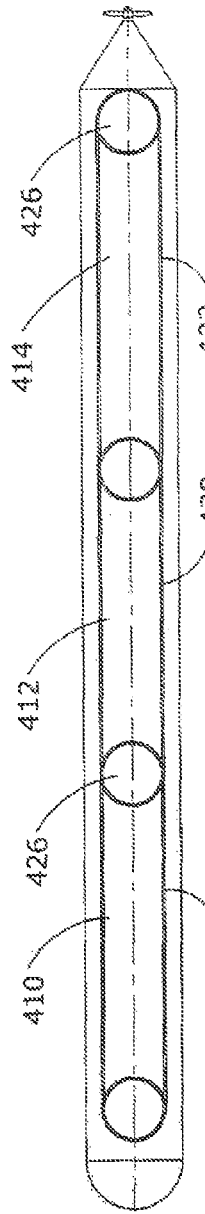

FIG. 144 is a Plan Section from FIG. 143.

Figure 145:
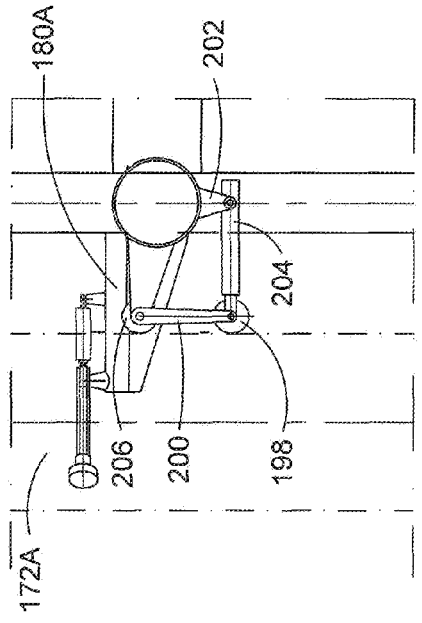

FIG. 145 shows upper Engagement Arrangement in the initial contact with WTG foundation.

Figure 146:
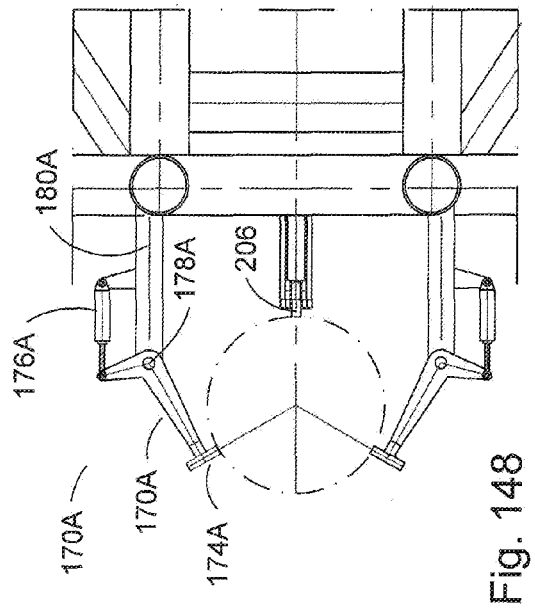

FIG. 146 is a Plan View from FIG. 145.

Figure 147:
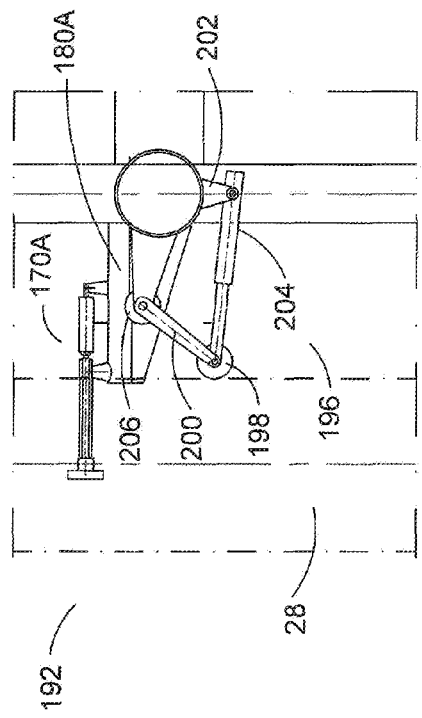

FIG. 147 shows upper Engagement Arrangement fully engaged with WTG foundation.

Figure 148:
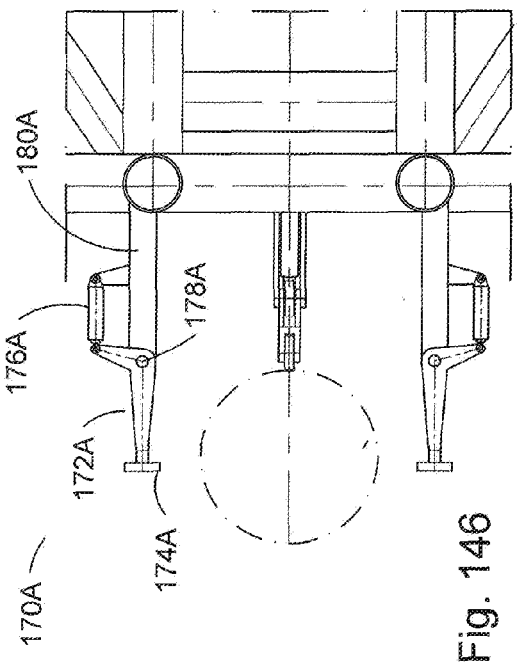

FIG. 148 is a Plan View from FIG. 147.

Figure 149:
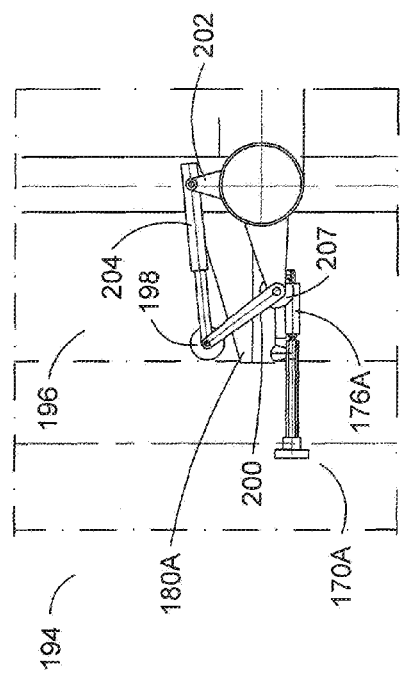

FIG. 149 shows lower Engagement Arrangement in the initial contact with WTG foundation.

Figure 150:
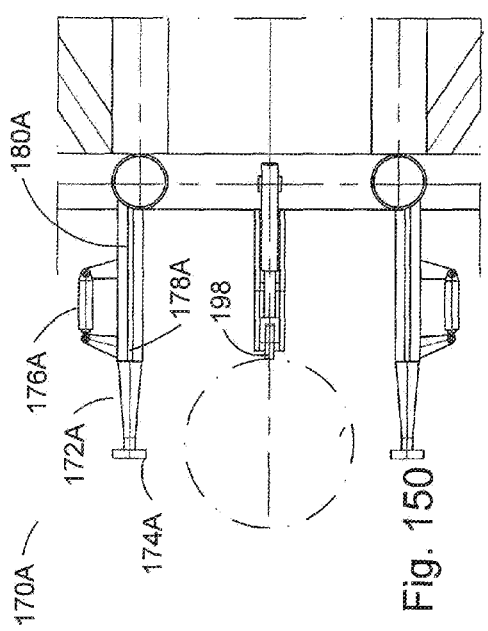

FIG. 150 is a Plan View from FIG. 149.

Figure 151:
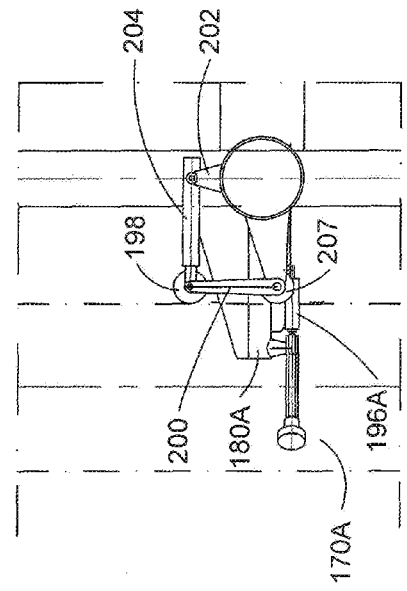

FIG. 151 shows lower Engagement Arrangement fully engaged with WTG foundation.

Figure 152:
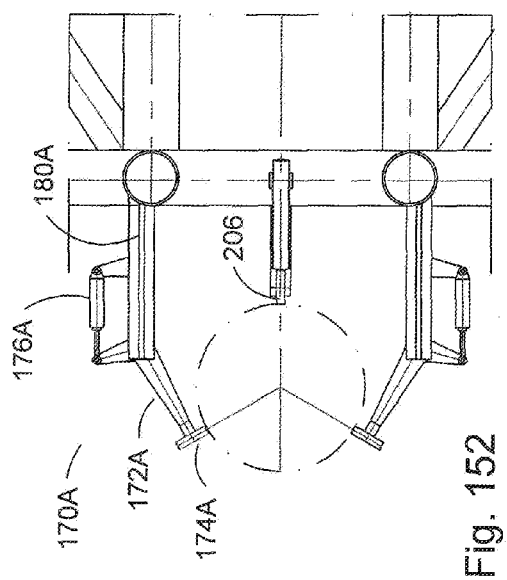

FIG. 152 is a Plan View from FIG. 151.

Figures 153, 154:
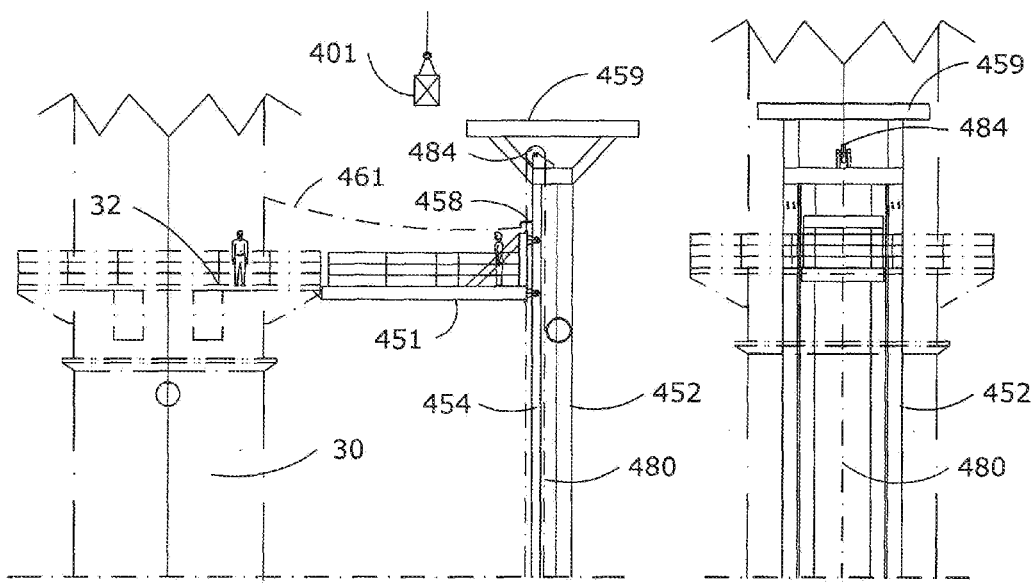

FIG. 153 shows Elevation View of the Mast upper part.

FIG. 154 is a Side View from FIG. 153.

Figures 155, 156:
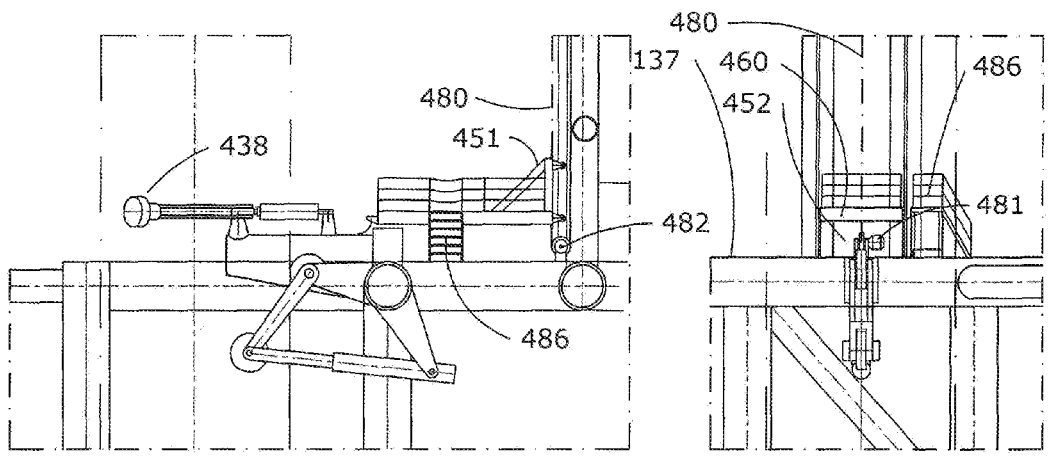

FIG. 155 shows Elevation View of the Mast lower part.

FIG. 156 is a Side View from FIG. 155.

FIG. 157 shows Elevation View of Sliding Platform.

FIG. 158 shows Side View of Sliding Platform.

FIG. 159 shows Plan View of Sliding Platform.

1.0. DETAILED DESCRIPTION OF THE FIRST EMBODIMENT

FIGS. 1 through 3 illustrate an Offshore Windpower Plant (OWP) 21 installed on the sea bottom. It consists of a typical offshore WTG 22, which includes nacelle 24, rotor 26, auxiliary crane 27, WTG tower 28 and Compliant Guyed Foundation (CGF) 30. Wind tower 28 has access platform 32, four thrust stools 34, serving as the points through which it can be lifted, and on the bottom it has an outer engaging cone 35 with a plunger 36 in its middle.

1.1. Detailed Description of the Compliant Guyed Foundation

The Compliant Guyed Foundation (CGF) 30 consists of a Tower 38, three mooring lines 40 and three anchors 42.

The Tower 42 (see FIGS. 4 through 15) consists of upper part 44, intermediate parts 45, 46, 47, 48, 49; lower part 50, universal joint 51 and the Tower Base 52. The intermediate part 49 has a lifting gear 53. The upper part 44 has a receiver-head 54 (see FIG. 7A), which includes an inner cone 56, in the middle of inner cone 56 is located shock absorber 58 consisting of a set of thin plates 60. The receiver-head 44 has on its side a pair of journals 61, which serve as a lifting points and as the axis of Tower 42 rotation into vertical position during the process of its installation on the seabed.

The upper part 44 has three receivers 62, equally distributed along the circle of the upper part 44 diameter for attaching hydraulic cylinders 66, which would tension mooring lines 40 after installation of CGF would be completed. Also equally distributed along the circle of upper part 44 and in the same pattern as receivers 62 are located three sets of guides 64 and clamps 66 that fix mooring lines 40 with the body of the upper part 44. Near the bottom of the upper part 44 is located a bulkhead 66 and vent pipe 68 that form a needed buoyancy for Tower 42 to float as a buoy during CGF installation process.

The lower part 50 (see FIGS. 8 and 9) is a hydraulic cylinder 72 upper end of which is connected with intermediate part 49. On the lower end of the cylinder 72 is a flange 74. Inside of cylinder 72 is a piston 75, the space between them forms a compressed air chamber 76, which is interconnected through pipe 79A and three way valve 80 (see FIG. 6) and pipe 79B with pneumatic accumulators 77. The piston 75 bottom is connected with a trust plate 78 which has on it at least three equally spaced stoppers 81. Each of the stoppers 81 protrude through flange 74 and have on their upper end a nut 82. The trust plate 78 is connected with universal joint 51.

The Tower Base 52 is a typical suction bucket, which consists of a cylindrical body 84 and the upper plate 86. The upper plate 86 diameter is larger than the diameter of cylindrical body 84 and this forms a scorching prevention overhang 88. The upper plate 86 has on it a receiver 90 for a suction pump 92 with hydraulic power pack 93 (not shown on the drawings).

The three anchors 42 are each a typical suction bucket, which consists of cylindrical body 84A and upper plate 86A. The upper plate 86A is larger than the diameter of cylindrical body 84A and this forms a scorching prevention overhang 88 A. In the center of upper plate 86A is located chain connector 94, a receiver 90 for attaching suction pump 92 and at least three hooks 96 for lifting entire anchor 42 by slings 97.

Figure 10:
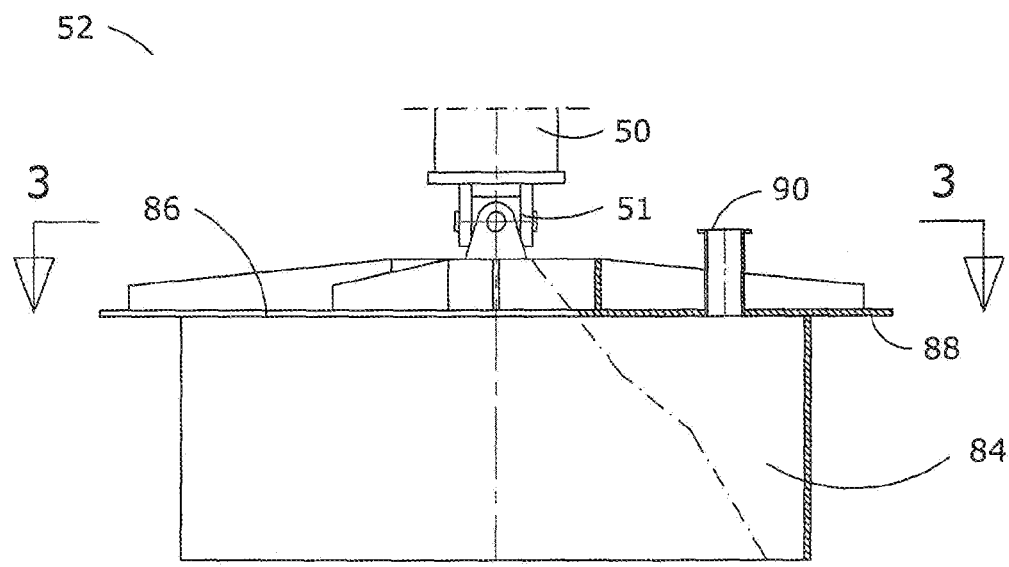
FIG. 10 is a CGF Tower Base (Elevation).
Figure 11:
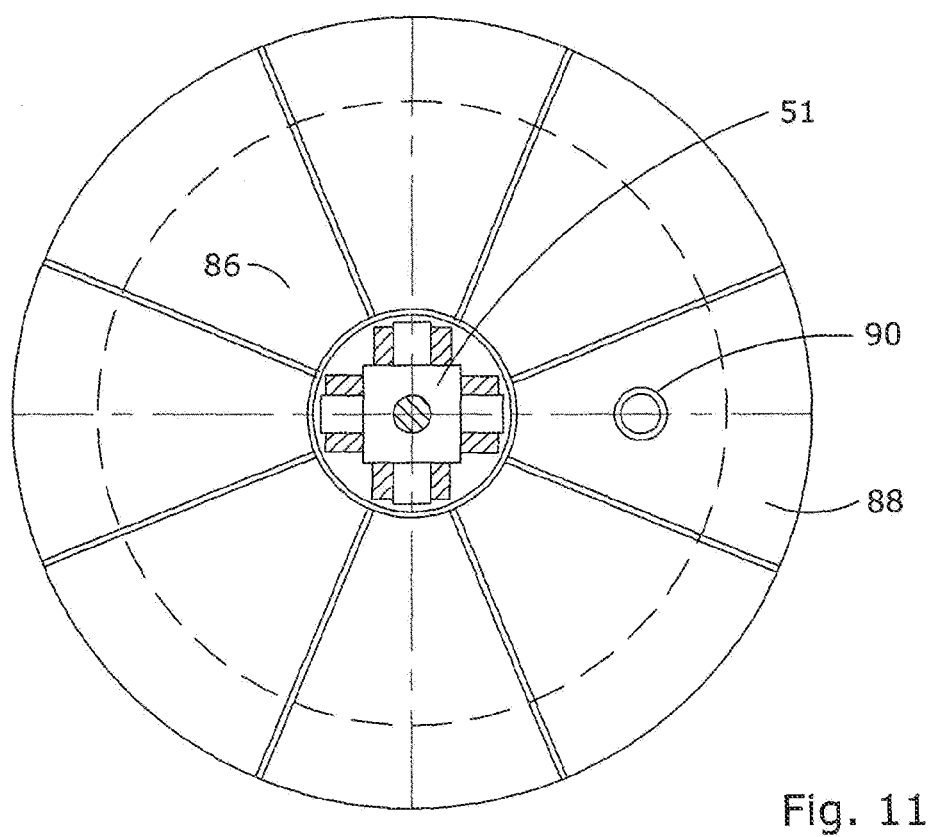
FIG. 11 is a Plan from FIG. 10.
Figure 12:
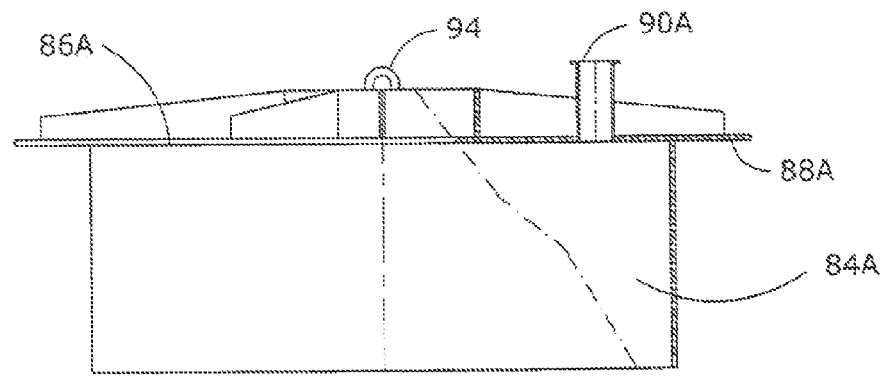
FIG. 12 is an Anchor Suction Bucket (Elevation).
Figure 13:
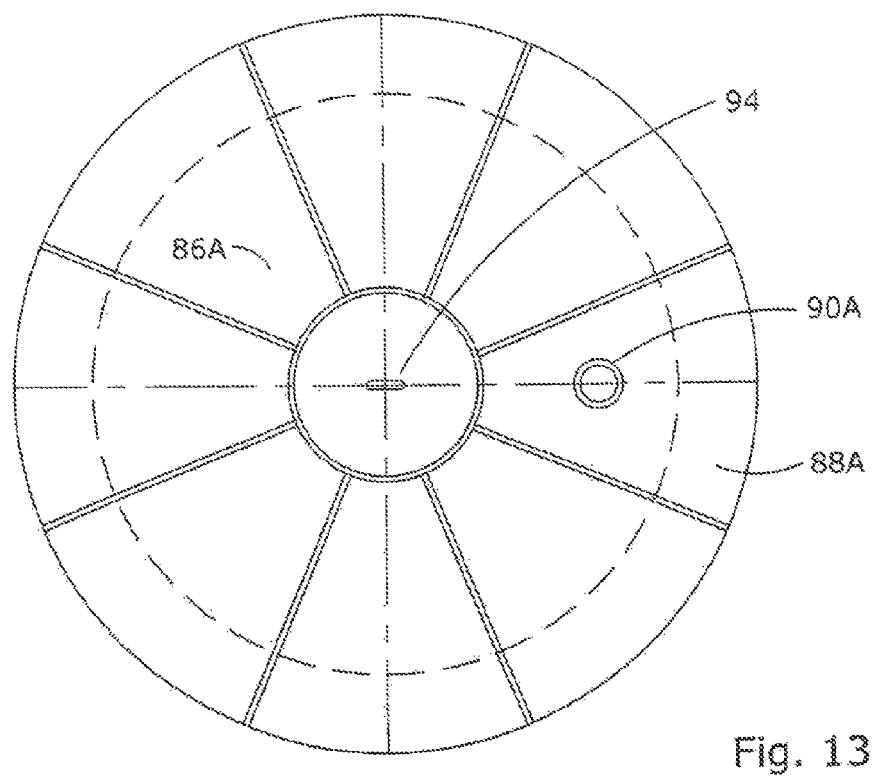
FIG. 13 is Plan View from FIG. 12.
Figures 14, 15:
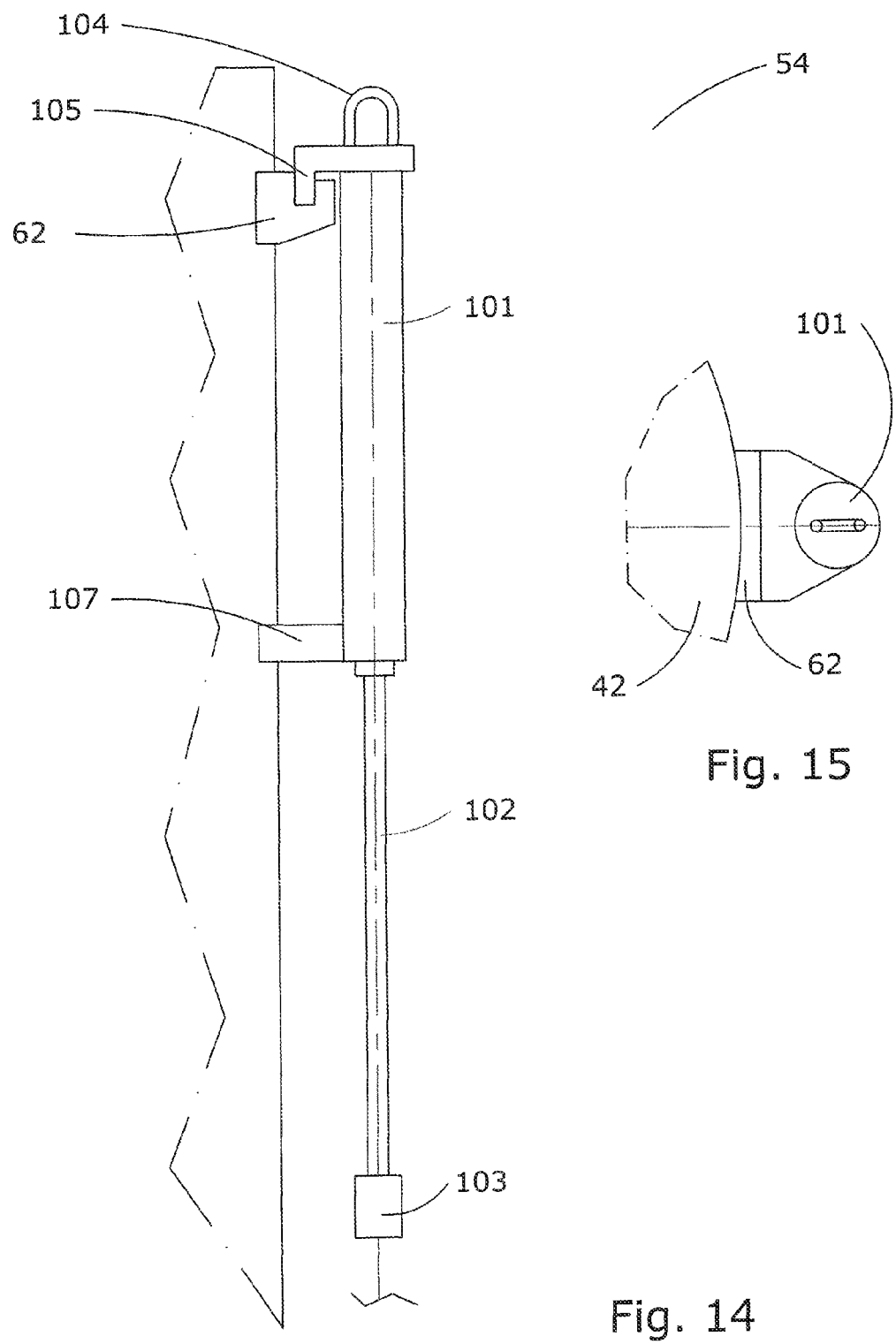
FIG. 14 is portable cylinder.
FIG. 15 is a Plan View from FIG. 14.

For the purpose of accelerating process of Tower 25 installation it is equipped with 3 sets of Portable Hydraulic Cylinders 54. FIGS. 14 and 15 show Portable Hydraulic Cylinder 54, which consists of a cylinder 101, having piston road 102, quick activating gear 103 for disconnecting from mooring line 40 and lifting ear 104 and tooth 105 for rapid engagement with receiver 62 on upper part of Tower 25. On the lower part of cylinder 101 is located trust support 107.

1.2. Detailed Description of the Catamaran WTG Installer for Deepwaters

Figure 18:
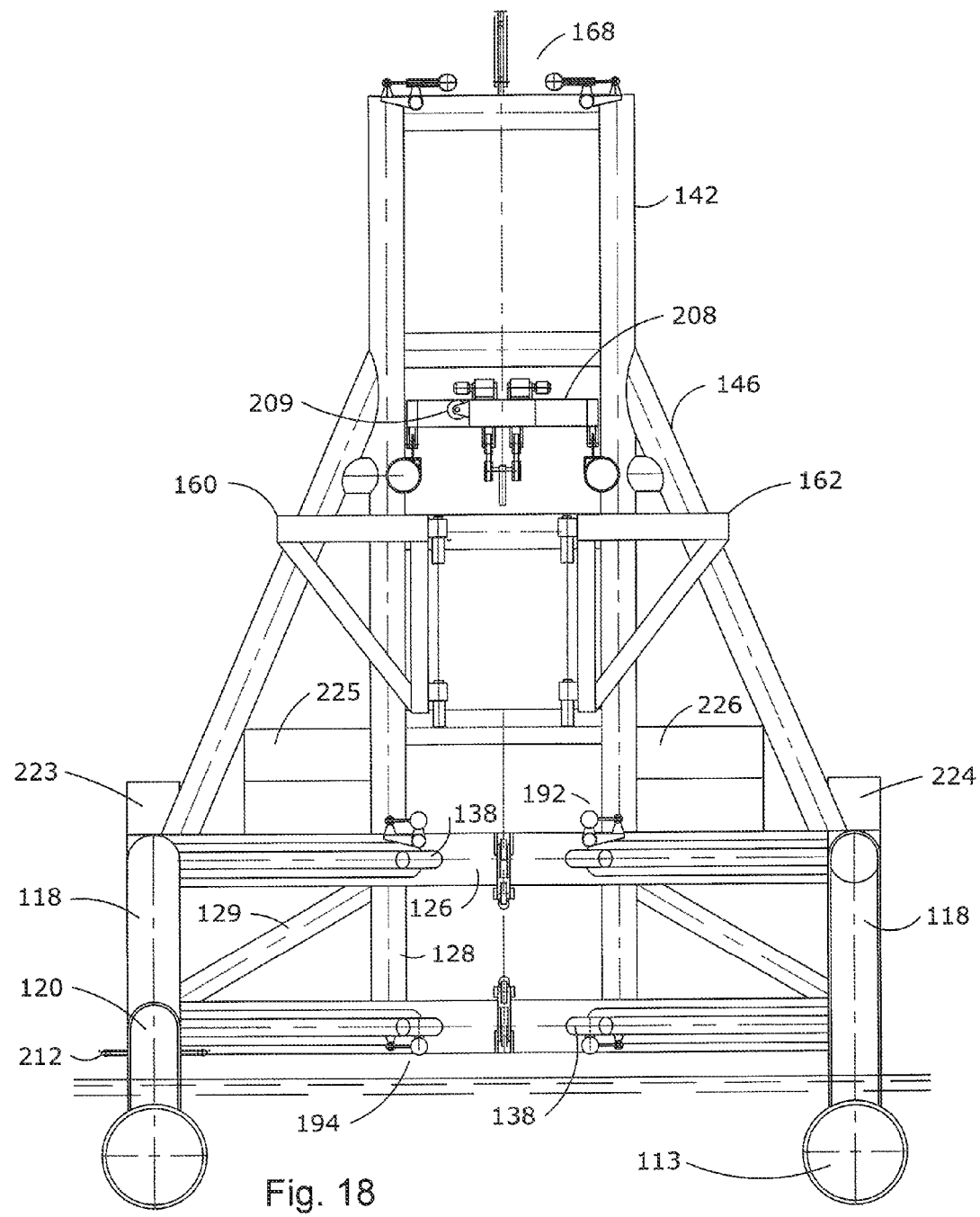
FIG. 18 is a Section 6-6 from FIG. 17.
Figure 19:
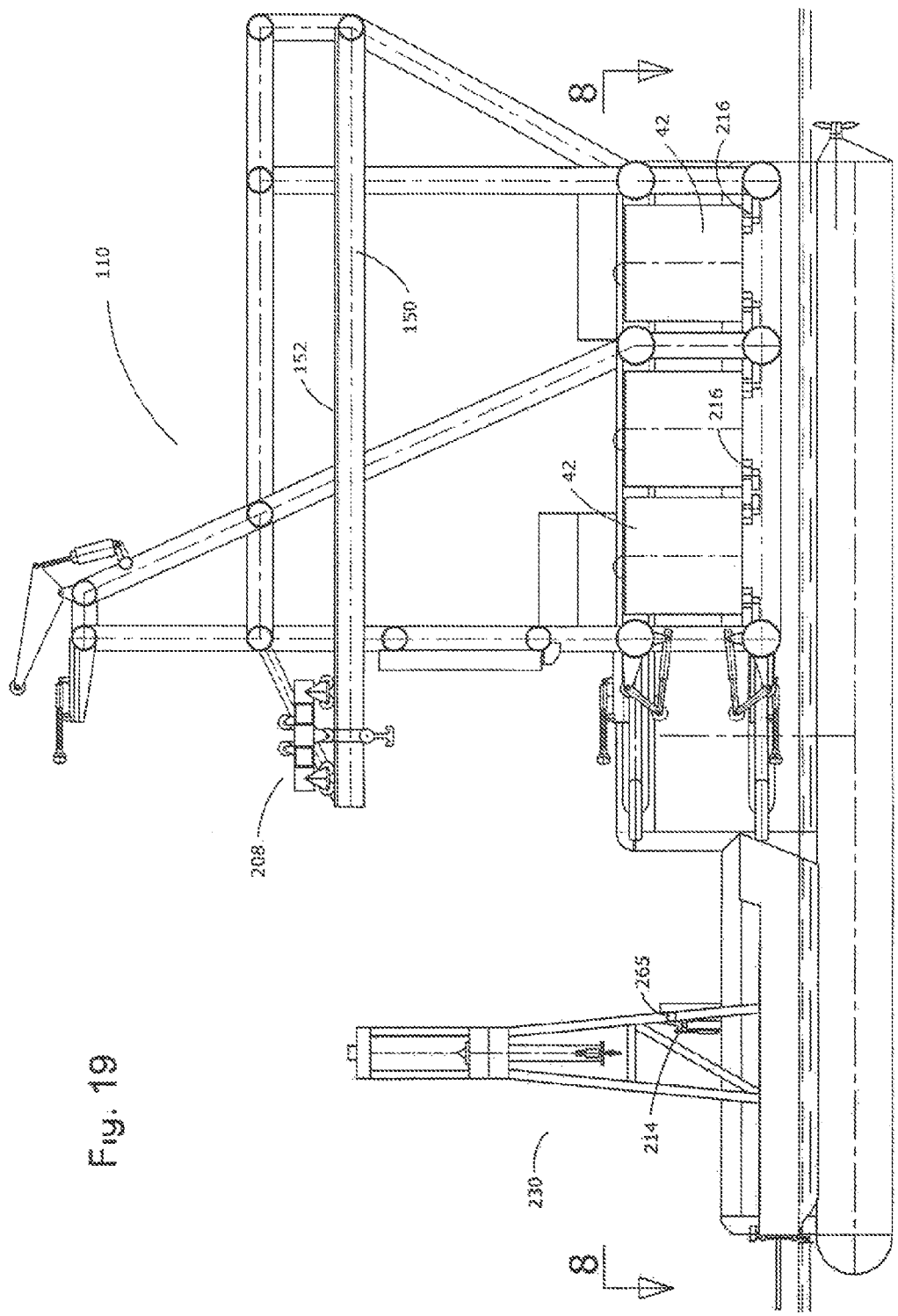
FIG. 19 is a Section 7-7 from FIG. 20 of the CWTI-D with Support Catamaran.
Figure 20:
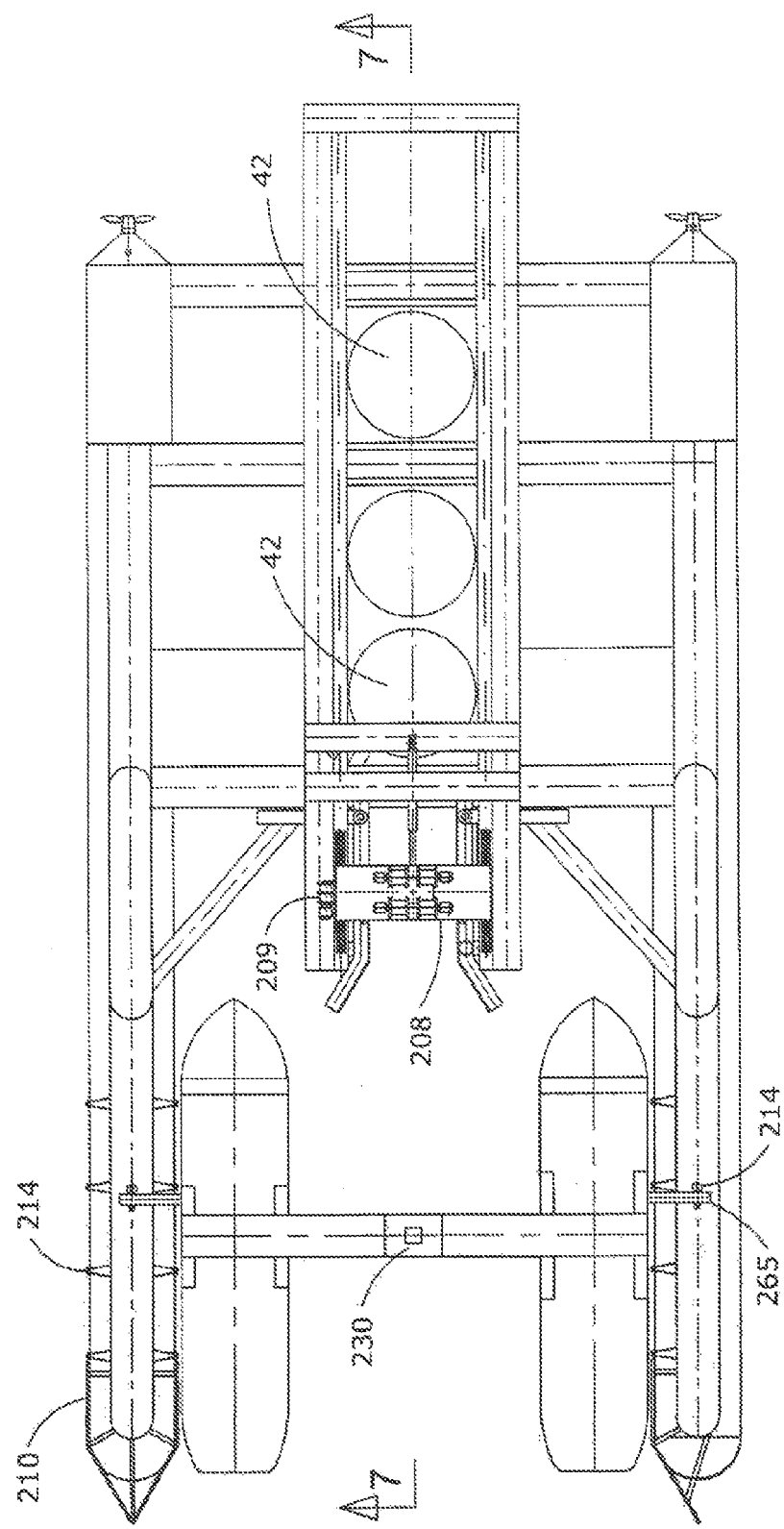
FIG. 20 is a Plan View from FIG. 19.
Figure 21:
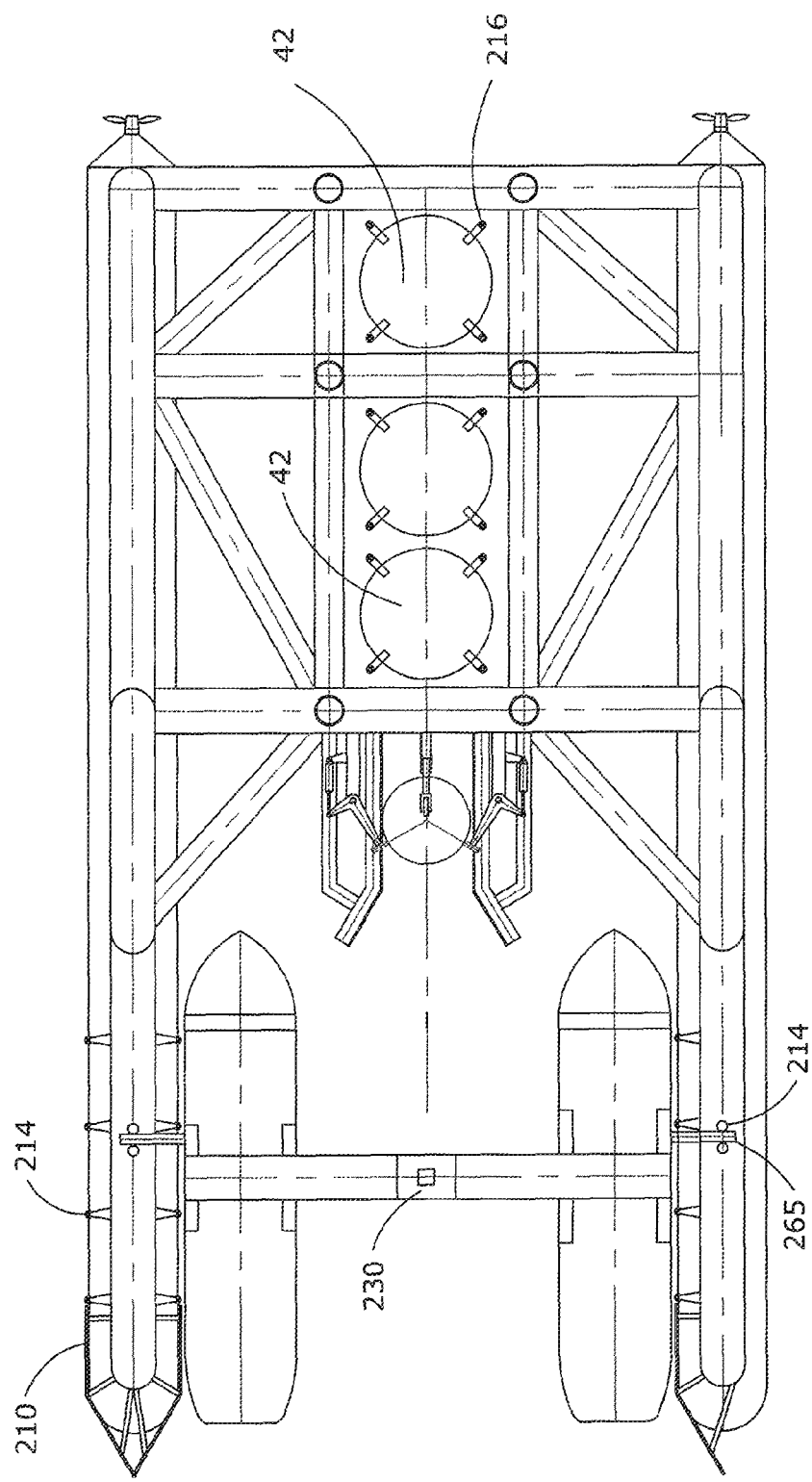
FIG. 21 is a Plan Section from n Elevation of lower foundation engager 98 in the operating position.
Figure 24:
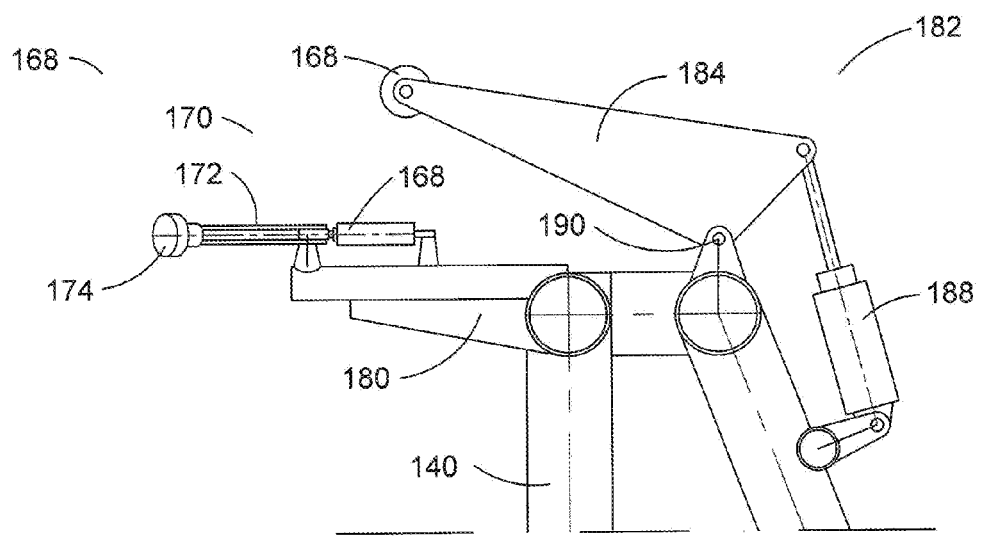
FIG. 24 is a WTG Tower engagement arrangement (Elevation).
Figure 25:
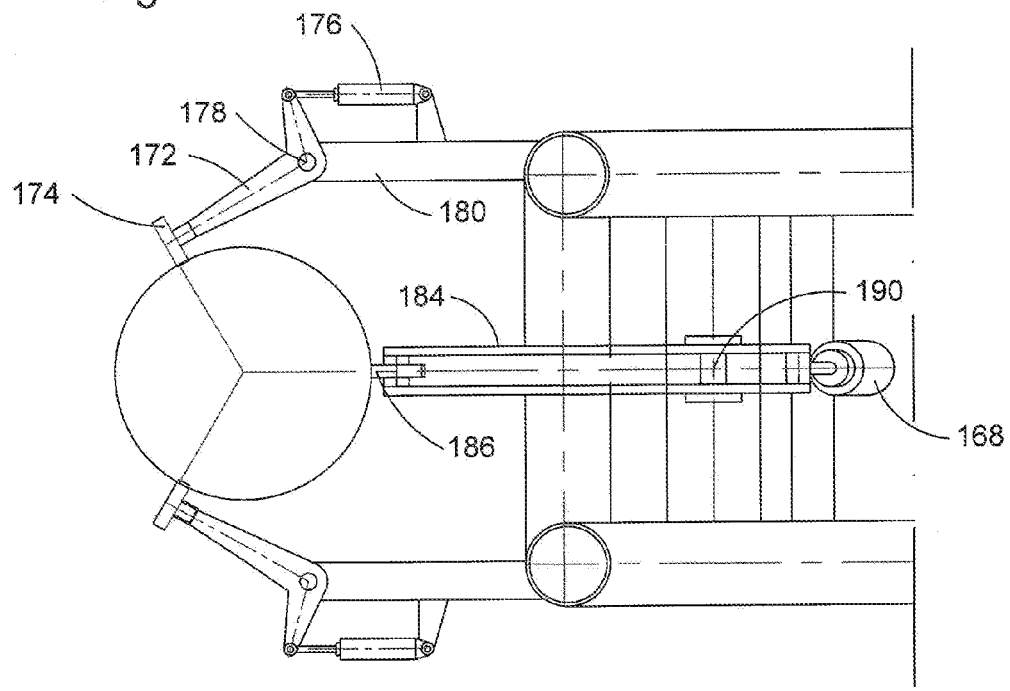
FIG. 25 is a Plan View from FIG. 24.
Figure 55:
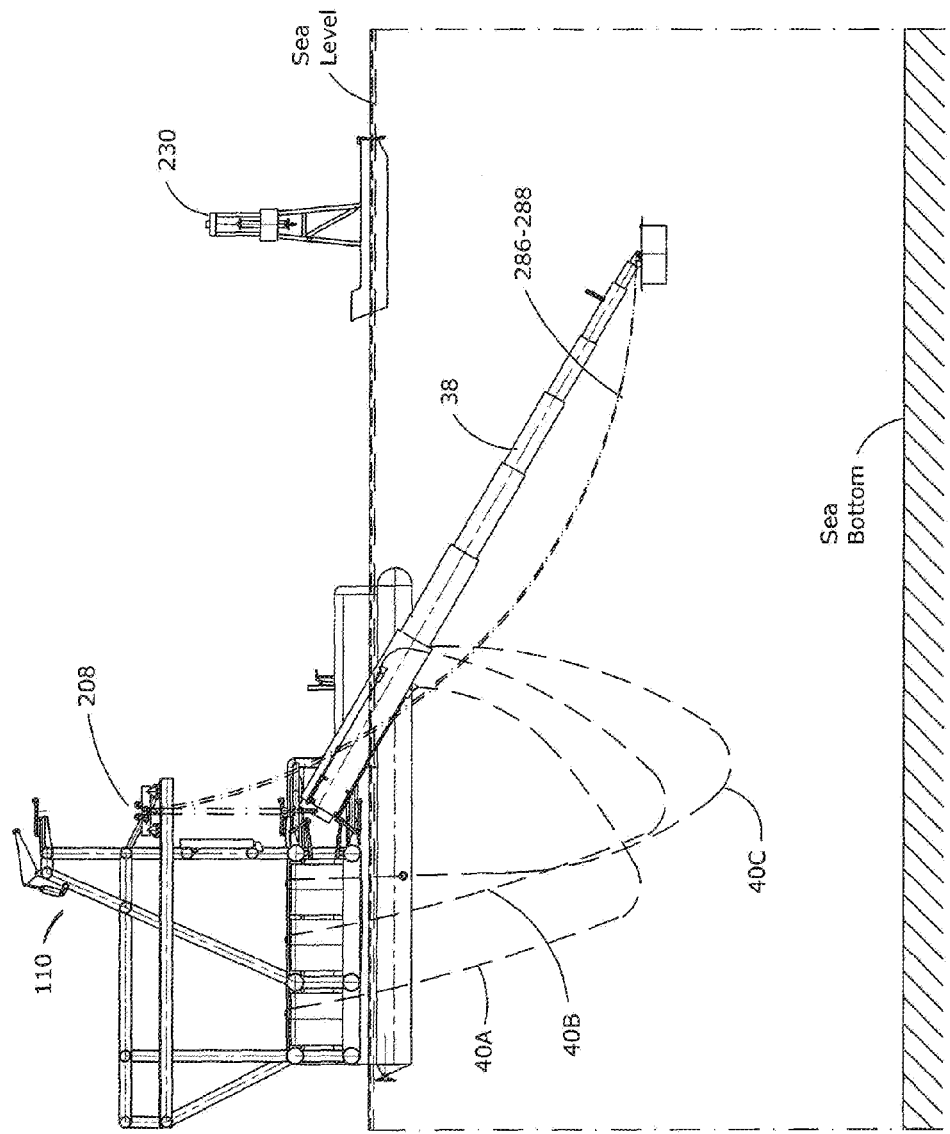
FIG. 55 illustrates submerging of the CGF Tower by rotating around the journal on the upper part of the CGF Tower, which is supported by CWTI-D bridge crane.
Figure 56:
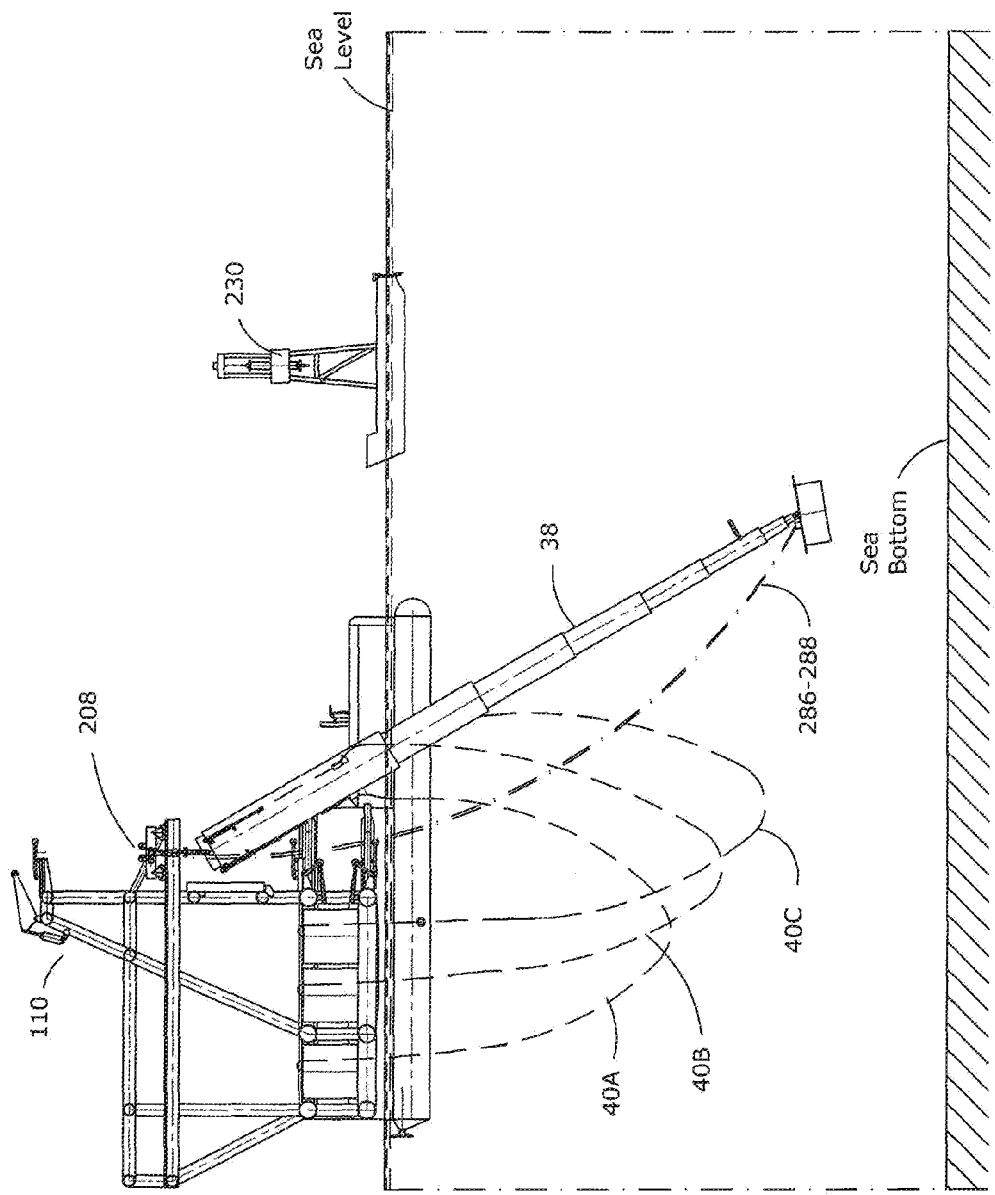
FIG. 56 illustrates further rotating and submerging of the CGF Tower.
Figure 59:
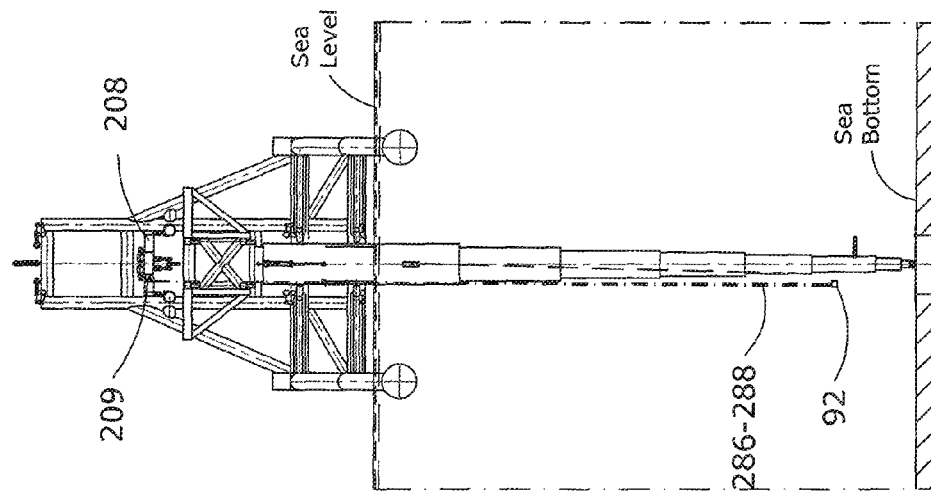
FIG. 59 Illustrates completion of the CGF Tower base penetration into soil.
Figure 60:
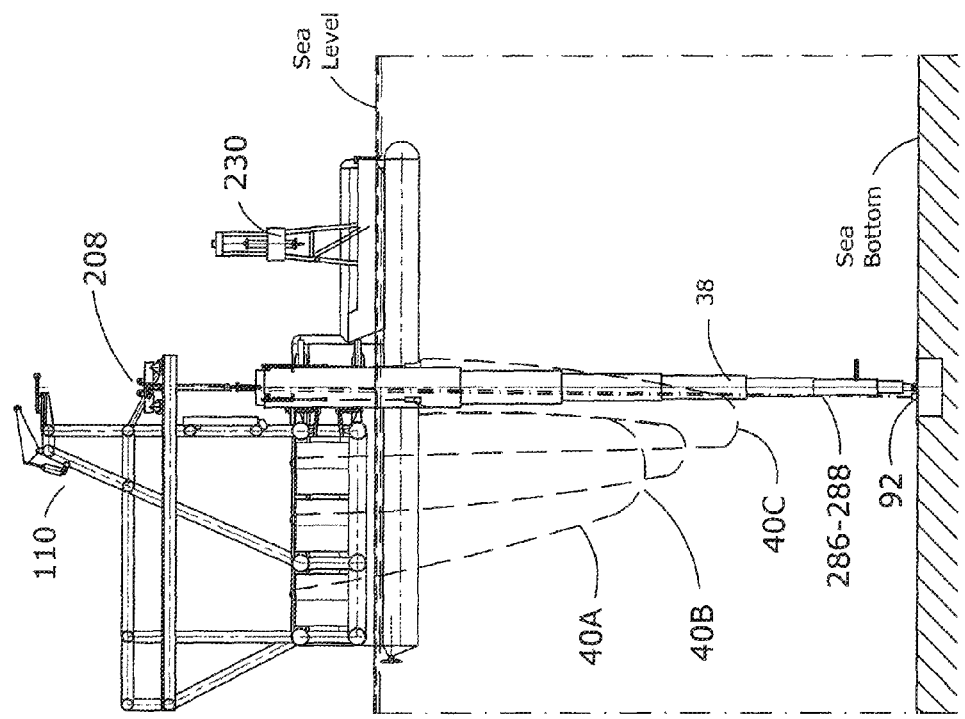
FIG. 60 illustrates side View of CWTI-D after completion of the CGF Tower base penetration into soil.
Figure 61:
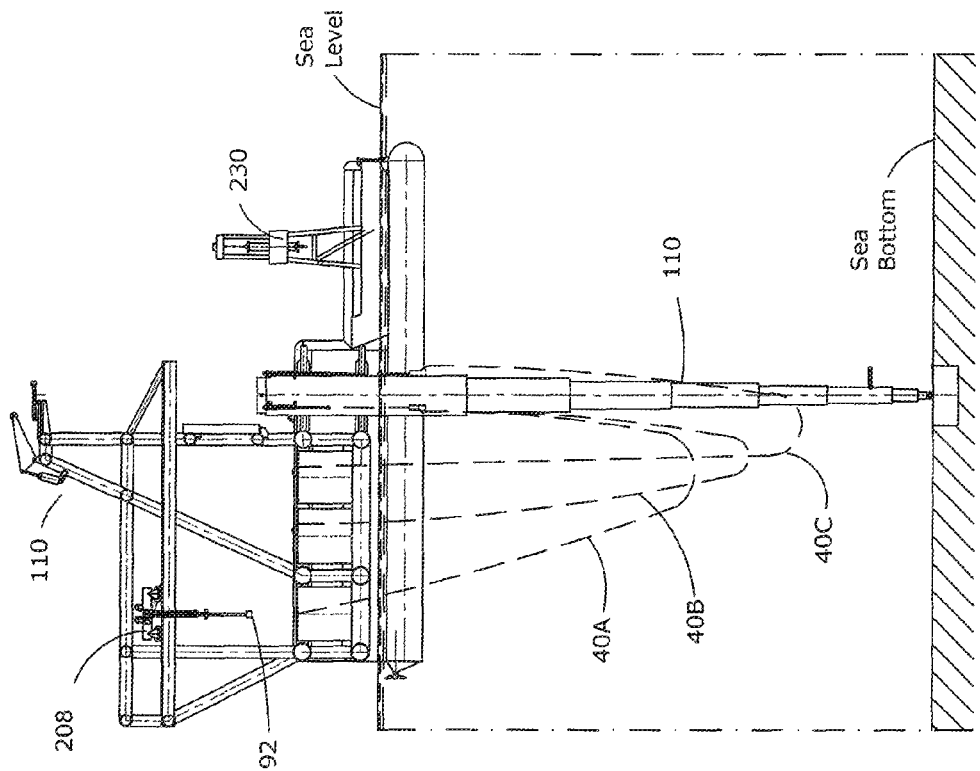
FIG. 61 illustrates another view of the completion of the CGF Tower base penetration into the soil.

FIGS. 16 through 18 illustrate the Catamaran WTG Installer for Deepwaters (CWTI-D) 110 in a mode for placing WTG on the preinstalled Compliant Guyed Foundation (CGF). FIGS. 19 through 21 illustrate CWTI-D in a mode of installing Compliant Guyed Foundation (CGF), which includes the Support Catamaran 230. During the both modes the CWTI-D operates as a SWATH type vessel. It is comprised of lower structure 111 and upper structure 112. The lower structure 111 includes two, having shape of elongated cylinder, pontoons 113, each of them has extended in upper direction hull 114. Each hull 114 consists of bow section 116, central section 118 and stern section 120. The central section 118 of the hull 114 is taller than the bow 116 and stern 118 sections of the hull 114. On the bow part of the pontoons 112 are located propulsion units 119. Hulls 114 are interconnected by a cross structure 122. The cross structure 122 includes a pair of an upper longitudinal beams 123, a pair of lower longitudinal beams 124, cross beams 126; vertical columns 128; braces in vertical plane 129, braces in horizontal plane 130, 132, 134 and 136. The stern part of the lower structure 111 is covered by a deck 137. The cross structure 122 also includes two pair of upper guides 138 and lower guides 139, which centers CWTI-D with WTG foundation.

The upper structure of CWTI-D 112 consists of a pair of vertical columns 142 and 143, and side supports 146, a pair of upper longitudinal beams 148, a pair of lower longitudinal beams 150 with crane rail 152 on their upper part. The upper longitudinal beams 148 are interconnected by cross beams 154. The vertical columns 142 and inclined supports 146 are interconnected between themselves on the top by cross beams 155. On the stern ends of the CWTI-D 110 are located two Power Stations 157. Each of Power Stations 157 includes electro-power generator, air compressor and hydraulic power pack (not shown on drawings).

The upper structure 112 has a two pivotal supports 160 for WTG tower 28 trust stools 34. Each of them (see FIGS. 22 and 23) consists of a frame 161 with upper hinge 162, lower hinge 164 and hydraulic actuator 166. Both hinges are attached to cross beams 156 between column 142.

On the top of the upper structure 140 is located WTG tower engagement arrangement 168 (see Figures from 24 and 25), which consist of two side rollers 170, each having two arms lever 172 with roller 174 attached to outer arm and inner arm connected with hydraulic actuator 176, pivot axis support 178 and frame support 180.

It also includes central roller support 182 having a triangle frame 184 with roller 186 attached to its left corner and hydraulic actuator 188 attached to its right corner. Between the left and right corners of the triangle frame the third corner serves as a pivot support 190 attached to upper structure 112.

The lower structure 111 includes upper engagement arrangements 192 (see FIGS. 26 through 29) for engagement with Compliant Guyed Foundation (CGF) 30 and the lower engagement arrangement 194 (see FIG. 30 through 33). Both of them consist of two side rollers 170A, a breasting wheel 196, which include wheel 198, pivot lever 200 with support console 202, hydraulic shock absorber 204 and trust rollers 206 for upper engagement arrangement 192 and 207 for lower engagement arrangement 194. Each side roller 170A includes: two arms lever 172A with roller 174A attached to outer arm and inner arm connected with hydraulic actuator 176A, pivot axis support 178A and frame support 180A.

During the mode of installing CGF the CWTI-D employs bridge crane 208 with an auxiliary two drum winch 209 for handling hoisting line and power cable of the suction pump 92, Support Catamaran 220 and sets of guides 210 and berthing rollers 212 and a pair of Stoppers 214, which keep Support Catamaran berthed to CWTI-D 110.

Stopper 214 (see FIGS. 34 and 35) consists of head 216 with base 218 and a locker 220 having a hydraulic actuator 222.

The CWTI-D 110 has on board three anchors 42, each of which is positioned on four power operating rotating supports 216. On the upper part of the lower structure 111 are located machinery rooms 223 and 224 and living quarters 225 and 226.

The Support Catamaran 230 (see FIGS. 36 through 39) is a remote controlled vessel. It consists of two pontoons 231 and a cross-frame 233. The cross-frame 233 consist of horizontal frame 235 and two support columns 237. Pontoons 231 have on their stern a remote controlled propulsion system 239. In the middle of horizontal frame 235 is located Quick Connect-Disconnect Arrangement 241. The Quick Connect-Disconnect Arrangement 243 consists of a sliding column 245 and a lifting arrangement 247. The sliding column 245 has on its lower end a hydraulically operated engager 242, which consists of a pair pivoted hooks 249, base 251 and a pair of hydraulic cylinders 253. On the upper end of sliding column 245 is located trust ring 255 with a lifting eye 257. The lifting arrangement 247 consists of a frame 259 with hoisting which 261 on its top. The hoisting winch 261 has a hoisting line 263, which is attached to lifting eye 257 on the top of the sliding column 245. On the outer sides of the support columns 237 are located two engaging bars 265.

1.3. Detailed Description of the Process of Transporting Compliant Guyed Foundation to Destination Site and Installing it There At the first step the Tower 38 of Compliant Guyed Foundation 30 is delivered to Transfer Pier 280 on two carriages, front one 282 and rear one 284 running on the rails 285. (see FIGS. 39, 40 and 41). The three mooring lines 40 are attached by one end to tension cylinder 64 and by other end to the upper part 44 of the Tower 38 and by this forming a loop. The suction pump 92 on the suction bucket base 52 has its hoisting line 286 and power/control cable 288 attached to the top of the Tower 38 upper part 111. The suction bucket base 52 is in inclined position to avoid interference with carriages 282 and 284.

At the second step the Catamaran Tower Installer (CWTI-D) 110 approaches Transfer Pier 280 with its stern and Support Catamaran 120 upfront (see FIGS. 42 and 43). Then it moves closer to the shore line along the pier 280 until the center of bridge crane 208 would coincide with journal 61 on the Tower 38 (see FIGS. 44 and 45). Then bridge crane 209 lowers its hook and interconnects with journal 61. Simultaneously the hoisting line 286 and power/control cable 288 would be connected to the winch 209 on the bridge crane 208 and mooring lines 40 would be connected to suction buckets anchors 42.

At the third step the CWTI-D 110 lifts upper part of Tower 38 from carriage 282 and moves out along the pier 280 until lifting arrangement 53 on Tower 38 would coincide with the center of Support Catamaran 230. At this moment the Support Catamaran 220 engager 242 gets in contact lifting gear 53 on Tower 38 (see FIGS. 47 and 48). After this engagement is completed the carriage 284 lowers its support for Tower 38, which starts to rotate around the suspended by bridge crane 208 journals 61. The downward movement through sliding column 245 and its trust ring 255 transfers to upper part of Catamaran 220, which would start to sink until it buoyancy would balance the weight of the lower end of Tower 38. When the balance would be achieved the carriage 284 would go out of contact with Tower 38 end (see FIGS. 49 and 50). Thus would allow pulling Tower 38 from engagement with Transfer Pier 280. As soon it would clear the Transfer Pier 280 the base 52 would be put from transport mode to the installation mode (see FIGS. 51 and 52).

The forth step includes delivery the Tower 38 by CWTI-D 110 to destination site and its installation there (see FIGS. 53 through 61) includes the following actions:

The first would be rotating Tower 38 into vertical position it would start by releasing the Tower 38 lower end from suspension by Support Catamaran 230. The engager 242, by rotating outward hooks 249, disconnects them from lifting gear 53 and by this initiates the lower end of Tower 38 to go in the "free fall" rotating around journals 61 suspended by bridge crane 208 (see FIGS. 53 through 57). After the Tower 38 reach the full vertical position, than the bridge crane 208 starts to lower Tower 38 to the seabed. The first comes in contact with seabed soil anchor-suction bucket 52. Under the own weight of Tower 38 the suction bucket 52 would partially penetrate into soil and when resistance of the soil would become greater that weight of Tower 38 the suction bucket 52 further penetration in soil would stop. Then the pump 92 would be activates and under hydrostatic pressure suction bucket 47 would fully penetrate into soil.

Figure 62:
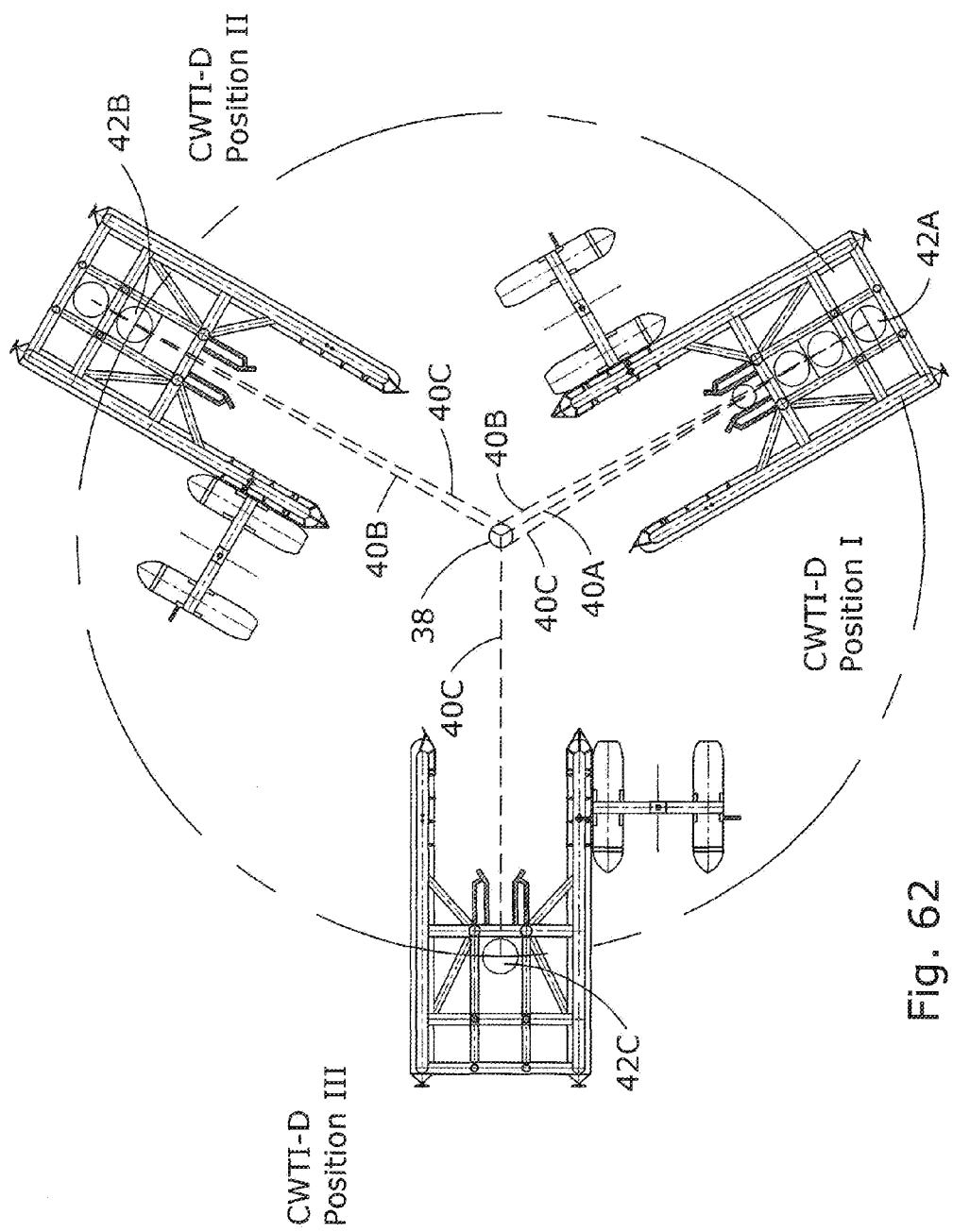
FIG. 62 illustrates three positions of the CWTI-D for placing anchors on the equal distance from the CGF.
Figure 63:
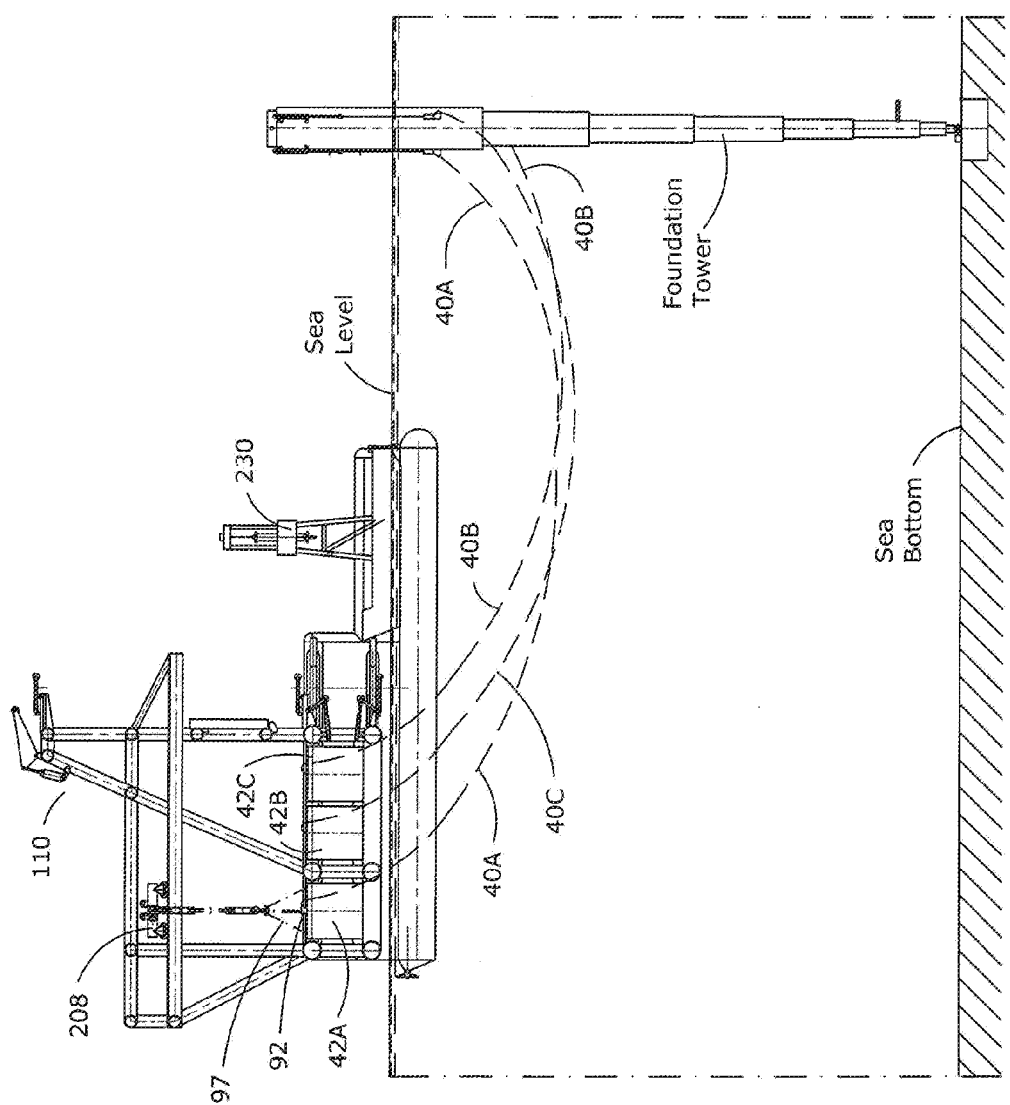
FIG. 63 illustrates the CWTI-D in position ready to lower the first anchor.
Figure 64:
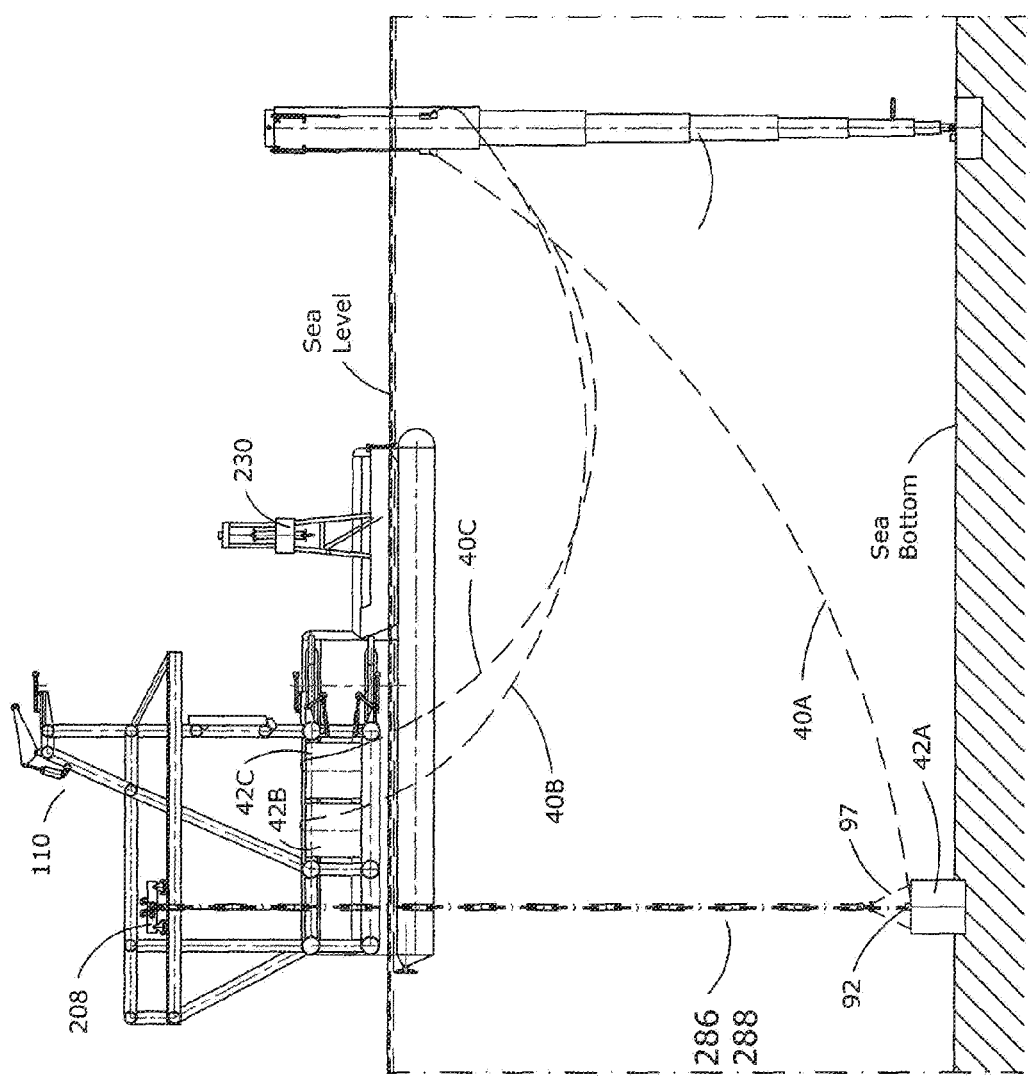
FIG. 64 illustrates the first anchor penetrating soil under its own weight.

The fifth step is placing anchors 42A, 42B and 42C on seabed is illustrated by schematic on the FIG. 62 and it consists of the following operations:

After completion of Tower 38 installation the CWTI-D 110 moves radially outward off the Tower 38 on a certain distance. Before starting this action the bridge crane 208 position suction pump 92 on the anchor 42 receiver 90 (see FIG. 61). After attaching to anchor 42 slings 98A bridge crane 208 slightly lifts up the anchor 42A. This action would allow rotating anchor 42A supports 216 out of contact with anchor 42A. Thus clears the way for lowering anchor 42A to seabed. After anchor 42A reaches the sea bottom it would penetrate the soil on some distance under its own weight. After that the suction pump 92 would be activated and under hydrostatic force the anchor 42A would fully penetrate into soil. After that under command from CWTI-D 110, given through the power/control cable 288 the suction pump 92 would be disconnected from the anchor 42A and would be lifted up through a hoist line 286 and by two drum winch 209. This action completes the anchor 42 installation (see FIGS. 61 through 66). FIGS. 62 through 70 illustrate process of installation of anchor 42B which is done in the same manner as installation of anchor 42A. The process of installation anchor 42C would be the same as for anchors 42A and 42B. The FIG. 71 illustrates final position of CWTI-D 110 after it completed installation of anchor 42C.

Figure 77:
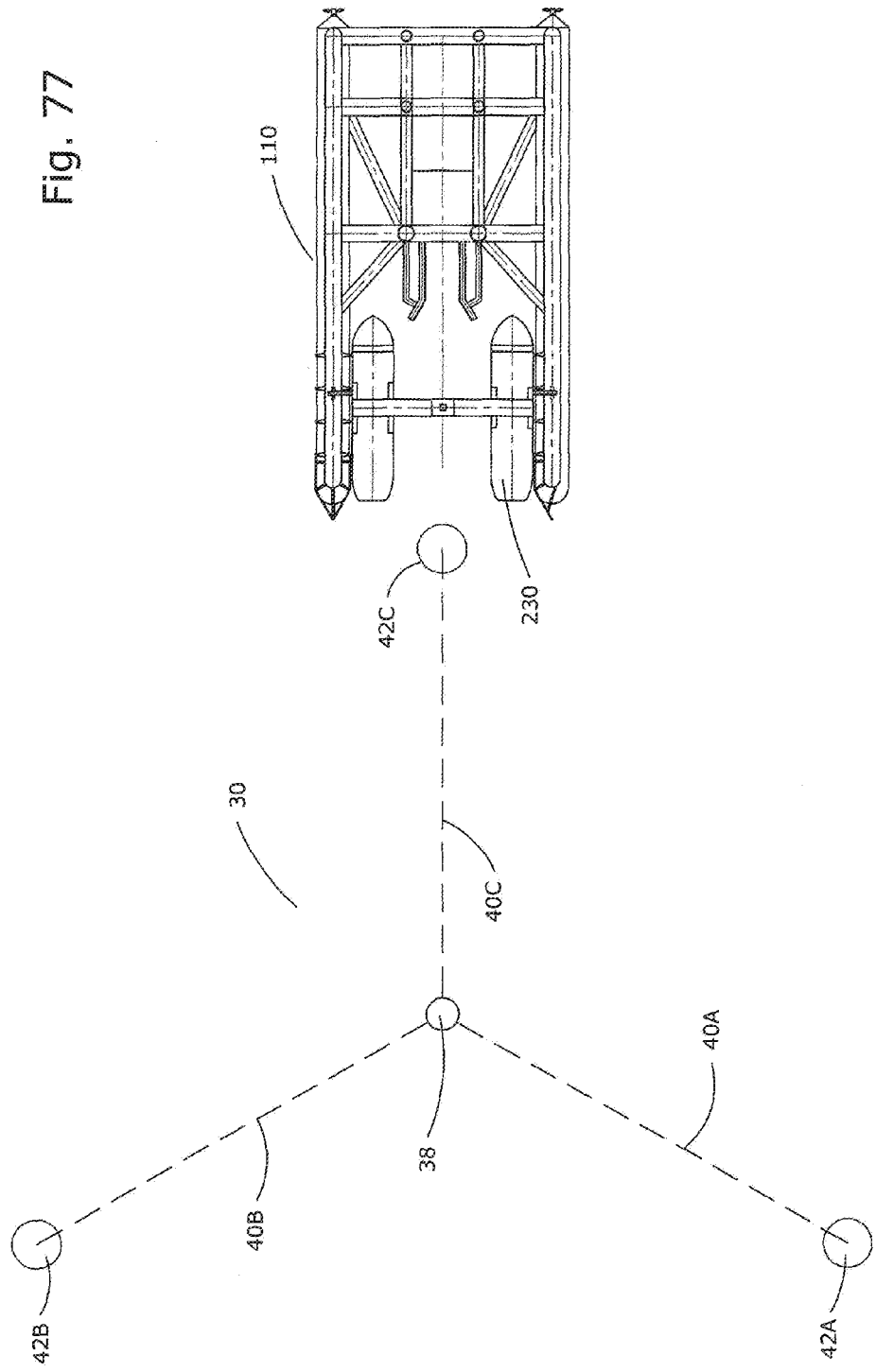
FIG. 77 is a Plan View from FIG. 76 illustrating CWTI-D mowing away with Support Catamaran inside of it.
Figure 88:
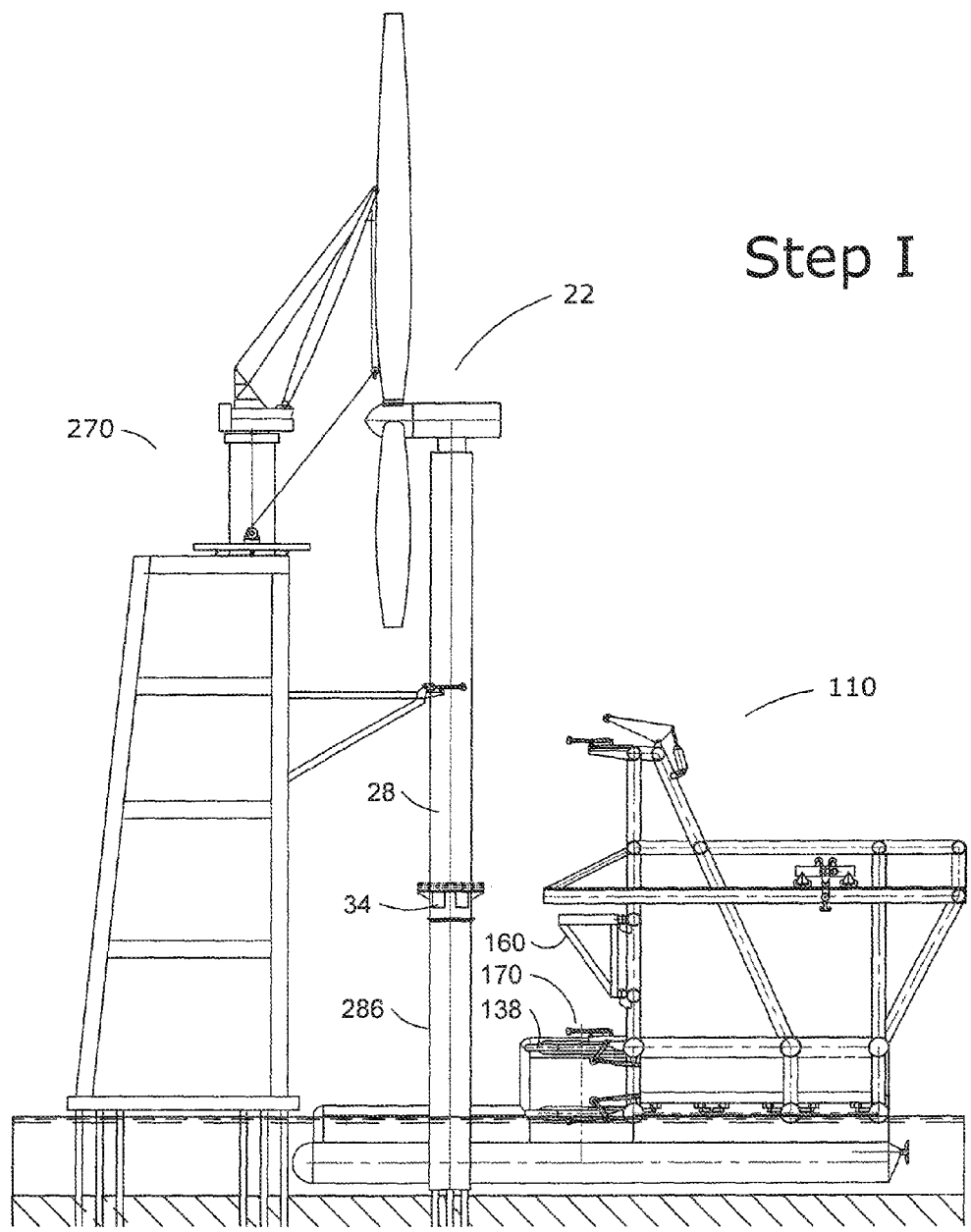
FIG. 88 shows Step I of engaging CWTI-D with Shore Stand and lifting WTG from it.
Figure 95:
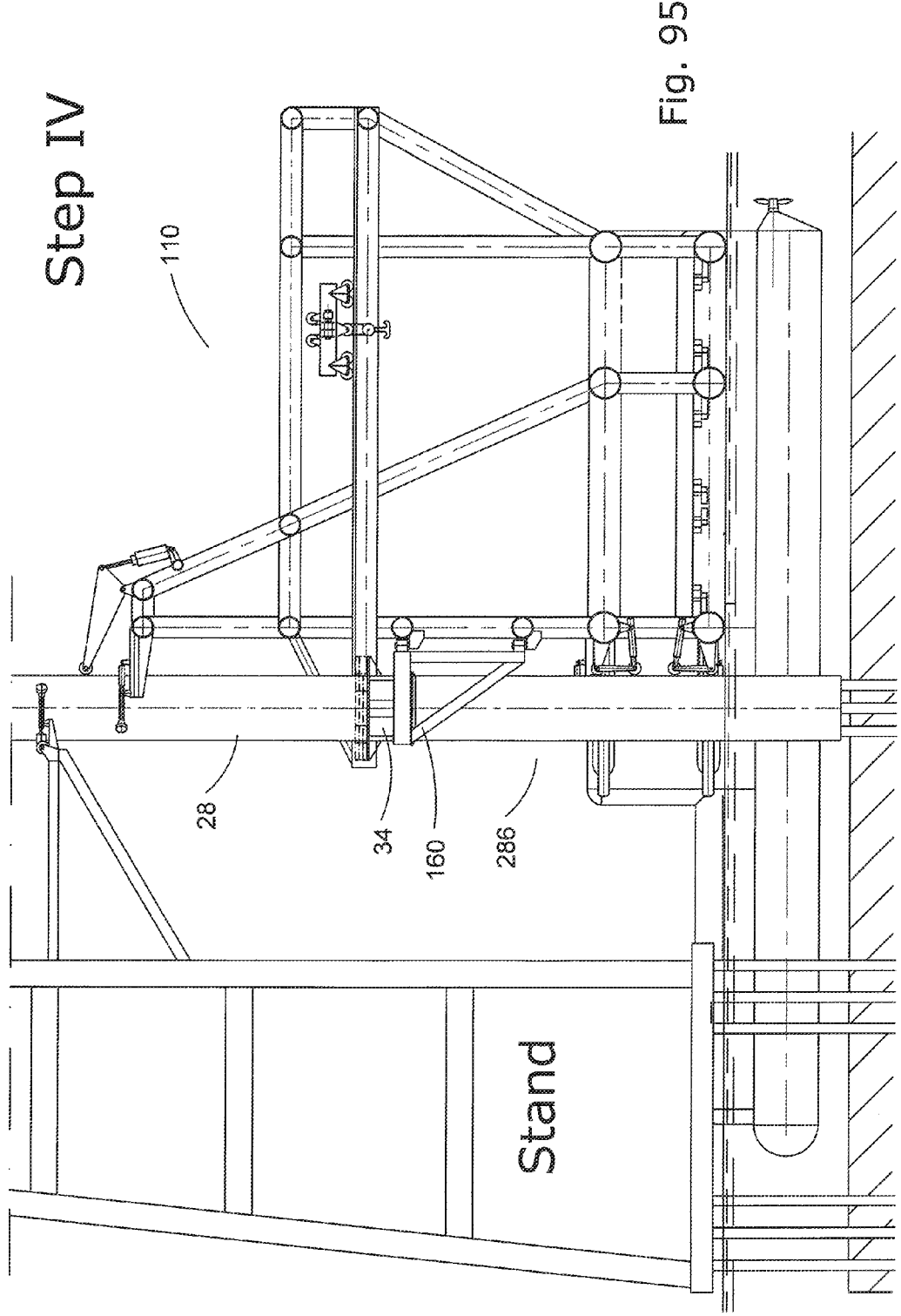
FIG. 95 shows Step IV of engaging CWTI-D with Shore Stand and lifting WTG from it.
Figure 96:
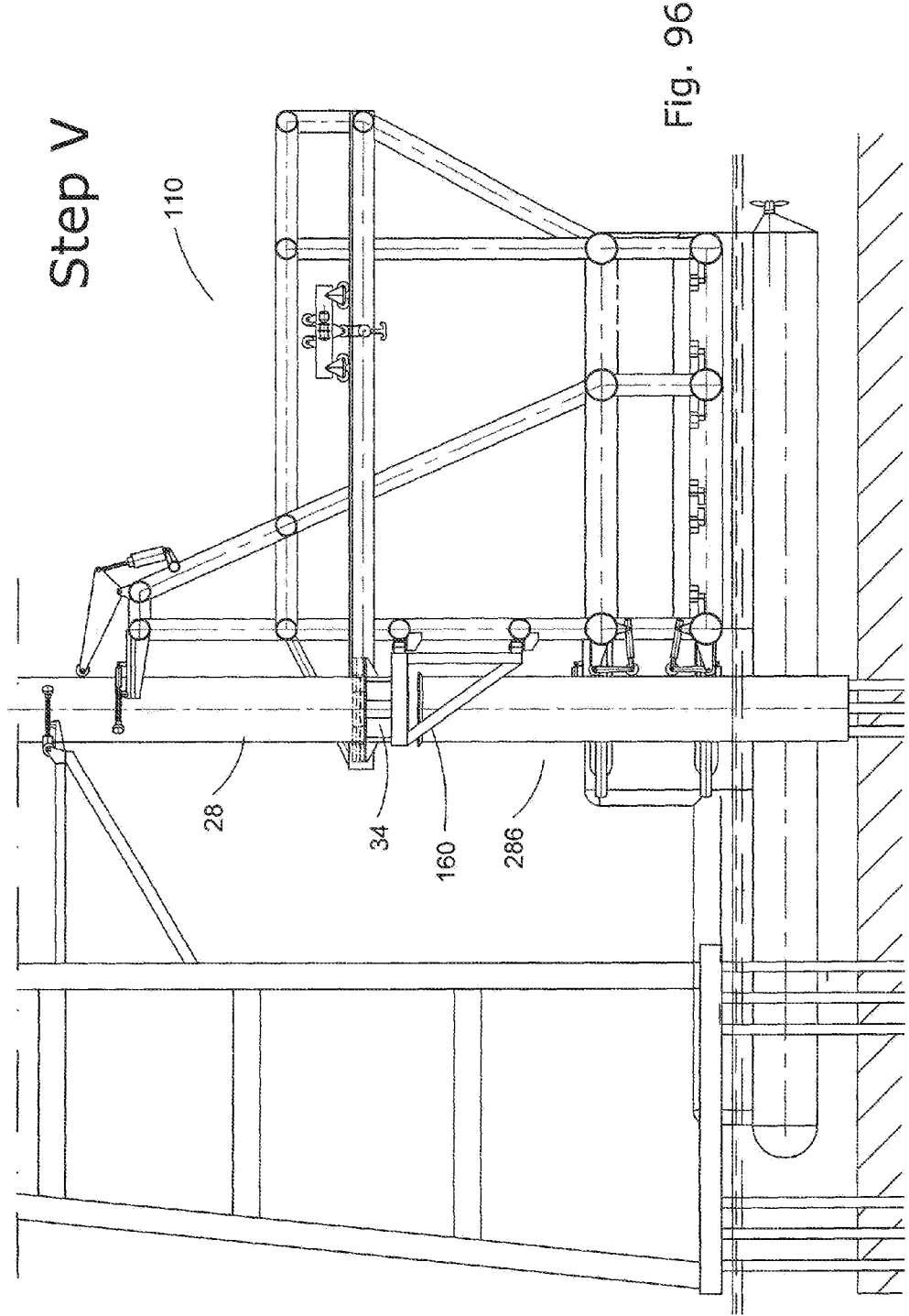
FIG. 96 shows Step V of engaging CWTI-D with Shore Stand and lifting WTG from it.
Figure 98:
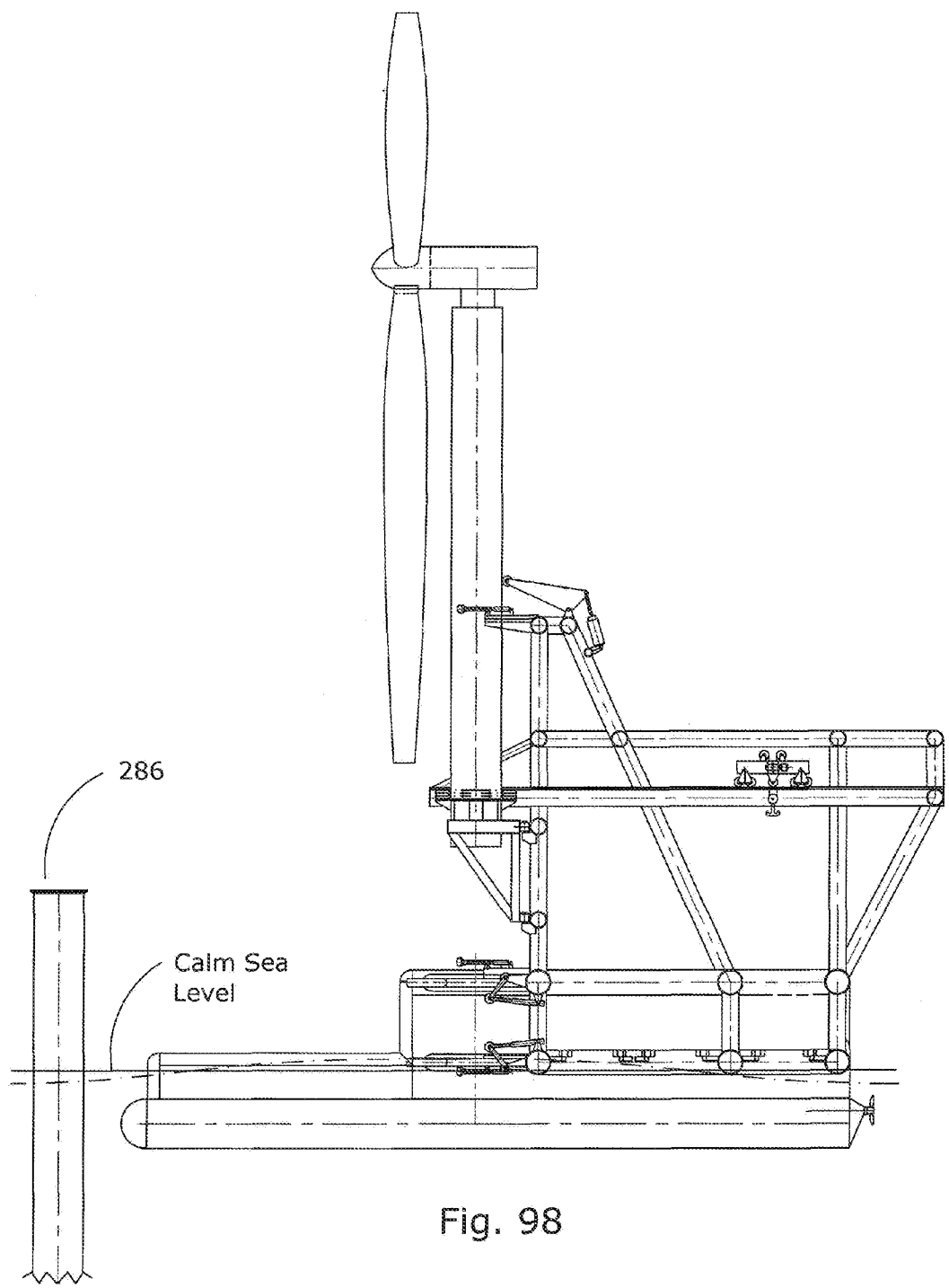
FIG. 98 shows CWTI-D with completely assembled WTG on board approaching preinstalled foundation.
Figure 99:
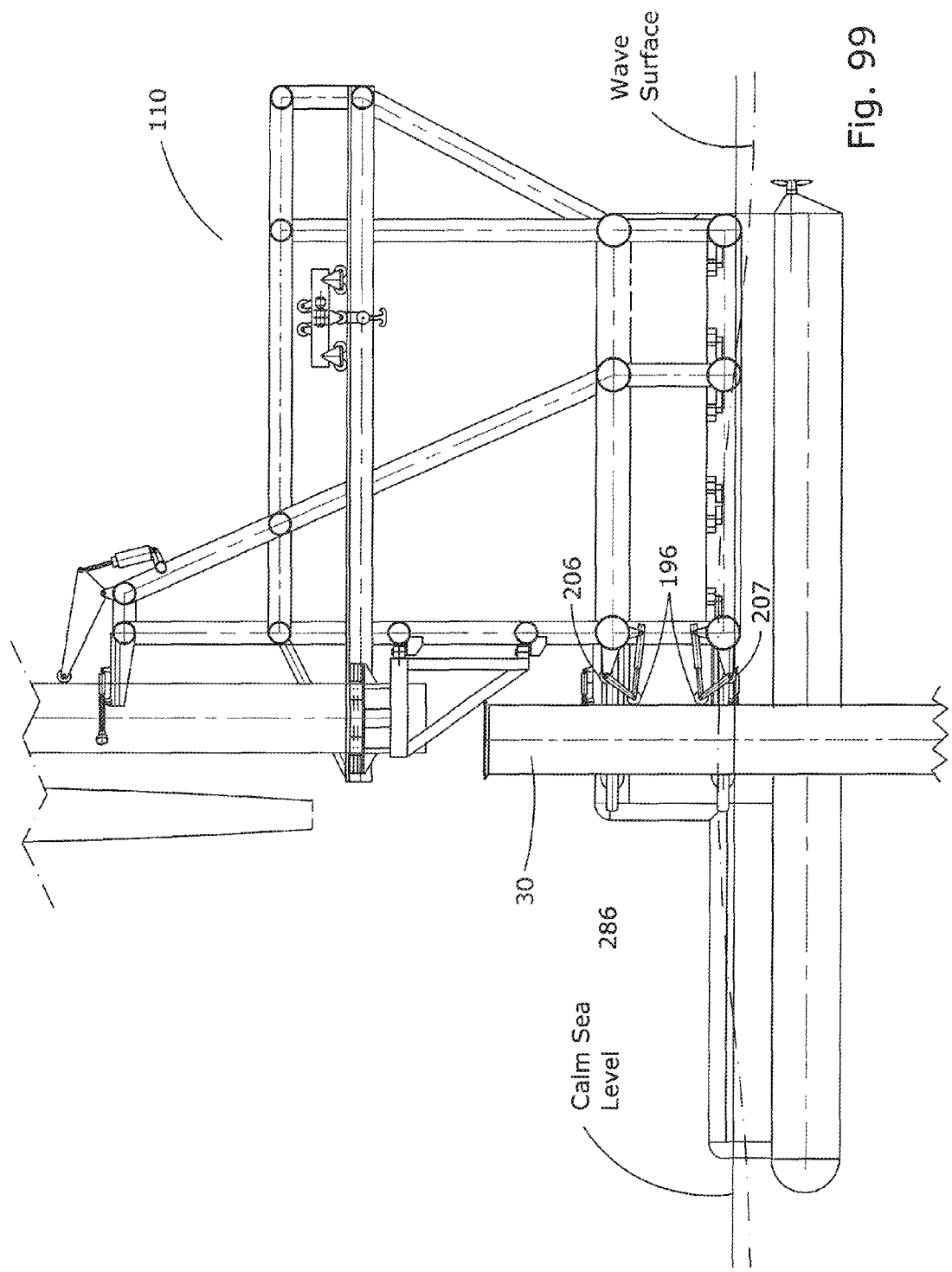
FIG. 99 shows CWTI-D in transport mode engaged with foundation through breasting wheels.
Figure 100:
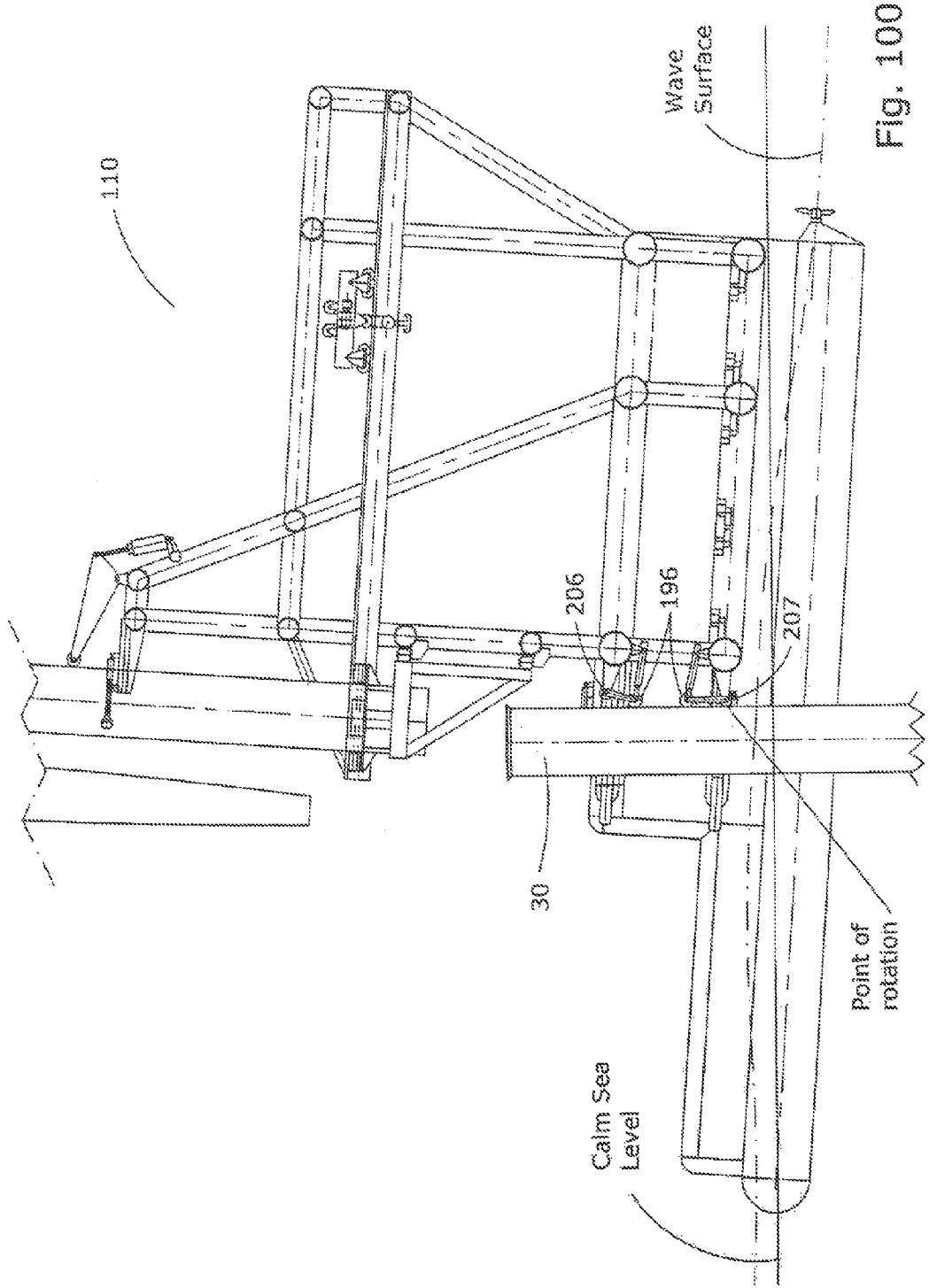
FIG. 100 shows CWTI-D pitching in bow direction having pivot point at lower trust roller.
Figure 101:
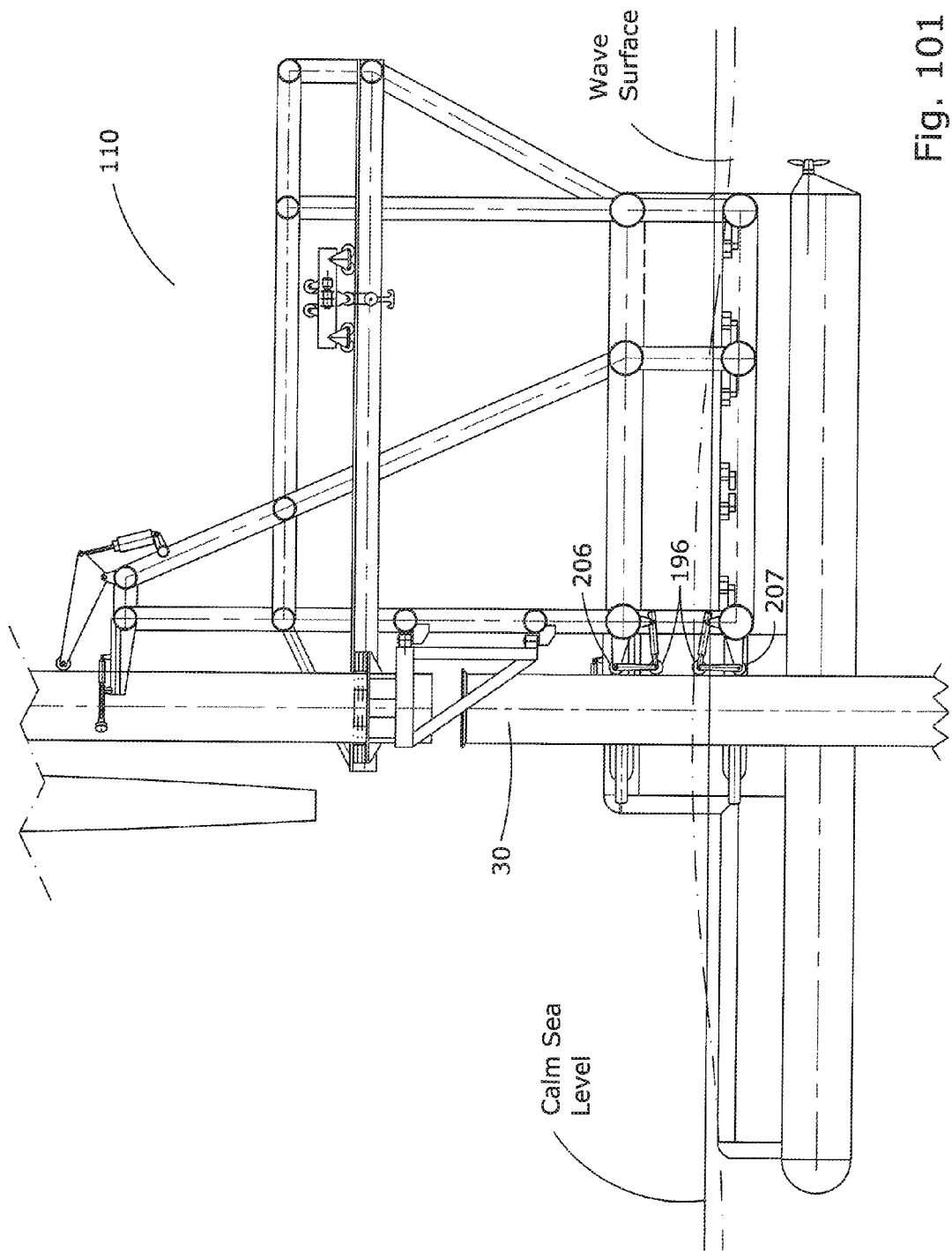
FIG. 101 shows CWTI-D between two pitching extremes during the process of going from transport mode into semisubmersible mode.
Figure 102:
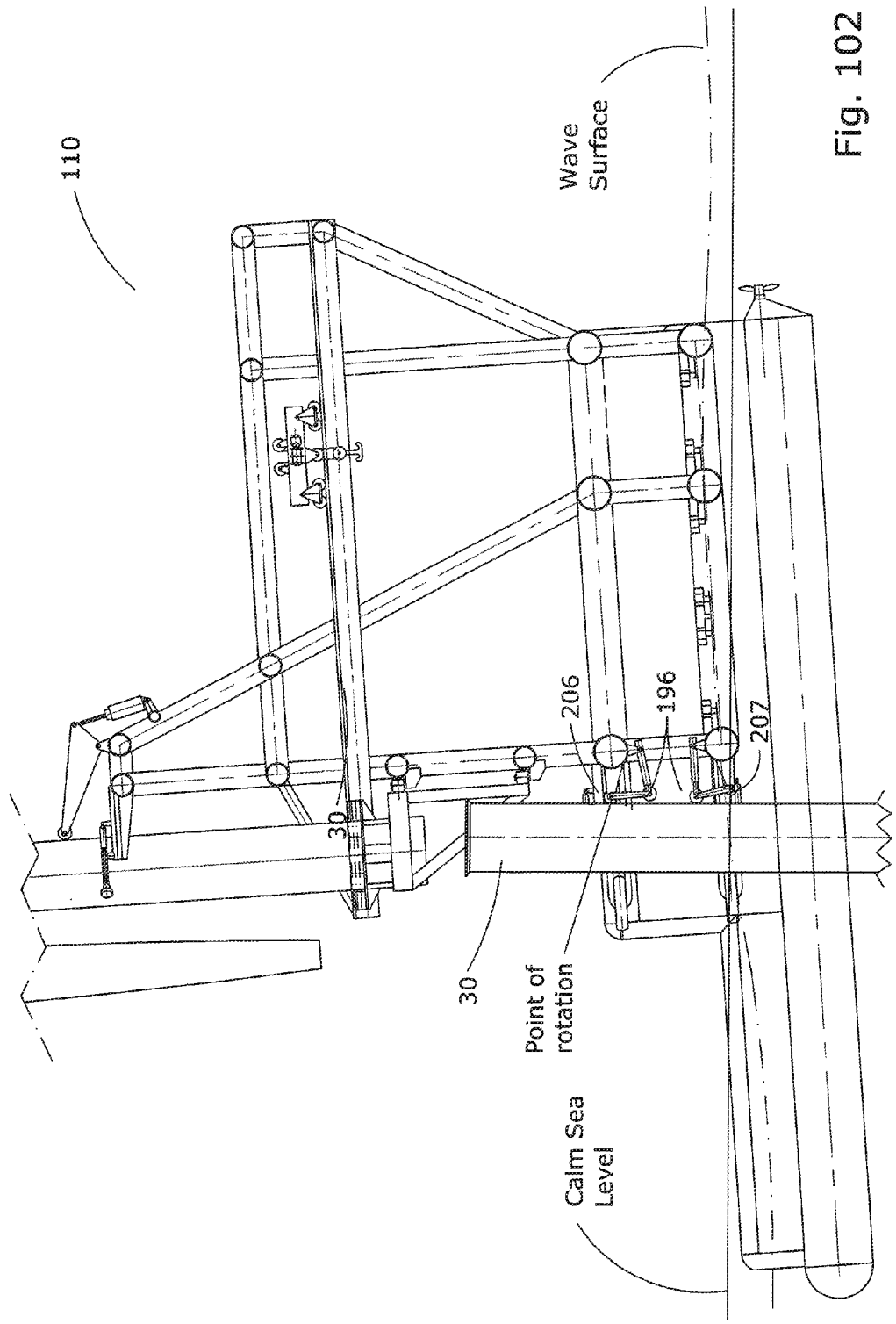
FIG. 102 shows CWTI-D pitching in stern direction having pivot point at upper trust roller.
Figure 109:
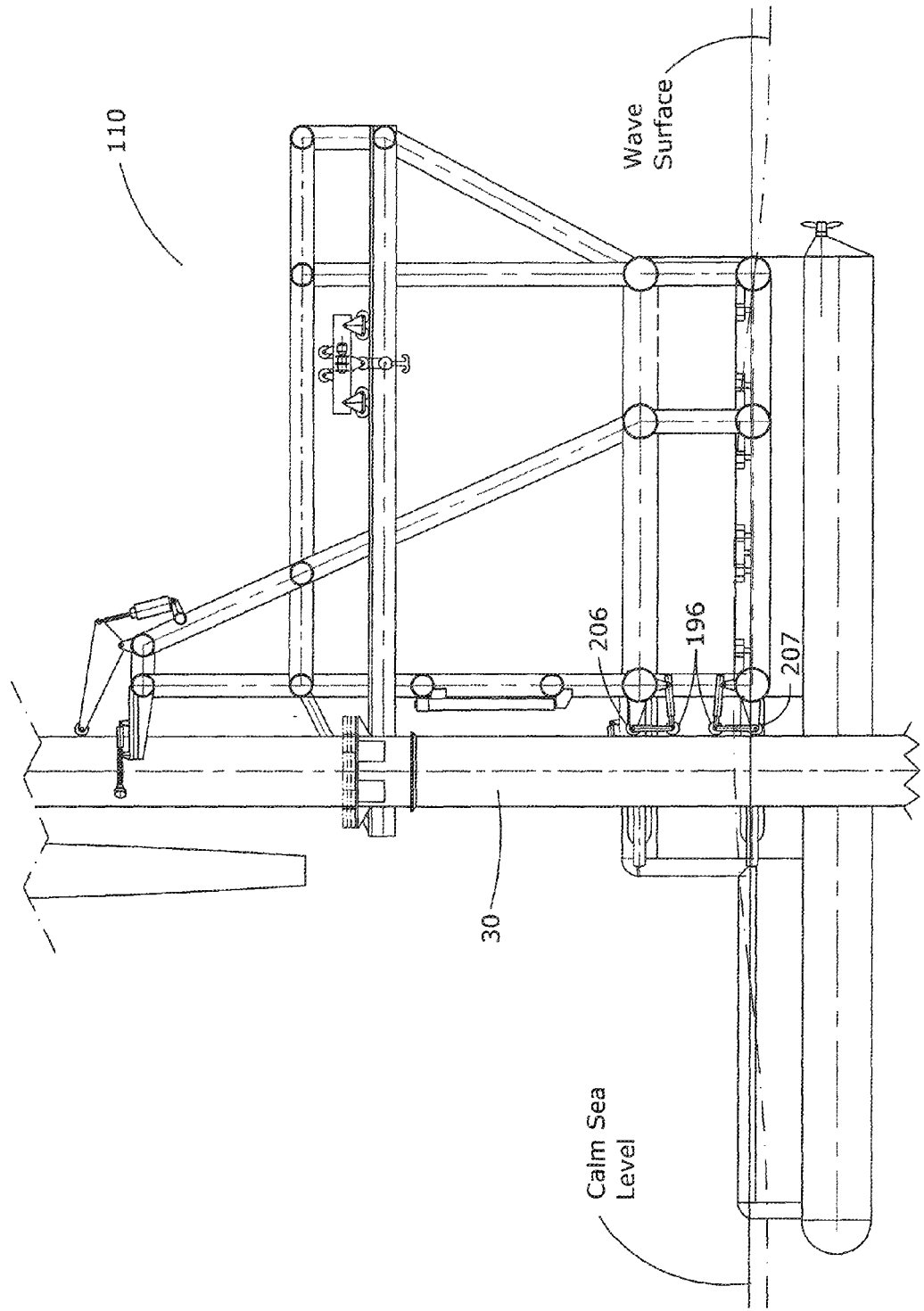
FIG. 109 shows CWTI-D floating up to sea level.
Figure 110:
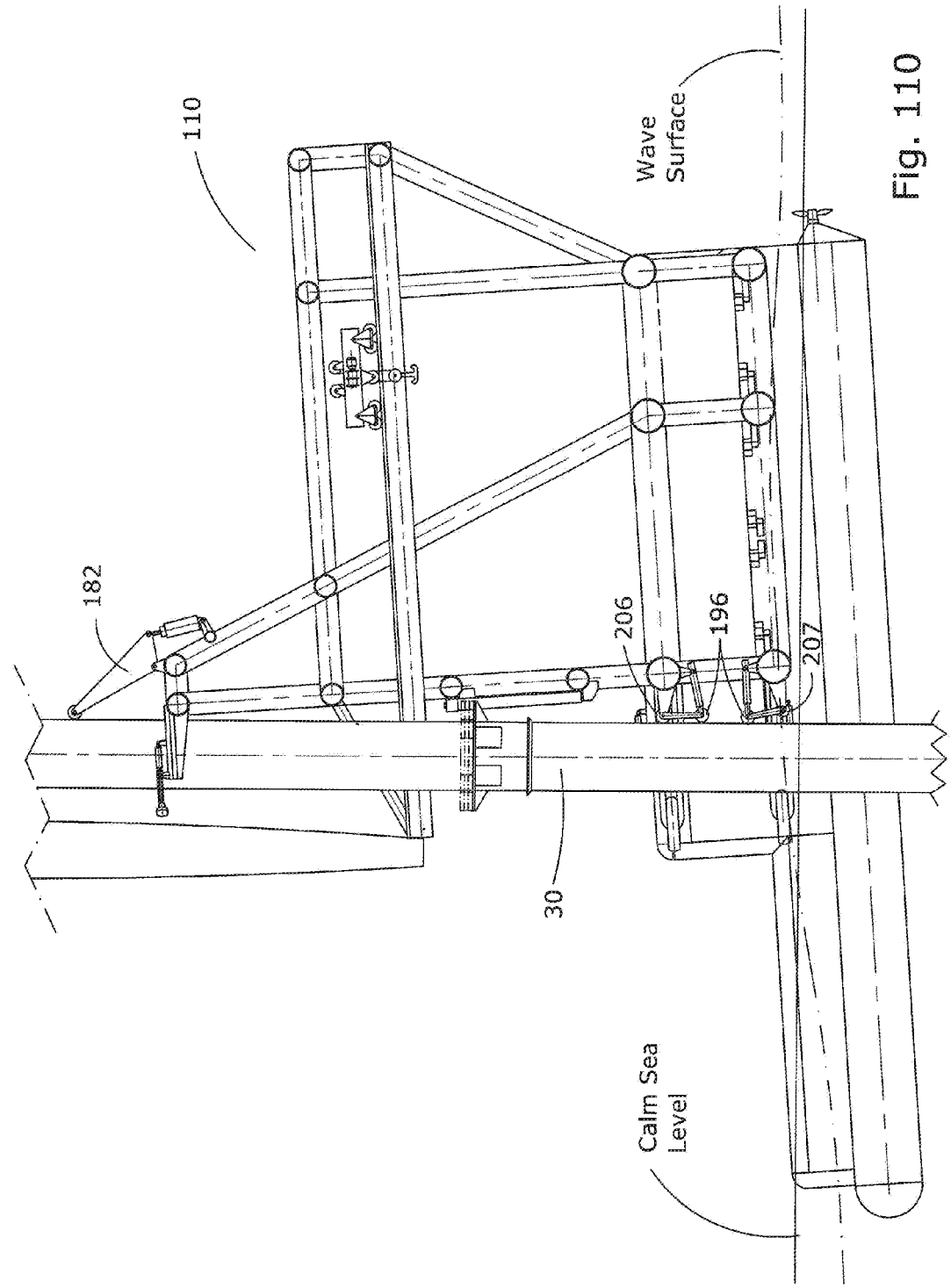
FIG. 110 shows CWTI-D pitching in bow direction and being still in contact with foundation.
Figure 111:
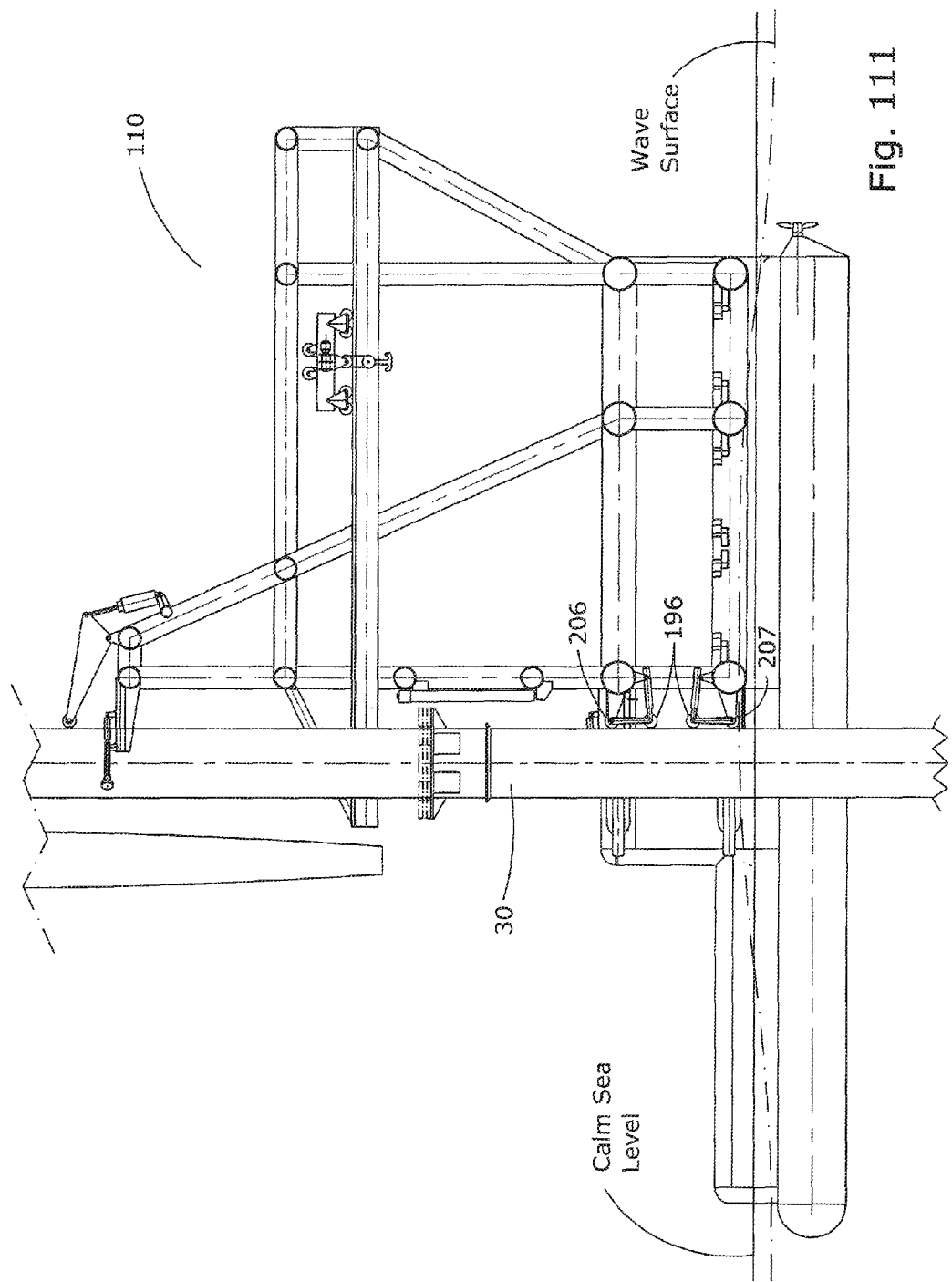
FIG. 111 shows CWTI-D between two pitching extremes during the process of floating up from semisubmersible mode to transport mode.
Figure 112:
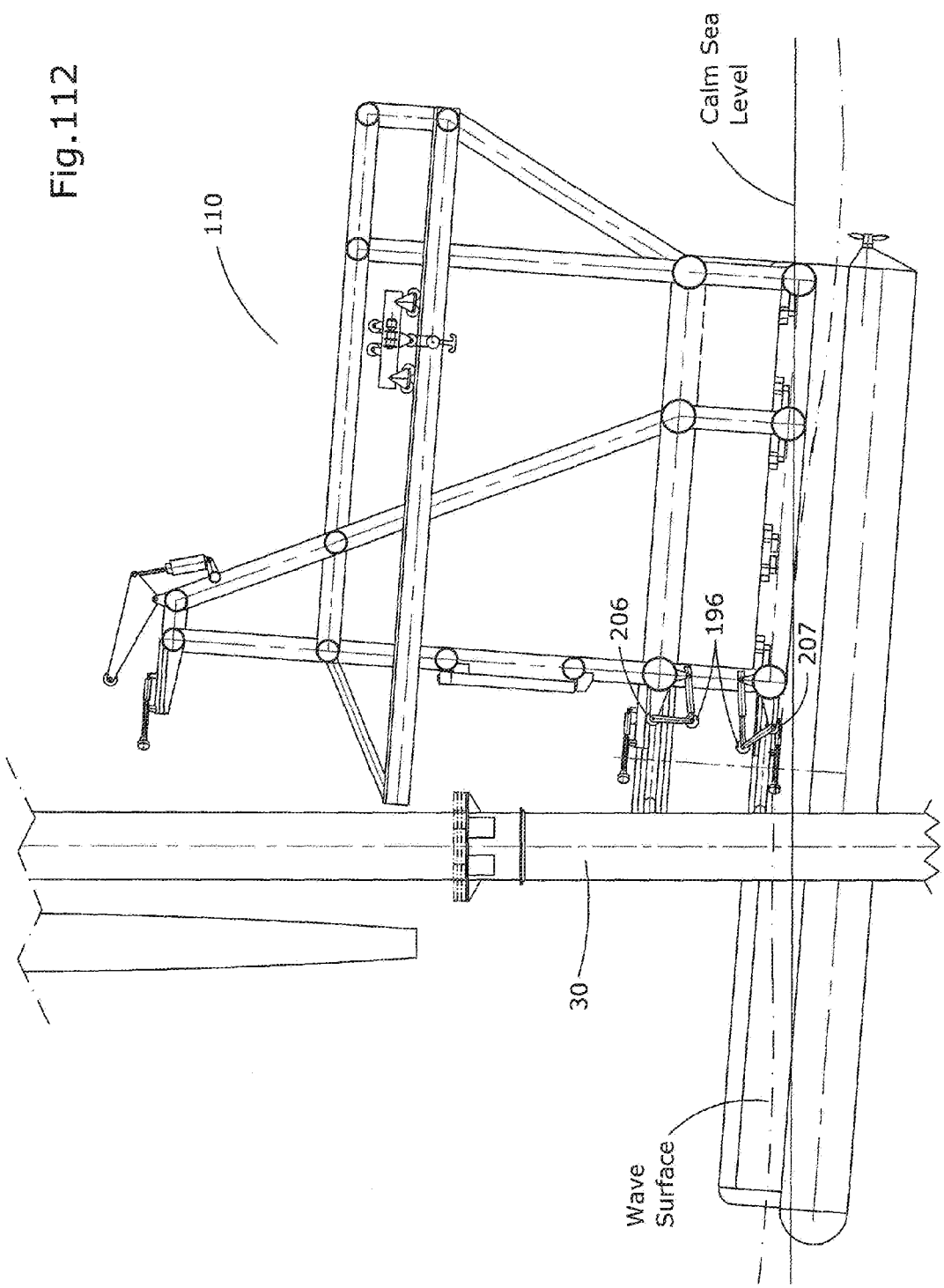
FIG. 112 shows CWTI-D pitching in stern direction and being out of contact with foundation.
Figure 113:
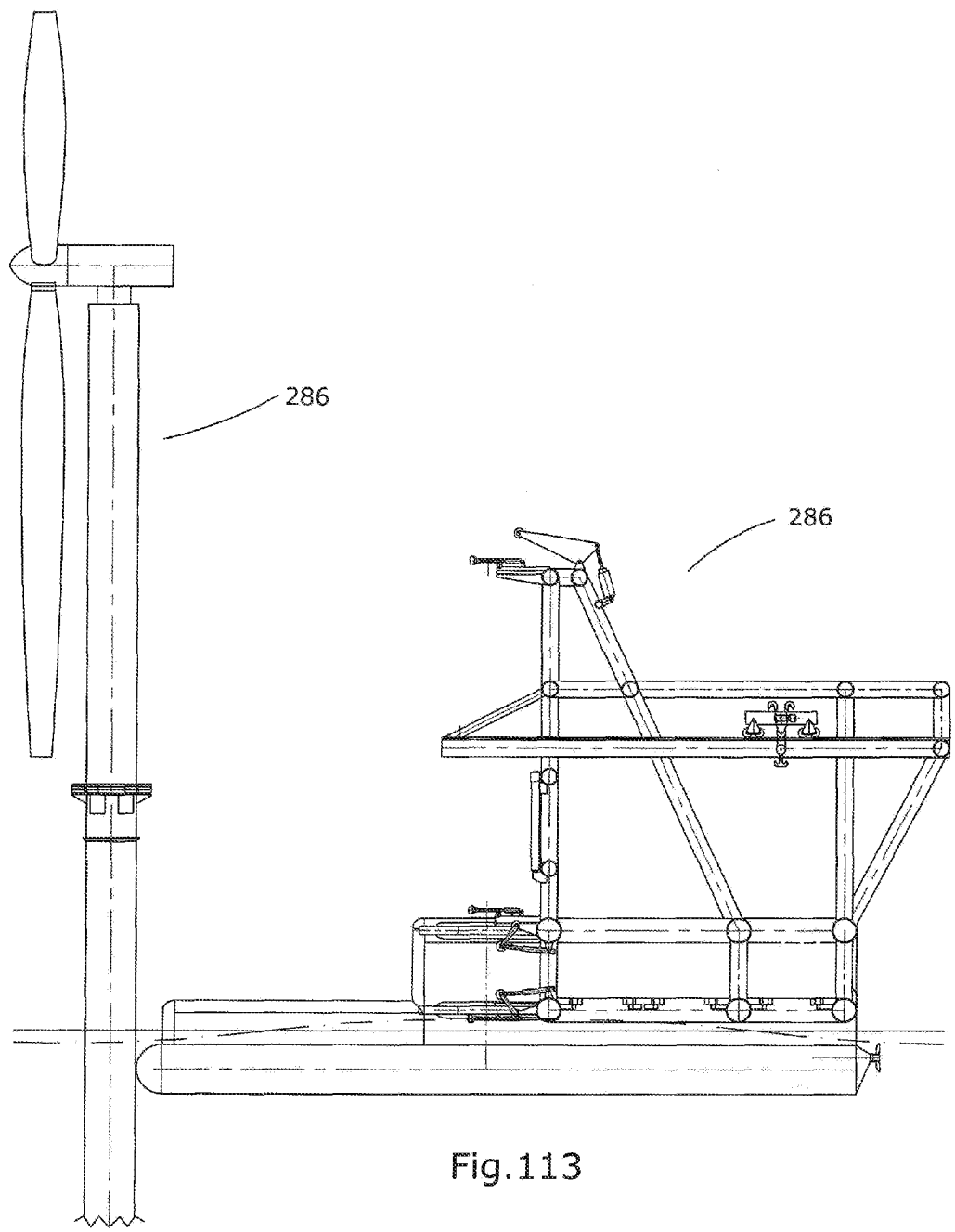
FIG. 113 shows CWTI-D moving away from installed WTG being in a transport mode.

The sixth step includes the following actions:

Berthing CWTI-D to the Compliant Guyed Foundation (CGF) installation, lowering on the top of CGF a suction bucket 92 with hydraulic power pact 93, connecting hydraulic power pack 93 through a pipeline system with tensioning cylinders 64 and clamps 66. By activating three way valve 80 (see FIG. 6) the compressed air from air compressed accumulators 77 would flow to a chamber 78 above piston 75 and by this would lift entire Tower 38 and by this taking up some slack in the mooring lines 40. By the next action the hydraulic pressure would be put in each tension cylinder 64 separately and simultaneously. By adjusting pressure in each cylinder the Tower 38 would be put into exact vertical position and would keep mooring lines 40 pretension (see FIG. 75). After this action is completed the clamps 66 would be activated and by this would fix mooring lines 40 deadly to Tower 38. The next action would be removing suction pump 92 and each cylinder 64 one by one from Tower 38 to CWTI-D 110. The last action of installing Compliant Guyed Foundation 30 would be moving CWTI-D 110 away from the installed Tower 38 with the Support Catamaran 230 inside of it (see FIGS. 76 and 77).

1.4. Detailed Description of the High-rise Crane Station

FIGS. 78 through 82 illustrates High-rise Crane Station 270 for assembling WTG, which includes: a pilled foundation 272, support structure 274, heavy lift short boom revolving crane 276, which includes: a crane support column 278, a hoist 279 and rotating platform 280 with two load swinging restraining winches 282 with restraining lines 284 on them. High-rise Crane Station also includes Shore Stand 286 consisting of a cylindrical column 288 imitating WTG foundation 30, a pilled foundation 290 and a WTG tower holder 292, which includes a pair of side rollers 170B and trust roller 206A.

1.5. Detailed Description of the Process of Assembling WTG on the Shore Stand

FIGS. 83 through 87 illustrate the sequence of steps of assembling WTG 22 on the Shore Stand 286, which are in the following order:

Lowering WTG tower 28 on Shore Stand 286 (see FIGS. 83 and 84). Final connection between WTG tower 24 and Shore Stand 286 is illustrated by FIG. 85, which is Detail IV from FIG. 84.

Installing nacelle 24 on tower 28 (see FIG. 86).

Installing and connecting WTG rotor 26 to nacelle 24 (see FIG. 87).

During these processes the tensioning lines 284, which are wound up on winches 282 and when attached to tower, nacelle and WTG, would prevent them from swinging due to the wind action.

1.6. Detailed Description of the Process of CWTI-D Engaging with Shore Stand and Lifting Assembled WTG from it FIGS. 88 through 98 illustrate the sequence of steps of engaging Catamaran WTG installer (CWTI-D) with Shore Stand 140, which is positioned in the protected from wave actions harbor, and lifting completely assembled WTG from it.

Step I. The CWTI-D 110 in transport mode approaches Shore Stand 286 with the additional ballast in its pontoons, which position the CWTI-D in a manner at which tower support 160 would be positioned below WTG 22 thrust stools 34.

Step II. By continue its movement toward Shore Stand the CWTI-D first comes in contact Shore Stand with guides 138, which centers CWTI-D with Shore Stand in plane (see FIG. 92). During CWTI-D further movement toward Shore Stand it comes in contact with the breasting wheels 192 and 194.

Step III. During this Step dynamic impact between CWTI-D 110 and Shore Stand 286 would be absorbed by breasting wheels 192 and 194. Also under impact force the breasting wheels 192 and 194 will retract and by this are bringing the trust rollers 206 in contact with Shore Stand 140 (see FIGS. 90 and 94) and by this would stop the CWTI-D.

Step IV. During this Step the CWTI-D 110 keeps be trust rollers 206 being pressed to Shore Stand 286 by the force of its propulsion system 120. Simultaneously CWTI-D 110 starts to pumped ballast and by this CWTI-D 110 floats up and this brings supports 160 in contact with thrust stools 34. By continue pumping out ballast the buoyancy force of CWTI-D 110 pontoon would become equal to the own weight of CWTI-D 110.

Step V. By continue pumping ballast out the CWTI-D 110 would float further up and would lift WTG 22 through its tower 28 from Shore Stand 286.

Step VI. At this step the CWTI-D 110 with lifted WTG 22 on board moves out of engagement with Shore Stand 286.

1.7. Description of the Process of Transporting Assembled WTG by Catamaran WTG Installer (CWTI-D) to the Preinstalled Foundation and Placing WTG on it FIGS. 98 through 113 illustrate sequence of steps of transporting completely assembled WTG 22 to installed Foundation 30, engaging CWTI-D 110 with Foundation 30, lowering WTG on Foundation 30 and disengaging CWTI-D 110 from the installed Offshore WTG 21, which are done in the following order:

The CWTI-D 110 would approach installed foundation 30 head-on to prevailing wind or wave force with minimum speed, thus excludes rolling, but CWTI-D 110 in most of the cases would be pitching. At the first it comes in contact with foundation 30 by pair of its guides 138, which centers CWTI-D 110 with foundation 30 in plane. This process is similar to the process of CWTI-D 110 approaching Shore Stand 288 and illustrated by FIGS. 91 through 94. During CWTI-D 110 further movement toward foundation 30 it comes in contact with it through the upper and lower engagement arrangements 192 and 194 (see FIGS. 26 through 33). During this contact, especially during rough seas the dynamic impact is expected. In this case the energy of the impact would be absorbed by hydraulic cylinders 204 of the breasting wheels 196. Since CWTI-D 110 would be pitching at the first would come in contact with Foundation 30 only one breasting wheel breasting wheels 198, which would gradually retract and by this would bring one of the trust rollers 207 in a soft contact with foundation 30 Tower 38 (see FIGS. 99 and 100). This would stop further movement of CWTI-D 110, but, since it would be pitching there would be a moment (see FIG. 101) when both trust rollers 207 and 206 would be pressed to Foundation 30 simultaneously. The force pressing them to Foundation 30 would be generated by propulsion system 120 it would be sufficient to overcome wave and wind forces. But it would not be sufficient to prevent pitching, therefore the CWTI-D 110 would be pivoting alternatively around trust rollers 207 and 206 (see FIGS. 100 and 102). By this way the CWTI-D 110 would be always in contact with Foundation 30 regardless of pitching.

Being in stable engagement with Foundation 30 the CWTI-D would start to take ballast and the CWTI-D 110 would begin to sink. As soon as the sea level becomes over the bow hull section 116 and stern hull section 120 the only active waterplane area would be formed by the central hull section 118, because of this the moment leading to CWTI-D 110 pitching would disappear. Thus would allow bringing both trust rollers 206 and 207 simultaneously into a firm contact with foundation 30 and by this would orient CWTI-D perpendicular to foundation 30, regardless of the wave actions. As soon as pitching would be eliminated the trust rollers side guide rollers 172A (see FIGS. 28 and 33) of the upper and lower engaging arrangements 192 and 194 would be activated through their cylinders 176A and by this they would lock-up CWTI-D 110 with the foundation 30 in a manner that would further prevent it from any inclination from horizontal position, including roll or pitch. But engaging arrangements 192 and 194 would not prevent the CWTI-D 110 heaving (vertical movement). However, since the waterplane area of central hull 118 is too small it would not generate significant buoyancy force effecting the CWTI-D 110 heaving. Therefore the energy of impact between the CWTI-D 110 moving downward, after taking ballast, and motionless foundation 30 would not be significant. The energy of this impact would be absorbed through the plunger 36 breaking thin plates 60 of the shock absorber 58 (see FIGS. 2; 6; 104 and 106). By breaking the thin plates 34A one by one by plunger 36 the energy of the impact between the wind tower 28 and foundation 30 would be dissipated and by this the possible damages to outer cone 56 of the WTG tower 28 would be prevented. After the WTG tower 28 would be settled on the foundation 30 the CWTI-D would continue taking ballast until full weight of the WTG 22 would be transferred to foundation 30. In the meantime the outer cone 35 would be welded with the transition adapter 54. As soon as tower support 160 (see FIGS. 108 and 109) goes out of contact with the WTG tower 22 trust stools 34 its pivoted frames 161 would be rotated outward to avoid possible interference with wind tower trust stools 34, when CWTI-D 110 would start moving upward (see FIGS. 111 and 112). By the next step the CWTI-D 110 would stop taking ballast and would start pumping ballast out from its pontoons 113, which would start CWTI-D flow up. Simultaneously the propulsion unit 119 would renew its pressure on the trust rollers 206.

When the bow hull section 116 and the stern hull section 120 would rise above the sea level the CWTI-D 110 would continue to be pressed to foundation 140 by the force from propulsion unit 49. Simultaneously side guide rollers 170A would be disconnected from tower 28. During CWT-D 110 the rise to transport mode and, still being in touch with foundation, it might start pitching having point of its of rotation changing between points of contact between trust rollers 206 and 207 (see FIGS. 110 through 121). As soon as CWTI-D 110 would reach transport mode position the direction of the force of propulsion unit 119 would be reversed and it would move away from the installed Offshore WTG (OWP) 21.

2.0. DETAILED DESCRIPTION OF THE SECOND EMBODIMENT

Catamaran Crane

The second embodiment—Catamaran Crane is a CWTI-D with added Revolving Crane with a short boom and it is renamed into CWTI-C. It addresses the need for replacing WTGs major parts during its operation. By the ongoing technology replacing major parts of WTGs, such as generator, gearboxes, rotors and blades requires use of the Jack up Crane Vessel that assemble WTG initially. Since, according to the First Embodiment, WTGs would be installed in deepwaters, thus means that for replacement WTGs major parts would require use a floating crane utilizing the same concept on which the CWTI-D is based.

2.1. Detailed Description of Catamaran Crane

FIGS. 114 through 116 illustrate Catamaran Crane, based on Catamaran WTG Installer for Deepwaters (CWTI-D) 110 adapted for serving WTG 22 and named CWTI-C 300. The Catamaran Crane 300 includes:
- Catamaran WTG Installer for Deepwaters (CWTI-D) 110 (see FIG. 16). The Revolving Crane with a short boom 276A is of the same type that is positioned on the High-rise Crane Station 270 (see FIGS. 78 through 82). It consists of a crane support column 278A, a hoist 279A and rotating platform 280A with two load swinging restraining winches 282A with tensioning lines 284A on them.
- The Transition Frame 302 consists of a pair of front columns 204, a pair of rear columns 306, a pair of cross beams 308 and a pair of horizontal beams 310.

2.2. Servicing Installed Offshore Windpower Plant by Catamaran Crane

It is expected that during operation of Offshore Wind Farms comprising of hundreds of Offshore Wind power Plants (OWP) 21 there would be a need for unscheduled replacement of WTGs major parts such as: generators, gearboxes and blades. This function would be performed by a Catamaran Crane CWTI-C 300. FIGS. 114 and 115 illustrate CWTI-C 300 engaged with OWP 21. The process of Catamaran Crane engagement with OWP 21 is similar to the process of Catamaran WTG Installer (CWTI-D) 110 engaging with Foundation 30. During the process of handling major parts of WTG, the CWTI-D 300 would be positioned in the semisubmersible mode of operation similar to operation by CWTI-D. This mode excludes any roll or pitch, but does not completely exclude heave, which is significantly minimized. The known technology has the means for adjusting hoist 279A vertical movement, accordingly to the wave actions effects it, and by this, under condition that crane is not pitching or heaving with the vessel, would provide safe conditions for replacing the major parts of WTGs.

3.0. THE THIRD EMBODIMENT

Catamaran Monopile Foundations Installer (CWTI-M)

The significant parts of offshore areas with significant wind energy potential are located in shallow waters where depths do not exceed 30 meters. In shallow waters the most efficient are WTGs foundation in the form of Monopiles. By ongoing technology the Monopile consist from two parts. One is a pile in form of a tube and other is a transitional piece. The transition piece contains access platform, breasting pals and vertical ladder to access platform by persons from the sea level. It is about 20 meters high and weights 200+ tons. Process of installing monopiles performs in two steps. The first installing the pile and the second placing on the pile the transition piece. Both of these steps are performed by high-rise and heavy lift floating cranes.

By OWP technology the access platform is a part of WTG tower and delivery maintenance personnel to it is done straight from Catamaran Service Vessel (CSV). Berthing of CSV to WTG is done in the same manner as it is done by CWTI-D and CWTI-M, which require foundation head to be cylindrical shape and its surface has to be clear from any obstructions on it.

Because of this the Monopile by OWP technology has clear surface. At the end of the of the process of Monopile installation, for the purpose of expediting the process of engaging WTG tower the head of Monopile, on the top of the Monopile would be placed a transition adapter, which is smaller than the transition piece and would weight under five tons.

3.1. Detailed Description of Catamaran Monopile Installer

Figure 117:
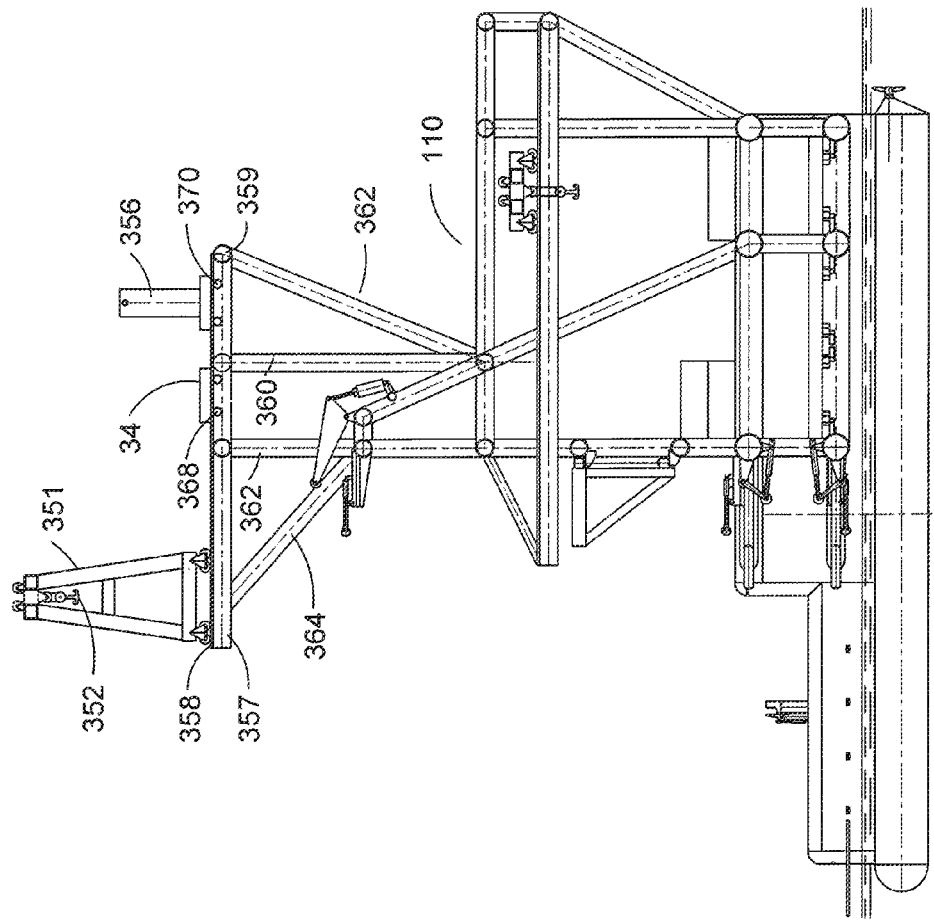
FIG. 117 shows General Arrangement (Elevation) CWTI-D adapted to install monopiles and renamed into CWTI-M.
Figure 118:
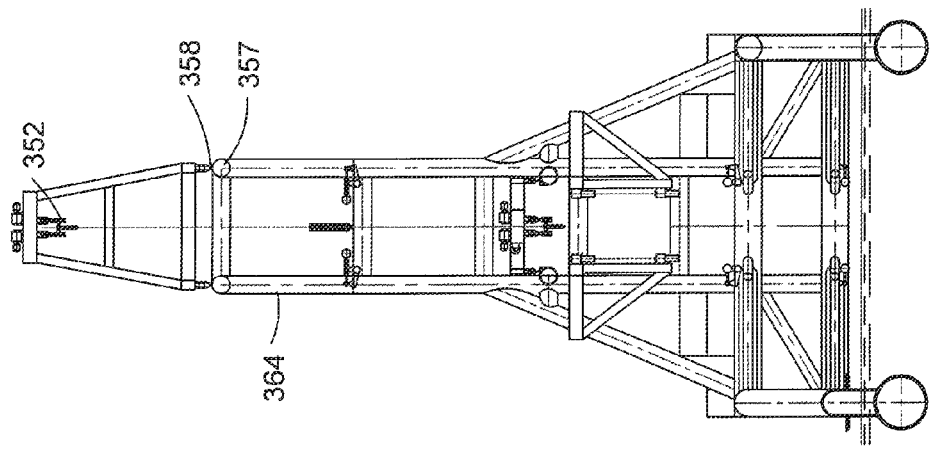
FIG. 118 shows CWTI-M General Arrangement (Side View).
Figure 119:
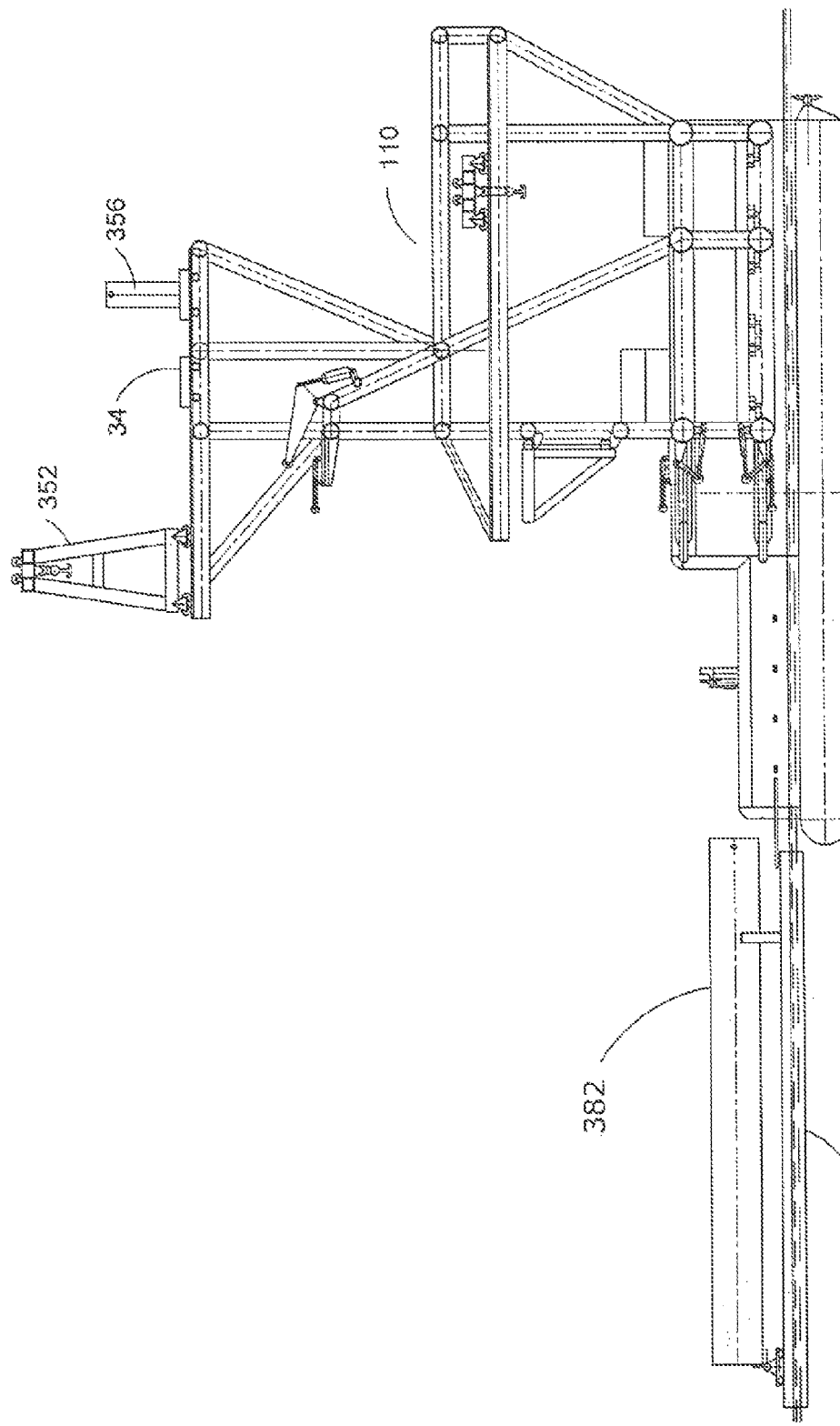
Figure 120:
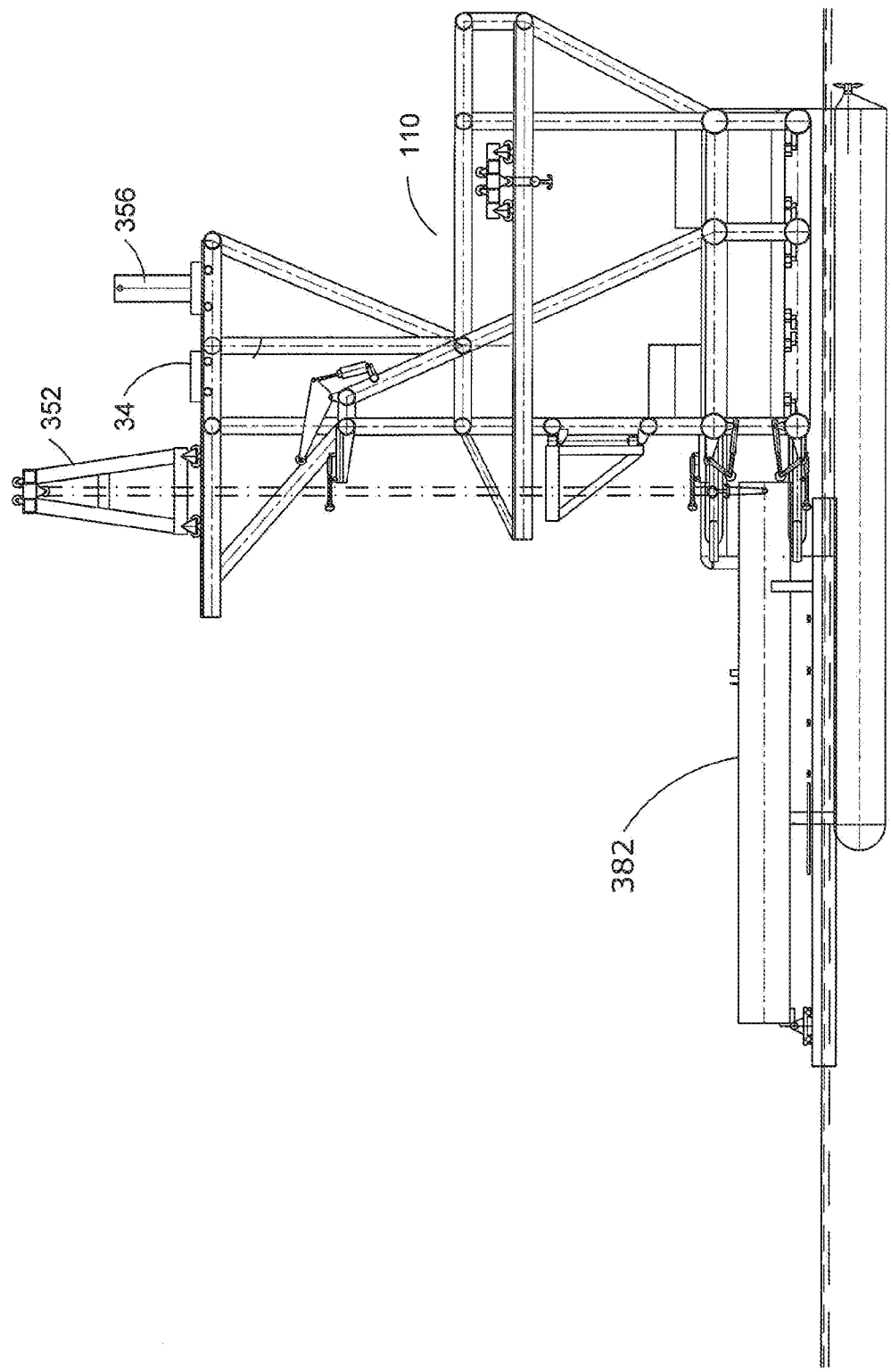
Figure 121:
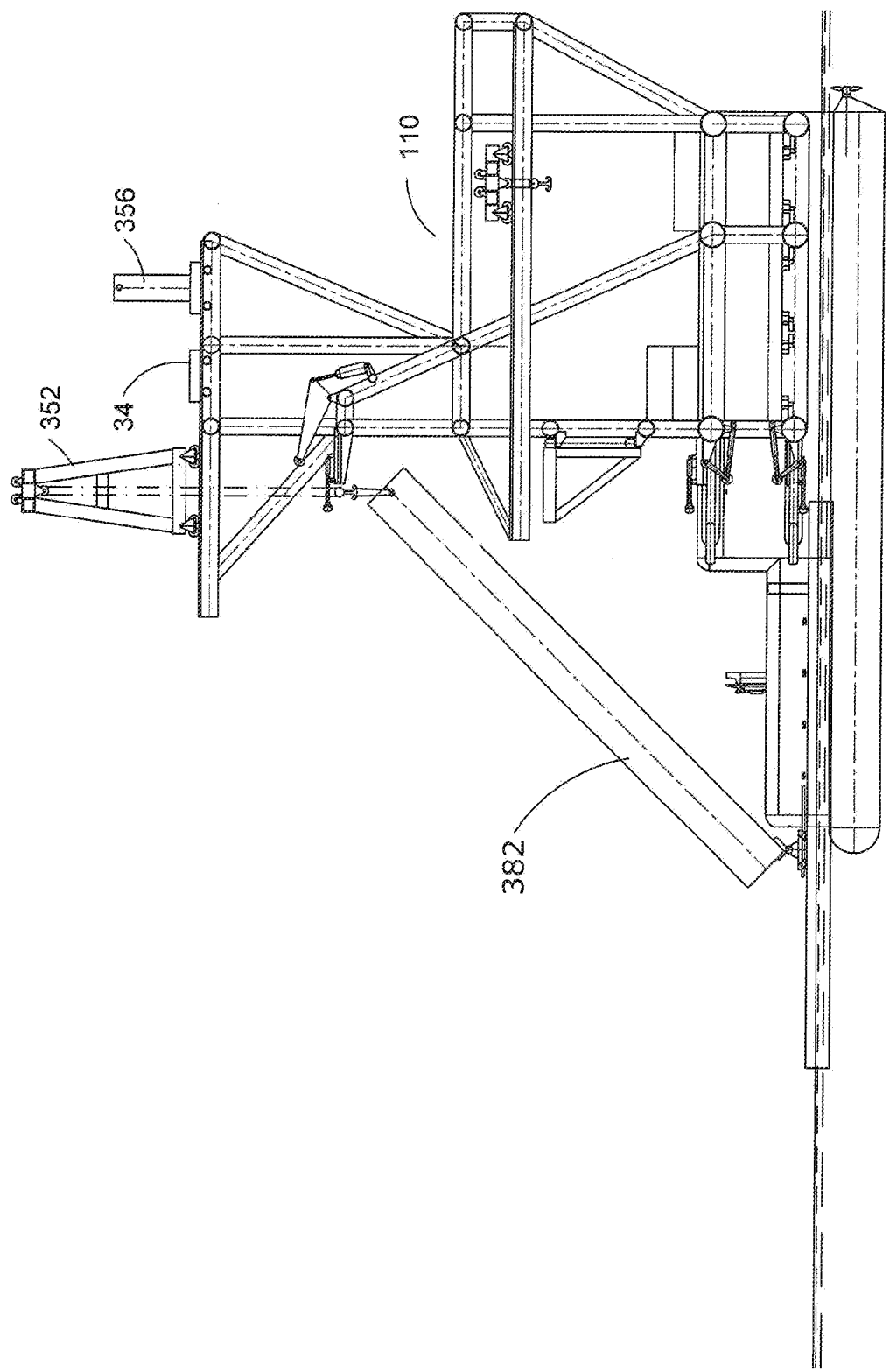

FIGS. 117 and 118 illustrate Catamaran Monopile Installer based on WTG Installer for Deepwaters (CWTI-D) 110 adapted to install Monopiles foundations, which is named CWTI-M 350. The CWTI-M 350 includes:
- A heavy lift Gantry Crane 352 with the hoist 353 for lifting monopile 382, a Catamaran WTG Installer 110, a Transition Frame 354, and a Pile Driver 356.
- The Transition Frame 354 consists of a pair of horizontal beams 357 with rails 358, three crossbeams 359, two pairs of vertical columns 360 and 362 and two pairs of brackets 364 and 366. Transition Frame 354 also includes stands 368 and 370 for Pile Driver 356 and for Transition Adapter 54 (see FIG. 7A).

3.2. Description of the Process of WTG Monopile Foundation Installation by Catamaran Monopile Installer The process of installing WTG foundation by Catamaran Monopile Installer (CWTI-M) 350 is illustrated by Figures from 119 through 133.

Figure 122:
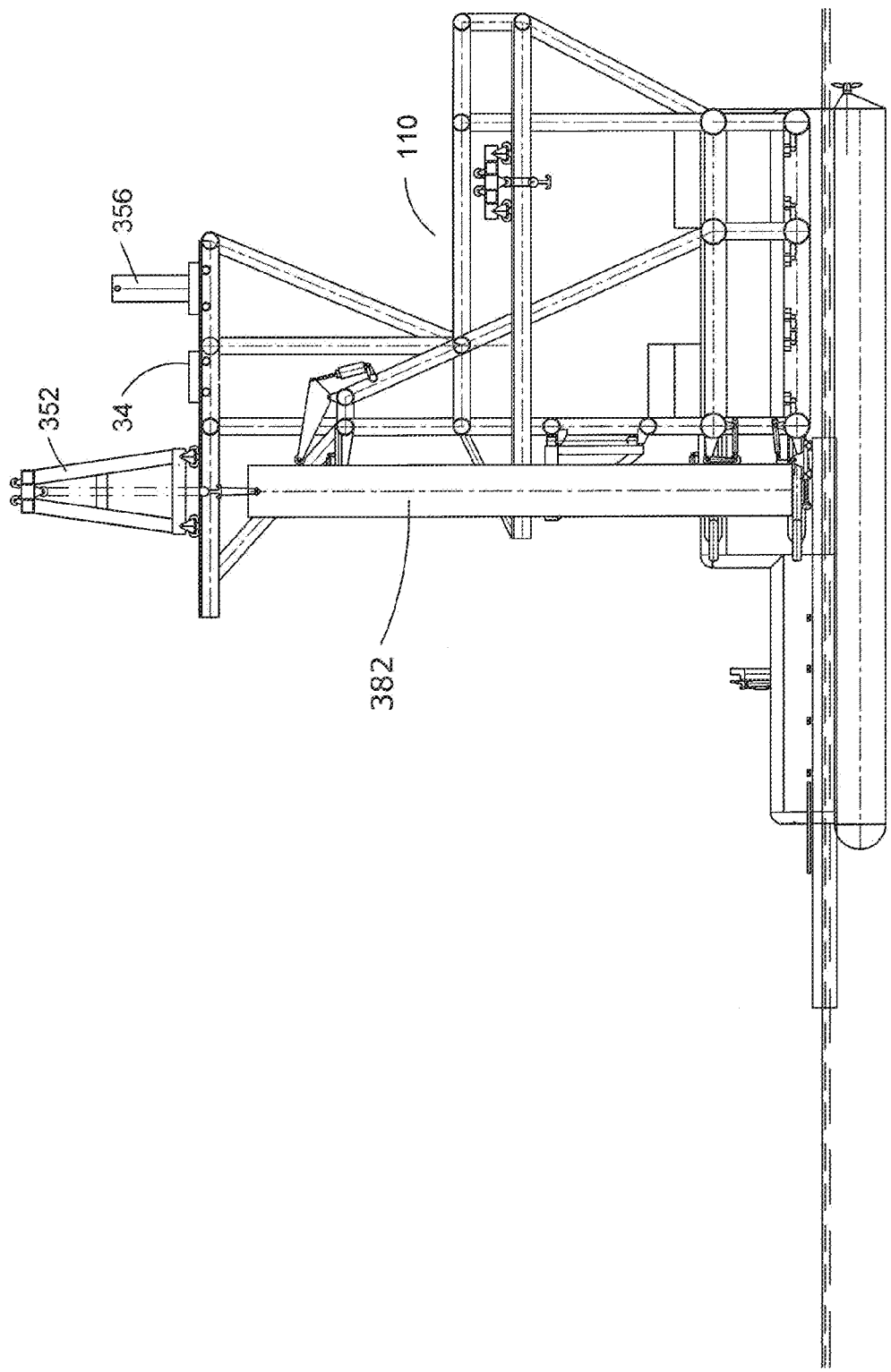
Figure 123:
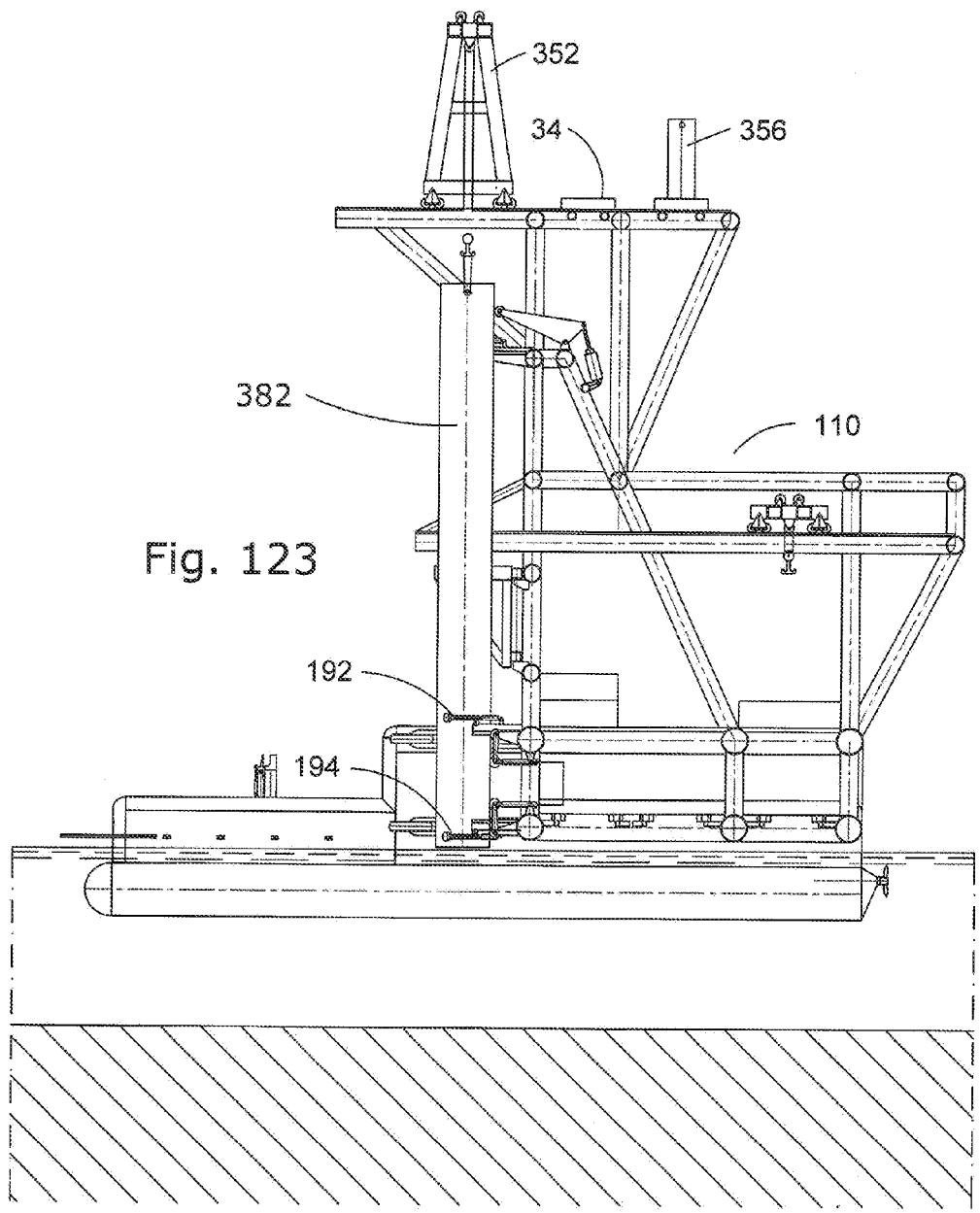
Figure 124:
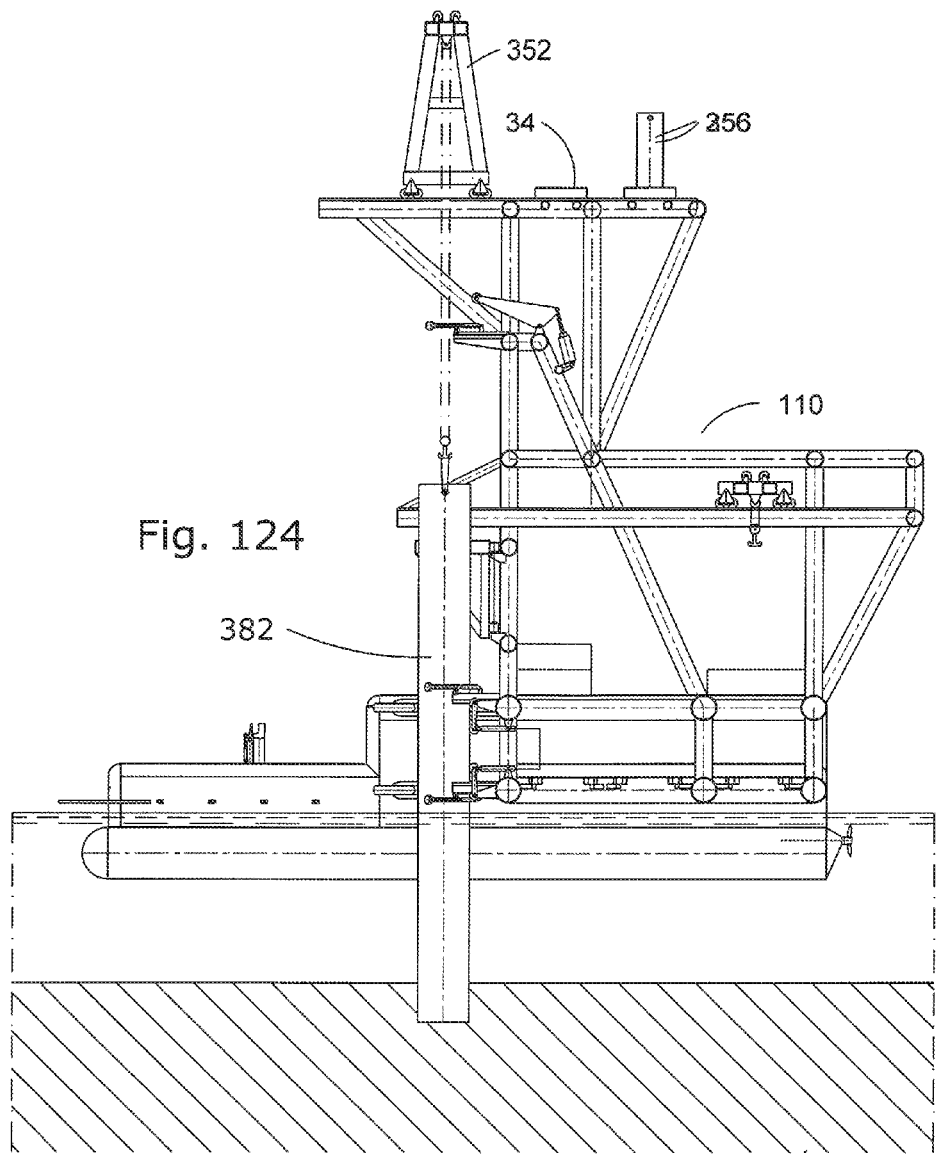
Figure 125:
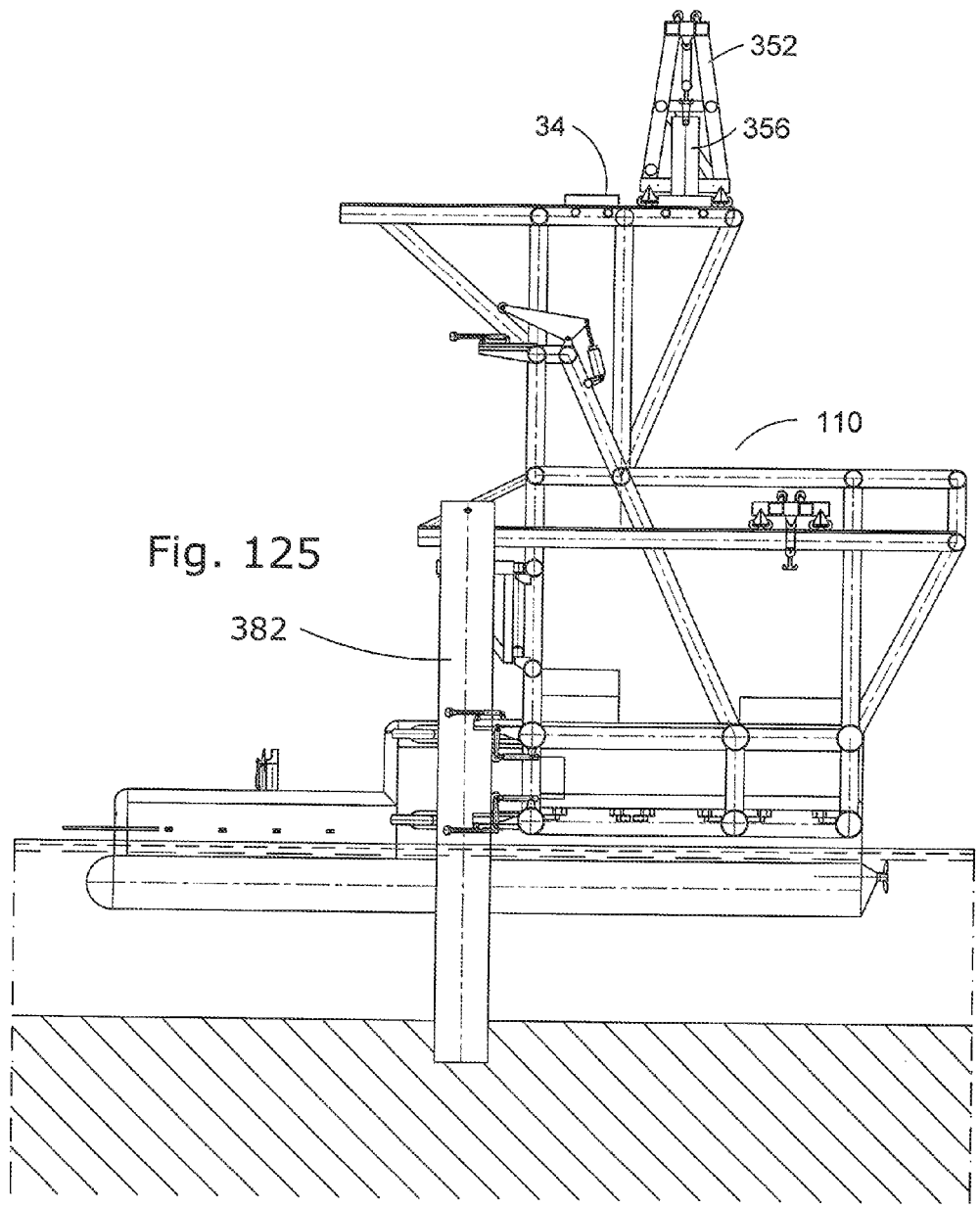
Figure 126:
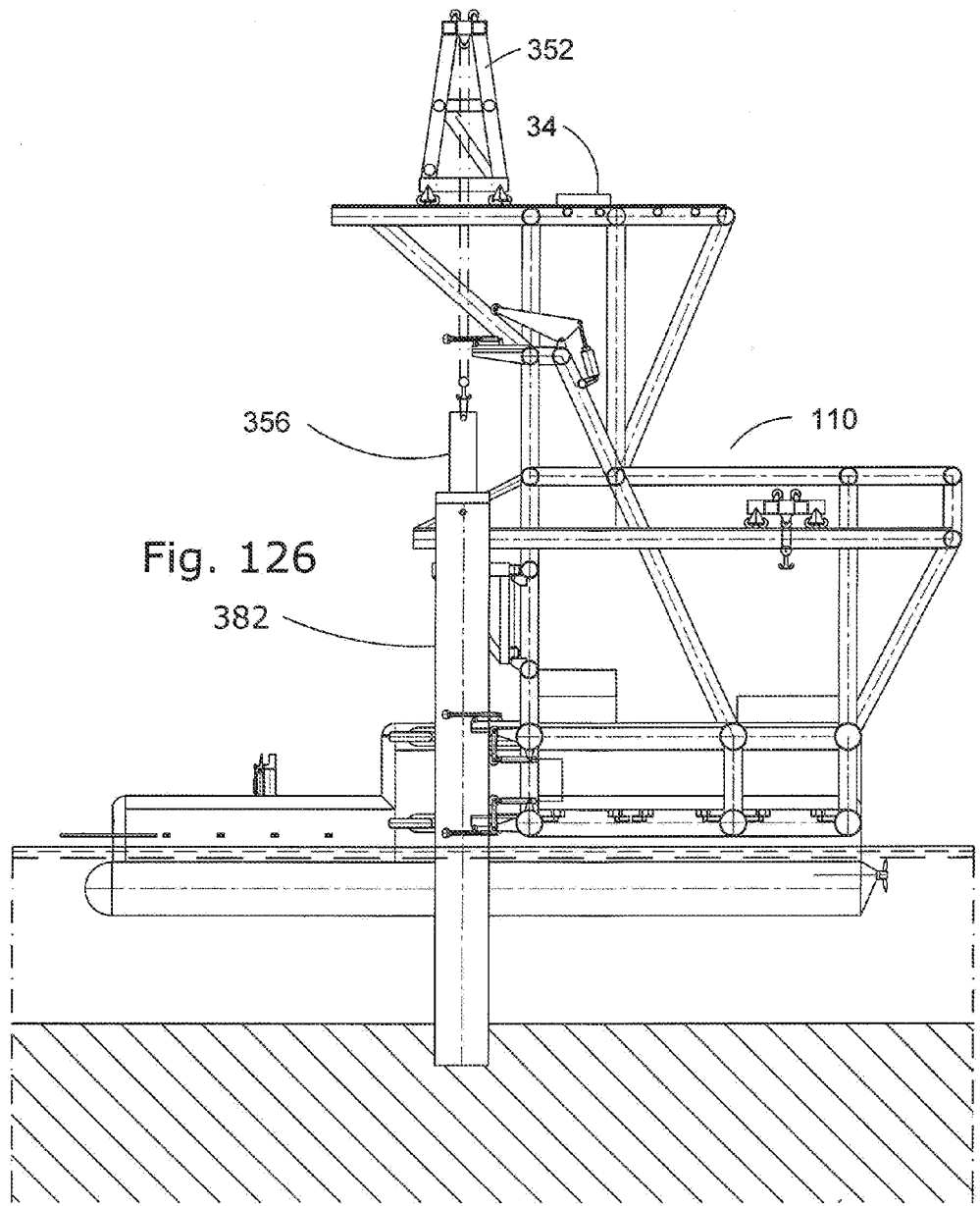
Figure 127:
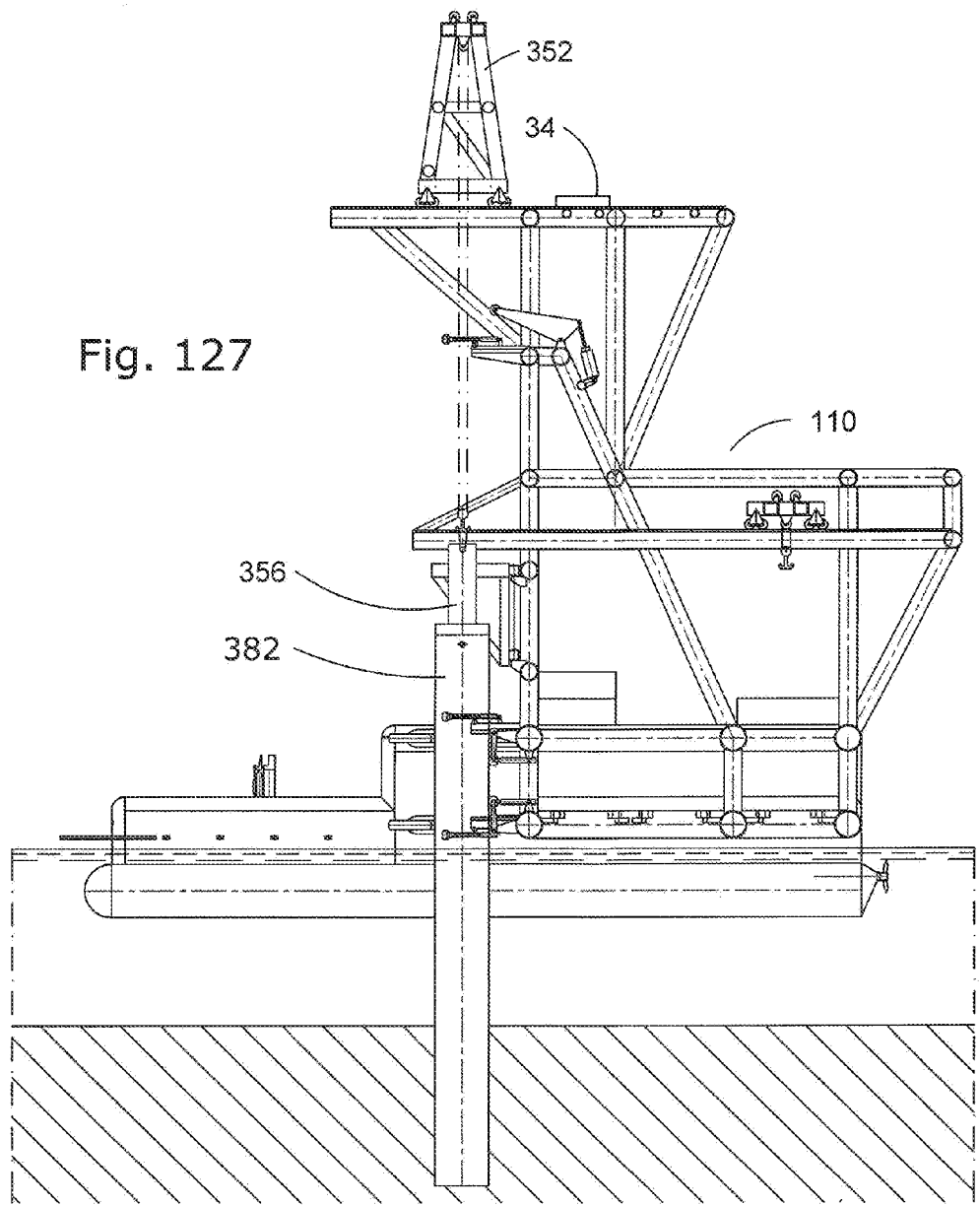
Figure 128:
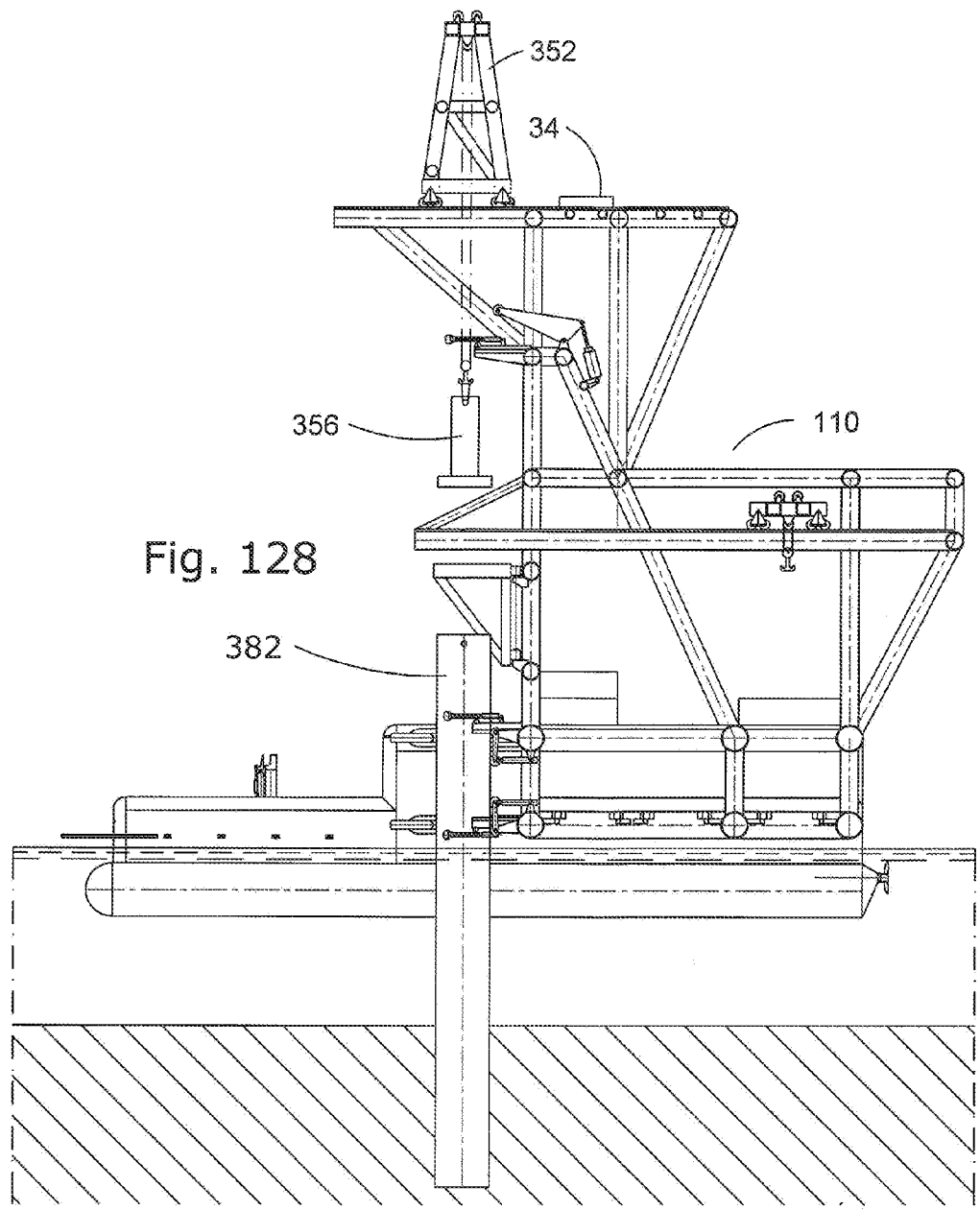
Figure 129:
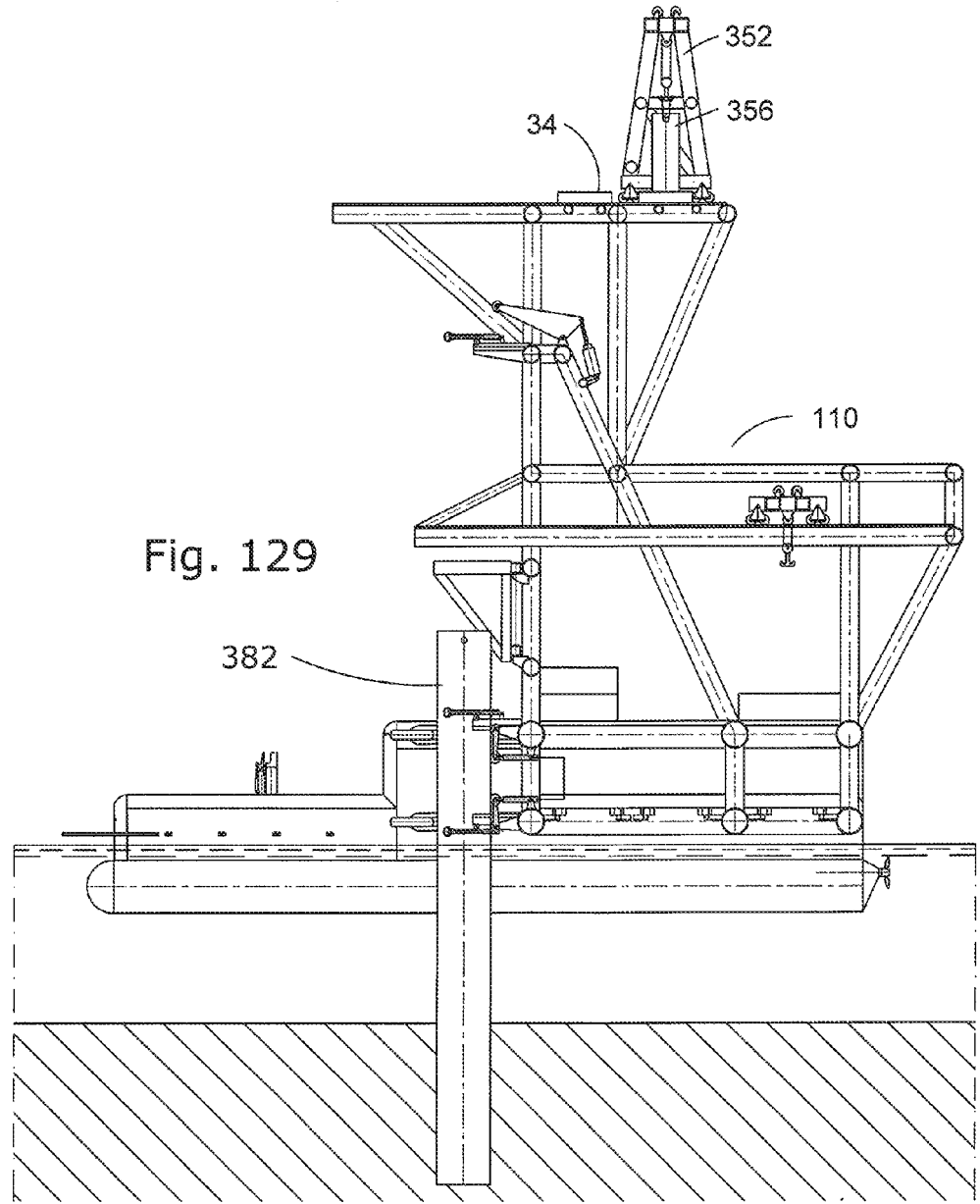
Figure 130:
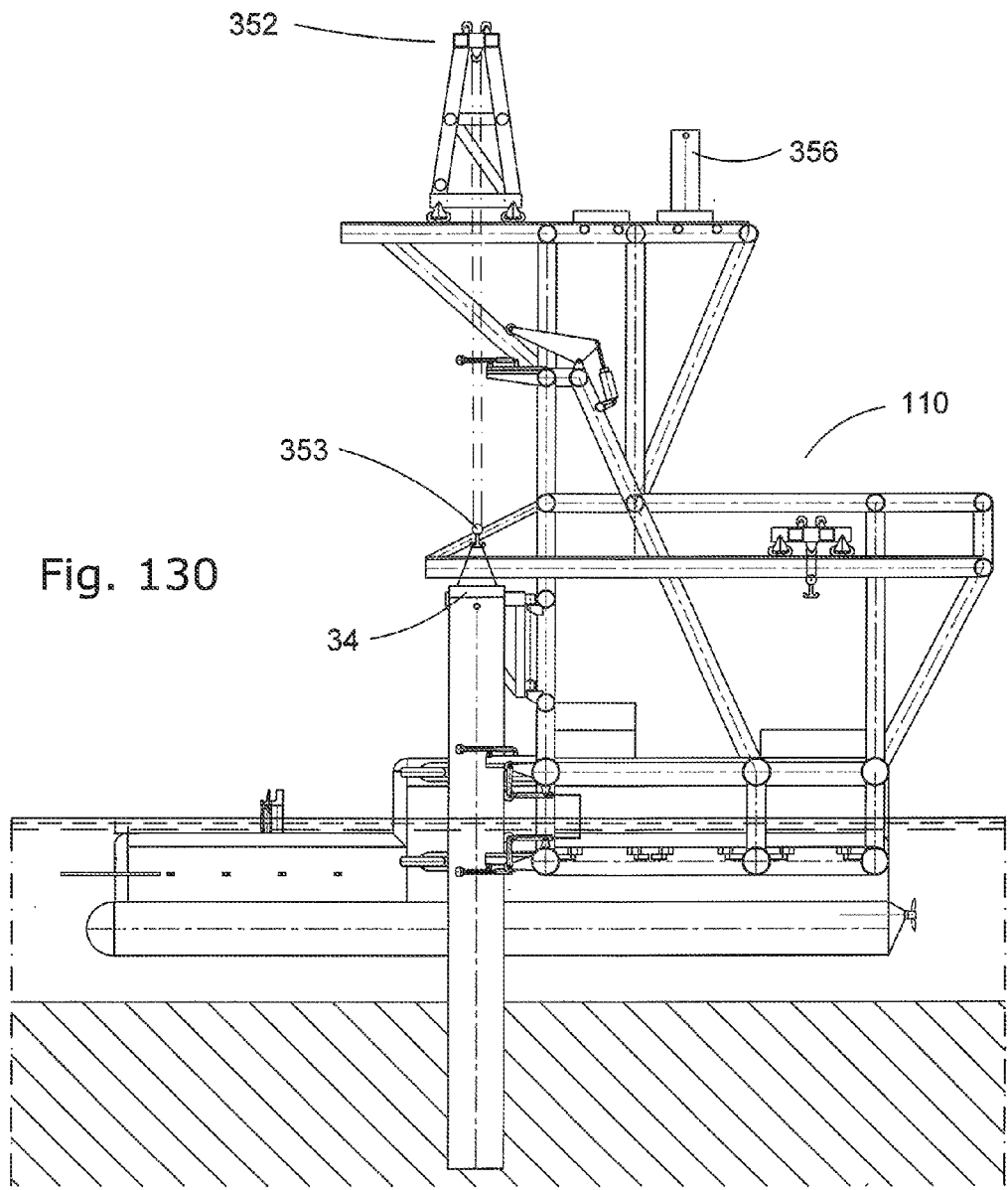

The monopile 351 is delivered by barge 374 to CWTI-M 350 in horizontal position. The Gantry Crane 352 on CWTI-M 350 using its hoist 353 lifts monopile 382 into vertical position (see FIGS. 120 through 122). Then centers it with the CWTI-D upper and lower engaging arrangements 192 and 194 (see FIG. 123). After that the Gantry Crane 352 would lower monopile 382 on the seabed. Under its gravity force the monopile would penetrate seabed soil on some distance. Than the Gantry Crane 352 would lift Pile Driver 356 from its stand 370 and would place it on the head of monopile 382. The activated Pile Driver would drive monopile 382 to the projected depth. After that the CWTI-D 110 would take ballast and would go into semisubmersible mode, which would minimize its heave. By the next step Gantry Crane 352 would lift Transition Adapter 34 from its base 368 and would be place it on the top of the monopile 382 head. At this position the Transition Adapter 34 would be leveled into exact horizontal position and would be welded to the head of the monopile 382. After welding would be completed the Gantry Crane would disconnect its hook from the Transition Adapter 34 and CWTI-D would move away from the installed Monopile Foundation 382.

4.0. THE FORTH EMBODIMENT-CATAMARAN SERVICE VESSEL FOR TRANSPORTING PERSONNEL AND MATERIALS TO AND FROM OFFSHORE WTGS

4.1. Ongoing Practice of Servicing WTGs Installed Offshore

Presently WTGs that are located offshore have problem of transporting personnel and cargo to them during rough seas. The task of delivery personnel to WTG is complicated because the WTG access platform is located about 20 meters above the ocean level. Thus creates a significant problem for people to get to it from a service boat. At the present time service boat delivers man as close as possible to the WTG tower and he jumps from the boat bow to a vertical ladder and moves up the ladder to the access platform. The need to come as close as possible to WTGs has the high degree risk of colliding with WTG, especially when the vertical ladder location is perpendicular to prevailing wind and wave actions. This method of boarding WTG excludes the man of bringing with him tool, materials and small spare parts. For this purpose the boarding platform has a small crane for lifting tools and on the WTG itself there is a 2-3 ton lifting capacity auxiliary crane. However, this operation of handling materials and spare parts is also a risky and not safe even during moderate seas and at the stormy weather it simply cannot be performed. As the result some times for several weeks and even months the maintenance crew cannot visit WTGs, which leads to interruption of WTGs operation until appeared malfunction is repaired.

The recent innovation, named Ampelmann System, can bring one man very close to vertical ladder on WTG foundation using a small platform, which stability in the space is achieved by a system that includes six hydraulic cylinders, which simultaneous operation is controlled by a computer special program and supported by a dynamically positioned vessel. However, the Ampelmann System cannot deliver spare parts and cannot provide change of lubricant, coolant and inspection and repair of WTGs blades.

4.2. The Advantages of Servicing WTG by the Proposed Catamaran Service Vessel (CSV)

The goal of the present invention Fourth Embodiment is to overcome all of the limitation of the ongoing technology for servicing WTGs offshore. Thus would be achieved y by providing safe means for the maintenance personnel to walk straight from the CSV to the WTG access platform and delivery materials (spare parts, lubricant oil and coolants) to and from the WTGs during rough seas.

Because CSV is a purely mechanical system, it is simpler and more reliable, versus the Ampelmann. Therefore the CSV would increase the window of weather availability, would increase the reliability and would increase the safety of transporting personnel and cargo between CSV and the WTG.

4.3. Innovations of the Catamaran Service Vessel

The main innovation of Catamaran Service Vessel (CSV) is in applying the concept of the SWATH type catamaran, employed by CWTI-D of the First Embodiment. Thus allows the CSV to approach and engage with the WTG in the same manner as it done by CWTI-D for the purpose of delivering the maintenance personnel, spare parts and material to offshore WTG during the rough seas.

Among the other innovations of the CSV are:

The capability to provide to the personnel safe passage to WTG access platform during reduced but still existing heave. For this purpose the CSV uses lifting platform arrangement, which consists of the mast and sliding along it carriage, carrying personnel or spare parts. This sliding carriage vertical movement is controlled by a hydraulic drive. When sliding carriage is pulled up to WTG access platform it comes contact with it through a dog with a constant force. This force would keep sliding carriage always pressed to the bottom of the WTG access platform regardless of the CSV heave amplitude and the weight of the load on it. Thus provides unshakeable smooth pass for personnel to walk from lifting platform to the WTG access platform.

The capability of simplifying and speeding up replacement of the worked-out lubricant oil and coolant, versus ongoing practice, is achieved by having on the upper part of the mast the pipe branches, which are connected through pipelines and pumps with storage tanks designated for fresh and work-out lubricants and coolants. When the need for replacement of lubricant and coolant would come, these pipe branches on the upper part of the mast would be connected through the hoses with pipelines on the WTG tower. This would allow draining work-out lubricant and coolants from nacelle by gravity force into designated tanks on the CSV (which are not shown on the drawings). The fresh coolant and lubricant would be delivered to nacelle by the pumps on the CSV (also not shown on the drawings).

For the purpose of using the special self-elevating platform (not shown on the drawings) for inspecting and repairing WTG blades surface, the CSV has on the top of its mast a support beams on which said self-elevating platform would be positioned. When the need for inspection and repair of WTG blades would be required, the special self-elevating platform would be placed on the support beam on the top of the mast when CSV would go out from the port.

4.4. Detailed Description of the CSV Drawings

FIGS. 134 and 135 are Elevation and Side View of General Arrangement of Catamaran Service Vessel (CSV) 400 engaged with WTG generator (WTG) 22 foundation 30 during Operating Mode. They also show the moment of lowering a spare part 401 by WTG auxiliary crane 27 on the CSV 400 handling spare part 401. FIGS. 136 and 137 show Elevation and Side View of CSV 400 during Cruising Mode and coming in touch with foundation 30. The FIG. 138 is an Elevation of CSV during Transition Mode and the FIG. 139 is a Side View of CSV 400 during Operational mode being already engaged with the WTG foundation 30. The FIG. 140 is a Plan View of CSV. The FIG. 141 is a Plan Section 14-14 from FIG. 138. The FIG. 142 is Section 15-15 from FIG. 138.

The CSV consists of lower structure 402 and upper structure 404. The lower structure 402 (see FIGS. 138 and 139) includes two pontoons 406, each of them has extended in upper direction hull 408. Each hull 408 consists of bow part 410, central part 412 and stern part 414. The central part 412 is taller that bow part 410 and stern part 414.

The upper part of the lower structure is covered by a deck 415. On the stern part of the pontoons 406 is located propulsion system 416. The hulls 408 are interconnected by a cross structure 418. The cross structure 418 includes upper row of cross-beams 420, lower row of cross-beam 422, upper longitudinal beams 424, lower longitudinal beam 425, vertical beams 426, beam-braces 428 in the horizontal plane and beam-braces 430 in the vertical plane. The Section 14-14 and 15-15 from FIG. 135; Sections 16-16 from FIG. 138 and Section 17-17 from FIG. 140 illustrate design of the hull 408 parts. The buoyancy volume of the hull 408 parts—bow 410, central 412 and stern 414 are formed between interconnection of cross-beams 422, vertical beams 426, top part of pontoons 406 and by side plates 428 on the part 410, side plates 430 on the part 412 and side plates 432 on the part 414.

The cross structure also includes an upper pair of guides 435 and lower pair of guides 435, which center CSV with WTG foundation 30.

The CSV 400 lower structure 402 includes upper engagement arrangements 436 and lower engagement arrangement 438 for engagement with turbine foundation 30 (see FIGS. 133 through 140). Both 436 and 438 engagement arrangement are the same as engagement arrangements 192 and 194 on the CWTI-D (see FIGS. 26 through 40) for engagement with WTG foundation 30. Both of them consists of two side rollers 170A a breasting wheel 198, pivot lever 200 with support console 202, hydraulic shock absorber 204 and trust rollers 206 for upper engagement arrangement 192 and lower engagement arrangement 194. Each side roller includes: two arms lever 172A with roller 174A attached to outer arm and inner arm connected with the hydraulic actuator 176A, pivot support 178 and frame support 180A.

The upper structure 404 includes Lifting Platform Arrangement 442, which is located in the middle of CSV, and Power Station 444 and Living Quarters 446, which are located on the stern part of the CSV. Above Living Quarters 446 is located helicopter platform 448. Each Power Station 444 includes electro-power generator, air compressor and hydraulic power pack (not shown on the drawings).

The Lifting Platform Arrangement consists of:
Mast 450, Sliding Carriage 451 and lifting drive 452,
Mast 450, which includes two vertical columns 453 with guiding rail 454 and side support beams 456. It also has on its upper part pipe branches 458, which are connected with pumps and storages for the fresh and used lubricants and coolants (not shown on the drawings). On the top of the Mast 450 are located support beams 459 for self-elevating platform for inspection and repairing the WTG blades (not shown on the drawings).
Sliding carriage 451 consists of a pair of horizontal beams 462, three cross-beams 464 and two bracket-beams 470 interconnecting vertical beams 468 with horizontal beams 462. On the rear part of the sliding carriage 460 are located two pairs of rollers 472 engaged with guiding rails 454. Over the horizontal beams are placed deck 474 and hand-rails 475. On the front part of the sliding carriage 460 is positioned trust dog 476 for engaging with WTG 22 access platform 32. For engagement with chain loop 480 the carriage 451 has upper and lower attachment ears 477. For engagement with the chain loop 480 the carriage 451 has lower and upper attachment ears 477.
Lifting drive 452 includes a chain loop 480 attached to sliding carriage in two points, hydraulic motor 481 with sprocket 482, located on deck 415, and sprocket 484 positioned on the top of the mast 450. On the deck 415 is located access ladder 486 to sliding carriage 451, when it is located in the lower position.

4.5. Description of the Catamaran Service Vessel (CSV) Operation

I. Operations of the CSV Consist of the Following Steps:
Engaging with WTG.
Delivery of personnel to WTG boarding platform.
Replacing worked out lubricant and coolant.
Delivery and retrieving heavy spare parts.

II. Engaging with WTG.

The CSV 400, comes the WTG 22 foundation 30 in a Cruising Mode (see FIGS. 133 and 134). It maneuvers in a way that allows it to approached foundation 30 head-on to prevailing direction of wind and wave action. The first contact with foundation 30 would be done by guides 428 that would center CSV with foundation center. The second contact would be with berthing wheel 196, which would absorb the energy of initial impact contract and by this would smoothly bring trust rollers 206 in contact with foundation 30. One or both trust rollers 206 under propulsion force overcoming wind and waves forces would be pressed to foundation 30 at any time and by this would keep CSV 400 in touch with foundation 30 during pitching and heaving. After firm contact with foundation 30 would be establish the CSV 400 would start taking ballast and simultaneously with sinking, it would heaving and pitching alternatively changing pivotal points between trust rollers 206 on the upper and lower engagement arrangements 436 and 438. When continuation of sinking would lower bow 410 and stern 414 parts of the hull 408 below sea level then the only waterplane would be formed by central part 412. Because the waterplane area by central part 412 is in the center of the CSV it would exclude its pitching and would significantly reduce effect of wave actions on its heaving, due to central part 412 much smaller waterplane area versus full area of all three part of the hull 408. The exclusion of pitching would allow activating side rollers 170A and by this firmly engaging CSV 400 with foundation 30 in a manner that excludes any roll and pitch but would allow heaving.

III. Delivery of Personnel to WTG Boarding Platform

The WTG access platform 32 is located about 20 meters above sea level and to deliver maintenance personnel to it the CSV 400 uses special lifting platform arrangement 442. The heaving even with reduced amplitude creates obstacle for people to walk safely from sliding carriage 460 to the WTG access platform. To provide firm connection between sliding carriage 460 and WTG access platform the lifting drive uses hydraulic motor 481, which through the chain loop 480 and dog 476 keeps connection with WTG access platform under constant pressure, regardless of the CSV heaving. Thus provides for people the same safe conditions to walk from CSV to WTG access platform as walking on the shore.

IV. Replacing Lubricant Oil and Coolants.

The process of replacing worked out lubricant oil and coolant would start by interconnecting designated for lubricant oil or for coolant hoses 461 by one end with corresponding pipe branches 458 on the mast 450 and by other end with corresponding pipe branches on the WTG 22. The worked out lubricant and coolant would be lowered by gravity force from nacelle to corresponding storages on the CSV. The fresh lubricant oil and coolant would be pumped up to nacelle from corresponding storages.

What is claims is:

1. A system for installing a stationary offshore windpower plant (OWP), comprising:
   a wind turbine generator (WTG),
   a compliant guyed (CG) foundation having a means for absorbing impact from waves and wind;
   a high-rise crane station for assembling said WTG near shore,
   a catamaran wind turbine installer (CWTI) having a means for delivering said CG foundation to a destination site, for installing said CG foundation on a seabed, for lifting a completely assembled wind turbine generator from a shore stand of said high-rise crane station, for transporting said assembled WTG to the preinstalled foundation, and for placing wind turbine generator on the preinstalled foundation;
a catamaran service vessel (CSV) having a means for servicing said WTG during operation; and
wherein said high-rise crane station includes means for assembling said WTG near shore comprising a stand near shore, on which said WTG is assembled, having similar shape and size of the upper part of said CG foundation, a heavy lift crane with a short boom having a vertical cylindrical column supporting said heavy lift crane with a short boom, and a rotating platform on the lowest part of said vertical column having two oppositely located winches with hoisting lines intended to prevent lifted load from swinging; and a high-rise support structure.

2. The OWP according to claim 1, wherein said WTG is comprised of a nacelle with rotor and a tower through which said WTG is attached to said CG foundation stationary foundation, wherein said tower has thrust stools servicing as the means for lifting and lowering said WTG, an access platform for maintenance personnel positioned on said thrust stools, and a lower end in the form of an outer cone for an engagement with said CG foundation.

3. The OWP according to claim 1, wherein said compliant guyed foundation (CG) has means for absorbing impact from waves and wind, comprising:
a tower,
at least three mooring lines and at least three anchors, submerged in sea bottom soil,
said tower comprising an upper part, lower part, and a tower base;
said upper part of said tower includes a receiver-head containing an inner cone, which guides said outer cone of said WTG into engagement with said CG foundation tower, a shock absorber inside said receiver-head comprising a stock of a thin plates, which absorbs the impact energy between said WTG and said CG foundation, at least three receivers for attaching a means for tensioning said mooring lines, at least three sets of clamps with guides for connecting said mooring lines to said tower; a bulkhead inside of said tower upper part that forms buoyancy force that keeps said tower floating vertically, and a pair of journals serving as the lifting points and as a rotating axis for said tower;
said lower part of said tower includes a hydraulic cylinder and several hydro-pneumatic accumulators, which are, interconnected through compressed air chamber by pipes, a piston, and a universal joint connecting said piston with said tower base.

4. The OWP according to claim 1, wherein said catamaran wind turbine installer (CWTI) for delivering said foundation to the destination site, for installing said foundation on seabed, having a means for lifting completely assembled wind turbine generator from said shore stand, for transporting assembled wind turbine generator to the preinstalled foundation and, for placing wind turbine on the preinstalled foundation, comprising:
a small waterplane area two hull (SWATH) type catamaran vessel and a remotely controlled support catamaran,
said SWATH type catamaran vessel is named catamaran wind turbine installer vessel for deepwaters (CWTI-D), includes:
a lower and an upper structures,
a lower structure comprising two pontoons, each having the shape of an elongated cylinder with a hull on an upper part expanding upward, said hull comprising a bow part, central part and stern part, said central part being taller that said bow and stern parts, said hulls being interconnected by a cross structure, located from said CWTI-D center and toward said CWTI-D bow, a pair of guides that centers said CWTI-D with said wind CG foundation center located near the said center of said CWTI-D and attached to said upper and lower longitudinal beams, an upper and lower engagement arrangements with said CG foundation, each of which include two side rollers, breasting wheel and fixed positioned thrust roller, and at least three sets of supports for transporting anchors;
an upper structure comprising a bridge crane, a pair of vertical columns, interconnected by cross beams and sides supports, two pivotal supports for lifting said WTG, an engagement device for connecting with said WTG tower, comprising of two side rollers and a central roller with said hydraulic cylinder to provide flexibility to said central roller in vertical plane, a pair of upper longitudinal beams interconnected by the cross beams, lower longitudinal beams having on their upper part rails on which runs said bridge crane;
wherein said remotely controlled support catamaran, comprises a two hulled vessel interconnected by across frame in the middle of said hulls, having in the middle of said cross beam a quick connect-disconnect device for engaging with said lower part of said CG foundation tower, and said hulls having on the stern a propulsion system controlled remotely.

5. The OWP according to claim 1, wherein said CWTI-D has an additional capability to install monopiles in shallow waters and renamed as CWTI-M comprising: a gantry crane for handling said monopiles being added to said CWTI-D with a transition frame, which are positioned above vertical columns of said CWTI-D, said transition frame including a pair of horizontal beams with rails along which said gantry crane can move, a pile driver and transition adapter to one of said monopiles, and a support frame attached to said vertical column of said CWTI-D through several vertical beams, cross-beams and brackets.

6. The catamaran crane according to claim 1, wherein said CWTI-D has an additional capability to replace a major part of said WTG and renamed into a catamaran crane, comprising: a revolving crane with a short boom being added to said CWTI-D with a transition frame, said revolving crane having a support column that has on a lower part a rotating platform and a pair of winches with tension lines attached to lifted load preventing said load from swinging, and said transition frame including a pair of longitudinal beams, a pairs of front columns, rear columns and cross beams.

7. The OWP according to claim 1, wherein said service vessel having the means for servicing said OWP installed at the destination site during operation is named catamaran service vessel (CSV), comprising:
said CSV is a small waterplane area two hull (SWATH) type catamaran vessel comprising:
a lower structure and upper structures;
said lower structure including two pontoons, each of said pontoons extended in the upper direction hull;
each hull comprising a bow section, a central section and a stern section;
said central section of said hull being taller than said bow and said stern sections;
said hulls being interconnected by a cross structure having an upper deck;
said lower structure including upper and lower engaging devices;

each of said upper and lower engaging devices comprising two side rollers, a breasting wheel and thrust roller;

said upper device including a mast, sliding carriage and lifting drive;

said mast comprising two vertical columns each having a guiding rail;

said sliding carriage having a frame having a deck with hand-rails;

on the front side of said deck is positioned thrust dog, through which said sliding carriage engages with said access platform on said WTG tower;

two pair of rollers engaged with said guiding rails located on the rear part of said sliding carriage;

said lifting drive including chain loop with one sprocket on the top of the mast and one on said deck with a hydraulic motor; and said chain loop being attached to said sliding carriage through lower and upper attachment ears.

8. A method of installing an offshore wind power plant (OWP) using the system as in claim 1 in deepwaters using a catamaran wind turbine installer vessel (CWTI-D) as a means while performing processes of said CG foundation installation, comprising the steps of:

installing said CG foundation at a destination site;

lifting said assembled WTG from a near shore stand; and transporting said assembled WTG to said installed CG foundation and using the preinstalled said CG foundation as the base for achieving required stability for placing said assembled WTG on said CG foundation during rough seas.

9. A method of installing offshore wind power plant (OWP) in deepwaters as in claim 8, wherein installing CG foundation at the destination site, comprising the steps of:

approaching a transfer pier with said CWTI-D;

engaging said CSV with a lower part of said CG foundation in a horizontal position;

engaging a CWTI-D bridge crane with a pair of journals of an upper part of said CG foundation;

lifting up said CG foundation from said transfer pier and moving said CWTI-D with said lifted CG foundation toward destination site;

at the destination site disconnecting a support catamaran quick connect-disconnect device from the lower part of said CG foundation, said CG foundation rotating around said journals of said CG foundation from a horizontal position to a vertical position;

said CG foundation reaching a vertical position, said bridge crane lowering said CG foundation on a seabed and said CG foundation base penetrating into seabed soil;

after installation, said CG foundation keeping a vertical position floating as a buoy;

moving said CWTI-D out of engagement with said CG foundation tower in radial direction, after said CWTI-D reaches a certain distance from said installed CG foundation said CWTI-D lowers the first said anchor with said attached mooring lines on the seabed and embedding said anchor into soil;

installing second and third said anchors is done by locating said second and third anchors 120 degrees apart and on an equal distance from said buoy of said CG foundation;

after installation of anchors is completed moving said CWTI-D back to engagement with said buoy CG foundation tower, and at this position said CWTI-D activates simultaneously and independently at least three hydraulic cylinders, said hydraulic cylinders tension said each mooring line in a manner that place said CG foundation in a strict vertical position; and after completion of said CG foundation installation said CWTI-D moves said hydraulic cylinders from said mooring line and lifts said hydraulic cylinders from said installed CG foundation tower and moves away from the installed said CG foundation.

10. A method of installing offshore wind power plant (OWP) in deepwaters as in claim 8, wherein lifting said assembled WTG from said shore stand, includes the steps of:

approaching said shore stand said CWTI-D takes an additional ballast to lower the position of a CWTI-D tower support below said WTG thrust stools;

moving toward shore stand the said CWTI-D first comes in contact with said shore stand with said CWTI-D guides, which centers said CWTI-D with said shore stand;

coming in contact with said near shore stand through breasting wheels, during the further movement toward said shore stand, absorbing the energy of dynamic impact between said CWTI-D and said shore stand through said breasting wheels hydraulic cylinder compression;

bringing said thrust rollers in contact with shore stand stops, said CWTI-D at said shore stand;

keeping said thrust rollers pressed to said shore stand by the force of said CWTI-D propulsion system, said CWTI-D starts to pump out the ballast and by this said CWTI-D floats up and brings said WTG supports on said CWTI-D in contact with said thrust stools on the WTG;

continuing pumping out ballast, the buoyancy force of said CWTI-D pontoon lifts said WTG from said shore stand; and moving said CWTI-D with said WTG on board out of engagement with said shore stand to said installed CG foundation.

11. A method of installing an offshore wind power plant (OWP) in deepwaters as in claim 8, wherein transporting said assembled WTG to said installed CG foundation and using the preinstalled CG foundation as a base for achieving required stability for placing said assembled WTG on said CG foundation during rough seas, comprising the steps of:

approaching said installed CG foundation said CWTI-D orients itself head-on to prevailing wind or wave action to exclude said CWTI-D from rolling;

contacting said CG foundation by said CWTI-D at first through a pair of guides, said guides having centers;

moving forward toward said CG foundation, said CWTI-D under propulsion force brings in contact with said CG foundation one or more said breasting wheels of said CWTI-D, said breasting wheels absorbing the energy of the initial impact through said hydraulic cylinders compression;

compressing said breasting wheels hydraulic cylinders brings said CWTI-D one or more of said thrust rollers in a contact with said CG foundation and by this stops further movement of said CWTI-D;

keeping pressure on said thrust rollers with the force sufficient to overcome wave and wind forces to provide conditions under which said CWTI-D keeps in contact with said CG foundation through thrust rollers simultaneously during said CWTI-D pitching near said CG foundation;

taking ballast on the CWTI-D for sinking and when the sea level comes over a bow hull section and a stern hull section, the only active waterplane area being formed by said central hull section, said active central section waterplane area small size excludes pitching and bringing said thrust rollers simultaneously into a firm contact with said CG foundation and by this orienting said CWTI-D perpendicular to said CG foundation regardless of the wave actions;

activating side guide rollers of said upper and lower engaging arrangements in conjunction with said thrust rollers locking-up said CWTI-D with said CG foundation;

locking-up said CWTI-D with said CG foundation limiting said CWTI-D movement only to vertical direction (heaving);

accommodating the energy of the possible dynamic impact during placing said WTG on said CG foundation the said upper part of said CG foundation is achieving through a shock absorber;

continuing taking ballast, after said WTG settles on said CG foundation, the said CWTI-D transfers full weight of said WTG transferred to thrust foundation and bringing said CWTI-D tower support for said WTG thrust stools on said CWTI-D out of contact with said WTG thrust stools;

rotating outward said pivotal support for said WTG thrust stools on said CWTI-D to provide condition for avoiding possible interference with said WTG said thrust stools, when said CWTI-D start moving upward;

pumping ballast out from said pontoons of said CWTI-D raises said bow hull section and said stern hull section above the sea level;

disengaging side rollers from contact with said CG foundation starts said CWTI-D pitching, being still in contact with said CG foundation, and simultaneously rising up;

continuing pumping ballast out of said pontoons of said CWTI-D bringing CWTI-D into the transport mode at which said CWTI-D reverses the direction of said propulsion unit force and moves away from the installed said Offshore Wind Turbine (OWP) and by this completing the entire process of placing WTG on the said CG foundation.

* * * * *